(12) United States Patent
Tsai et al.

(10) Patent No.: US 7,728,801 B2
(45) Date of Patent: Jun. 1, 2010

(54) ADJUSTABLE-VIEWING-ANGLE LIQUID CRYSTAL DISPLAY

(75) Inventors: Meng-Chang Tsai, Chiayi (TW); Chih-Ming Chang, Jhongli (TW)

(73) Assignee: AU Optronics Corp., Hsinchu (TW)

( * ) Notice: Subject to any disclaimer, the term of this patent is extended or adjusted under 35 U.S.C. 154(b) by 1301 days.

(21) Appl. No.: 11/149,311

(22) Filed: Jun. 9, 2005

(65) Prior Publication Data
US 2005/0286000 A1  Dec. 29, 2005

(30) Foreign Application Priority Data
Jun. 24, 2004  (TW) .............................. 93118355 A

(51) Int. Cl.
  G06F 3/038  (2006.01)
  G09G 5/00  (2006.01)
  H04N 5/238  (2006.01)
  G02F 1/1337  (2006.01)
  G09F 19/14  (2006.01)

(52) U.S. Cl. .................. 345/87; 345/204; 348/369; 349/1; 349/123

(58) Field of Classification Search .............. 40/453; 345/204, 214, 87–103; 348/369; 349/1, 349/56, 123, 128–132
See application file for complete search history.

(56) References Cited

U.S. PATENT DOCUMENTS

| | | | | |
|---|---|---|---|---|
| 5,877,829 A | * | 3/1999 | Okamoto et al. | 349/74 |
| 5,900,852 A | * | 5/1999 | Tanaka et al. | 345/87 |
| 6,081,312 A | * | 6/2000 | Aminaka et al. | 349/118 |
| 6,239,853 B1 | | 5/2001 | Winker et al. | 349/117 |
| 6,398,370 B1 | | 6/2002 | Chiu et al. | 359/613 |
| 6,445,434 B2 | * | 9/2002 | Takato et al. | 349/123 |
| 6,549,256 B1 | * | 4/2003 | Bryan-Brown et al. | 349/128 |
| 2001/0038431 A1 | * | 11/2001 | Fujimaki et al. | 349/123 |

FOREIGN PATENT DOCUMENTS

| | | |
|---|---|---|
| JP | 09105958 | 4/1997 |
| JP | 10268251 | 10/1998 |
| JP | 11007045 | 1/1999 |

OTHER PUBLICATIONS

English Abstract of JP09105958.
English Abstract of JP10268251.
English Abstract of JP11007045.

* cited by examiner

*Primary Examiner*—Alexander S. Beck
(74) *Attorney, Agent, or Firm*—Thomas, Kayden, Horstemeyer & Risley

(57) ABSTRACT

An LCD includes a backlight module, two polarizers, an LCD panel and a viewing-angle-adjustable device. The polarizers are disposed over the backlight module. The LCD panel and the first viewing-angle-adjusting device are disposed between the polarizers. The viewing-angle-adjusting device comprises a first substrate, a first electrode, a liquid crystal layer, a second electrode and a second substrate. The first electrode is disposed on the first substrate. The liquid crystal layer is disposed on the first electrode. The second electrode and the second substrate are disposed on the liquid crystal layer. The first liquid crystal layer is sealed between the first substrate and the second substrate. The second electrode is disposed on the bottom surface of the second substrate.

12 Claims, 35 Drawing Sheets

ADJUSTABLE-VIEWING-ANGLE LIQUID CRYSTAL DISPLAY

This application claims the benefit of Taiwan application Serial No. 93118355, filed Jun. 24, 2004, the subject matter of which is incorporated herein by reference.

BACKGROUND OF THE INVENTION

1. Field of the Invention

The invention relates in general to a display, and more particularly to an adjustable-viewing-angle LCD.

2. Description of the Related Art

With the advantages of low radiation, compactness and slimness, liquid crystal display (LCD) has gained a wide popularity. Due to the features of higher brightness and wider viewing angle, thin film transistor (TFT) LCD is particularly popular among high-level products. A conventional TFT LCD comprises a backlight module, an upper polarizer, an LCD panel and a lower polarizer, wherein the LCD panel is disposed between the upper polarizer and the lower polarizer. When backlight module is disposed beneath the lower polarizer, the light transmission line of the upper polarizer and that of the lower polarizer are perpendicular to each other. Besides, the LCD panel comprises an upper substrate, a lower substrate and a liquid crystal layer, wherein the upper substrate comprises a common electrode, a color filter, an upper alignment film and a black matrix while the lower substrate comprises a number of the scan lines, a number of data lines, a number of storage capacitors, a number of TFTs, a number of pixel electrodes and a lower alignment film. Besides, a partition is used to maintain the fixed interval between the upper substrate and the lower substrate so that the liquid crystal layer is sealed within the fixed interval between the upper substrate and the lower substrate.

Along with the advance in science and technology, modern people have more opportunities to use an electronic product with LCD, e.g., mobile phone, PDA or notebook computer, in public places. Take the notebook computer for example, when using a notebook computer, the viewing angle design of a conventional LCD cannot protect the privacy of the user, and the frame displayed on the LCD can be easily viewed by a bystander in a squint direction. To protect modern people's needs of privacy, the LCD narrow-viewing-angle technology has thus come to the fore.

Referring to both FIG. 1A~1B, a side view when a conventional LCD at a narrow-viewing-angle mode and a side view when a conventional LCD is a wide-viewing-angle mode are shown. LCD 10 at least comprises an LCD panel 13 and a polymer dispersed liquid crystal (PDLC) device 11, wherein the PDLC device 11 comprises an upper glass plate, a lower plate, liquid crystal molecules and macromolecules. The liquid crystal molecules and the macromolecules are sealed between the upper substrate and the lower substrate. As shown in FIG. 1A, when a voltage is applied to the PDLC device 11, $n_0$, the refractive index of the short axis of the liquid crystal molecules in the PDLC device 11, is equal to the refractive index of the macromolecules enabling the PDLC device 11 to be at a transparent state. Meanwhile, a parallel backlight 12a originating from a backlight module will directly project onto the LCD panel 13 through the PDLC device 11 enabling the LCD 10 at a narrow-viewing-angle mode. That is to say, only the viewer who views the LCD 10 from the front can see the frame displayed on the LCD panel 13; anyone who views the LCD 10 in a squint direction can see the frame displayed on the LCD panel 13.

As shown in FIG. 1B, when no voltage is applied to the PDLC device 11, $n_e$, the refractive index of the long axis of the liquid crystal molecules in the PDLC device 11, does not be equal to the refractive index of the macromolecules, so the PDLC device 11 is at a scattering state. Meanwhile, the parallel backlight 12a will become the non-parallel backlight 12b after passing through the PDLC device 1, while the non-parallel backlight 12b will be projected onto the LCD panel 13 enabling the LCD 10 being at a wide-viewing-angle mode. That is to say, the viewer can see the frame displayed on the LCD panel 13, no matter the viewer views the LCD 10 from the front or in a squint direction. Therefore, the user can determine the LCD 10 being at the wide-viewing-angle mode or the narrow-viewing-angle mode by alternating the PDLC device 11 between the transparent state and the scattering state.

The backlight provided to the LCD 10 is normally from a backlight module. However, present luminous technology of backlight module is still unable to provide real parallel backlight. Although the LCD 10 is already at the narrow-viewing-angle mode shown in FIG. 1A, the user cannot really protect personal privacy and maintain data security. When the backlight projected onto the LCD panel 13 is not real parallel backlight, a bystander still can see the frame displayed on the LCD panel 13 when viewing the LCD 10 in a squint direction. When the PDLC device 11 is at a scattering state, part of the parallel backlight 12a will be reflected by the PDLC device 11, so as to greatly reduce the brightness of the LCD 10 and to influence the operating quality of the LCD 10 severely.

SUMMARY OF THE INVENTION

It is therefore an object of the invention to provide an adjustable-viewing-angle LCD. The design of incorporating a viewing-angle-adjusting device allows the user to adjust the viewing-angle of the LCD by switching a wide-viewing-angle mode or a narrow-viewing-angle mode, not only protecting personal privacy and maintaining data security, but also largely enhancing the practicality of the LCD. Besides, when the user switches the LCD's viewing-angle mode, the contrast and brightness of the LCD do not change, so that the user who views the LCD from the front will not sense any change in contrast and brightness and that the operating quality of the LCD can be maintained.

The invention achieves the above-identified object by providing an LCD. The LCD comprises a backlight module, a first polarizer, a second polarizer, an LCD panel and a viewing-angle-adjusting device. The first polarizer and the second polarizer are disposed over the backlight module. The LCD panel and the viewing-angle-adjusting device are disposed between the first polarizer and the second polarizer. The viewing-angle-adjusting device comprises a first substrate, which may be transparent, a first electrode, which may be transparent, a first alignment film, a liquid crystal layer, a second alignment film, a second electrode, which may be transparent, and a second substrate, which may be transparent. The first electrode is disposed on the first substrate. The first alignment film is disposed on the first electrode. The liquid crystal layer is disposed on the first alignment film. The second alignment film is disposed on the liquid crystal layer. The second electrode is disposed on the liquid crystal layer. The second alignment film is disposed on the bottom surface of the second electrode. The second substrate is disposed on the liquid crystal layer. The first liquid crystal layer is sealed between the first substrate and the second substrate. The second electrode is disposed on the bottom surface of the second substrate.

The invention achieves the above-identified object by providing a method of driving an LCD including at least a viewing-angle-adjusting device having a saturation voltage of liquid crystal ($V_{sat}$). Firstly, a first voltage difference is generated to execute a wide-viewing-angle mode according to a wide-viewing-angle-mode signal. The first voltage difference substantially equals to about 0 or is larger than about $V_{sat}$. Then, a second voltage difference is generated to execute a narrow-viewing-angle mode according to a narrow-viewing-angle-mode signal. The second voltage difference is larger than about 0.5 $V_{sat}$, but smaller than about 0.8 $V_{sat}$.

Other objects, features, and advantages of the invention will become apparent from the following detailed description of the preferred but non-limiting embodiments. The following description is made with reference to the accompanying drawings.

DETAILED DESCRIPTION OF THE INVENTION

First Preferred Embodiment

Figure 1A:
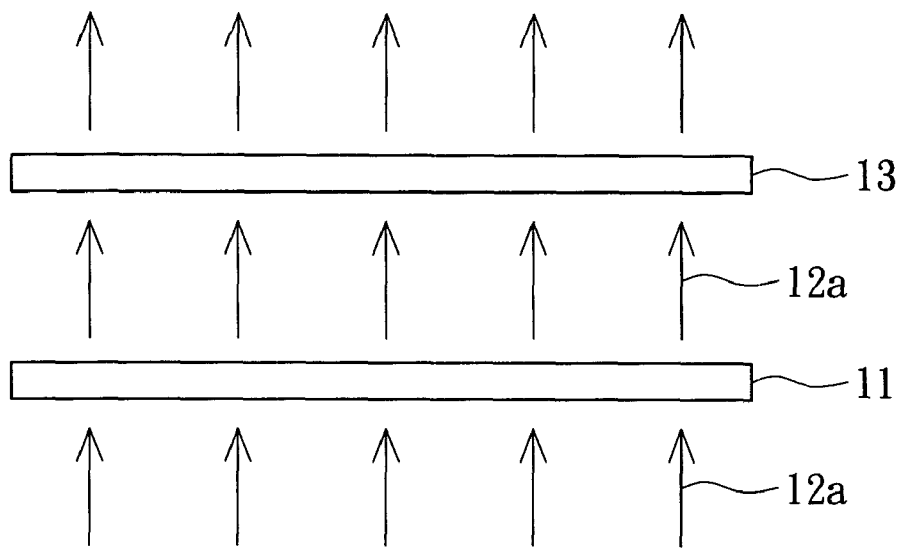
FIG. 1A (Related Art) is a side view in a related art when a conventional LCD is at a narrow-viewing-angle mode.
Figure 1B:
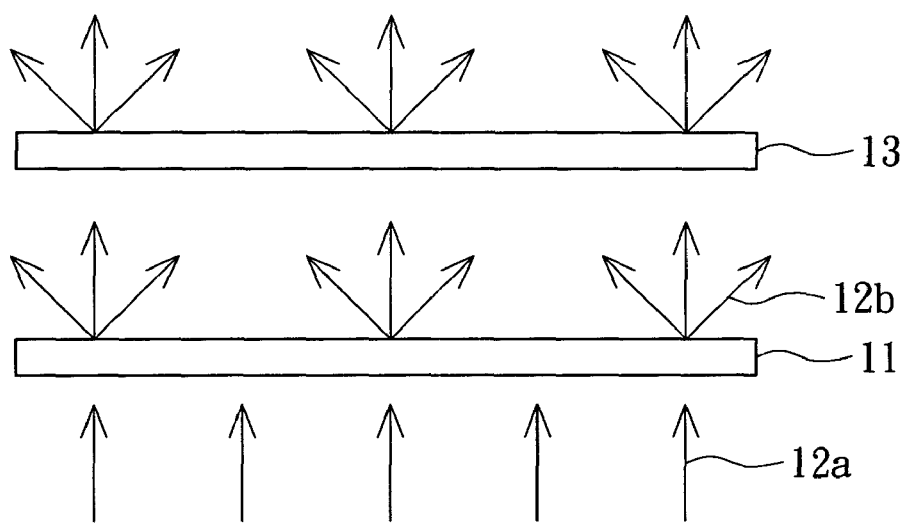
FIG. 1B (Related Art) is a side view in a related art when a conventional LCD is at a wide-viewing-angle mode.
Figure 2:
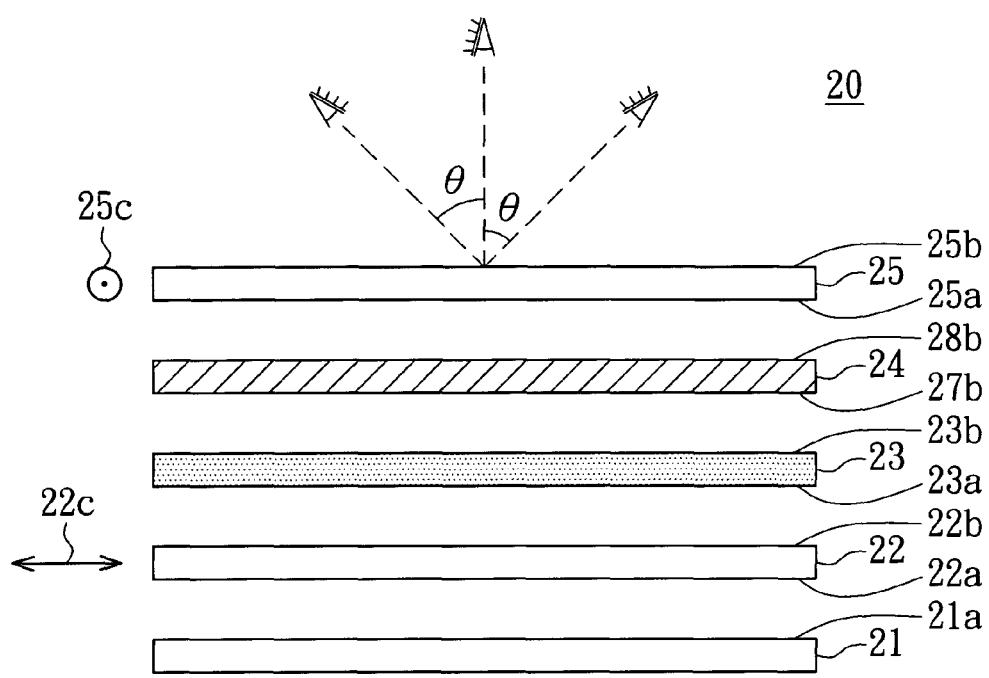
FIG. 2 is a side view of an adjustable-viewing-angle LCD according to the first preferred embodiment of the invention.

Referring to FIG. 2, a side view of a LCD with adjustable-viewing-angle according to the first preferred embodiment of the invention is shown. In FIG. 2, LCD 20 comprises a backlight module 21, a first polarizer 22, an LCD panel 23, a viewing-angle-adjusting device 24 and a second polarizer 25. The backlight module 21 has a light-emitting surface 21a while the first polarizer 22 has a first surface 22a and a second surface 22b corresponding to each other. The LCD panel 23 has a third surface 23a and a fourth surface 23b corresponding to each other while the second polarizer 25 has a fifth surface 25a and a sixth surface 25b corresponding to each other. The first polarizer 22 is disposed on the light-emitting surface 21a with the first surface 22a facing the light-emitting surface 21a while the LCD panel 23 is disposed on the second surface 22b with the third surface 23a facing the second surface 22b. The second polarizer 25 is disposed on the fourth surface 23b with the fifth surface 25a facing the fourth surface 23b while the viewing-angle-adjusting device 24 is disposed between the second polarizer 25 and the LCD panel 23. Besides, the first polarizer 22 has a first light transmission axis while the second polarizer 25 has a second light transmission axis. The extending direction 22c of the first light transmission axis is perpendicular to the extending direction 25c of the second light transmission axis. Besides, the backlight module 21 provides backlight to the LCD panel 23 allowing the viewer to see the frame displayed on the LCD panel 23 from the sixth surface 25b. Besides, the LCD panel 23 is mainly for displaying the frame, while the viewing-angle-adjusting device 24 is for maintaining or changing the polarization state of the light passing through the LCD panel 23 to determine whether the LCD 20 is at the wide-viewing-angle mode or the narrow-viewing-angle mode.

Figure 3A:
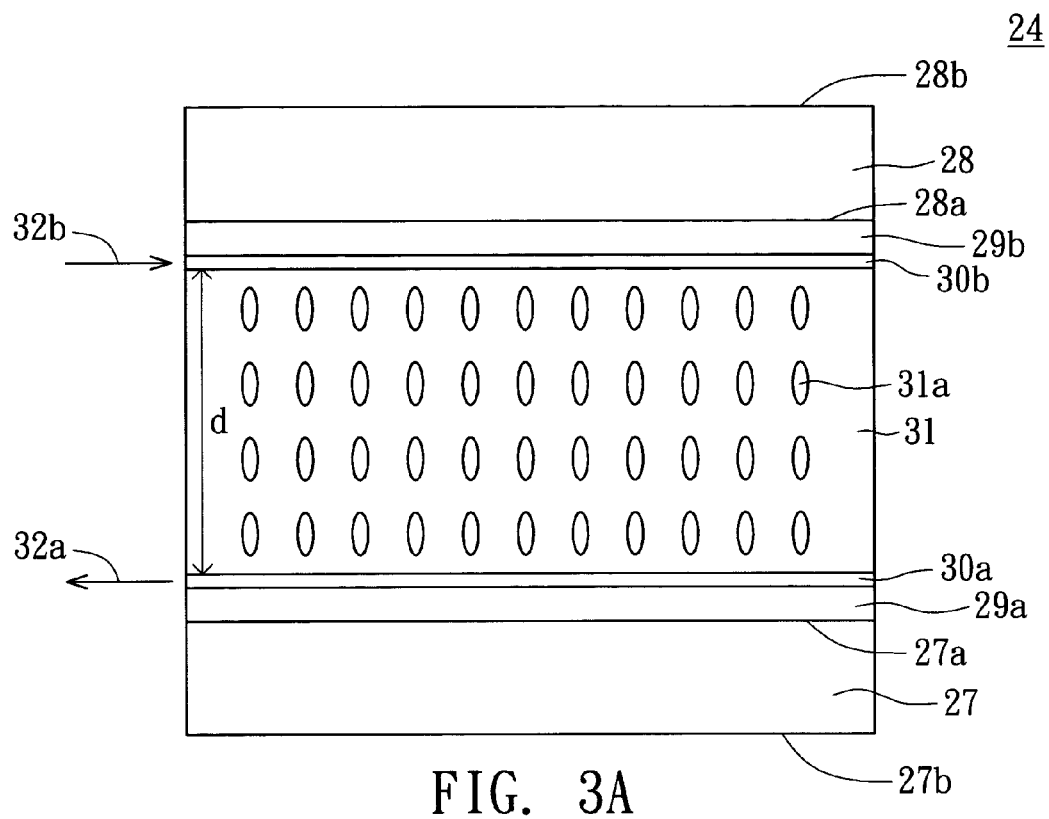
FIG. 3A is a cross-sectional view when the liquid crystal molecules disposed on the viewing-angle-adjusting device having a first alignment film in FIG. 2 are at a vertical state.

As shown in FIG. 3A, the viewing-angle-adjusting device 24 comprises a first substrate 27, a second substrate 28, a first electrode 29a, a second electrode 29b, a first alignment film 30a, a second alignment film 30b and a liquid crystal layer 31. The first substrate 27, the second substrate 28, the first electrode 29a and the second electrode 29b may be transparent. The first substrate 27 has a first substrate surface 27a and a second substrate surface 27b corresponding to each other. The second substrate surface 27b faces the fourth surface 23b in FIG. 2 so the viewing-angle-adjusting device 24 in FIG. 2 is disposed on the fourth surface 23b with the second substrate surface 27b facing the fourth surface 23b. The first electrode 29a is disposed on the first substrate surface 27a while the first alignment film 30a is disposed on the first electrode 29a and has a first rubbing direction 32a parallel to or perpendicular to the extending direction 22c of the first light transmission axis. In the present preferred embodiment, the first rubbing direction 32a is parallel to the extending direction 22c of the first light transmission axis. The second substrate 28 has a third substrate surface 28a and a fourth substrate surface 28b corresponding to each other. The third substrate surface 28a and the fourth substrate surface 28b respectively face the first substrate surface 27a and the fifth surface 25a of the second polarizer 25 in FIG. 2. The second polarizer 25 of FIG. 2 is disposed on the fourth substrate surface 28b with the fifth surface 25a facing the fourth substrate surface 28b. The second electrode 29b is disposed on the third substrate surface 28a while the second alignment film 30b is disposed on the second electrode 29b and has a second rubbing direction 32b opposite to the first rubbing direction 32a. The liquid crystal (LC) layer 31 is sealed between the first substrate 27 and the second substrate 28 and positioned between the first alignment film 30a and the second alignment film 30b. The liquid crystal layer 31 has a number of the liquid crystal (LC) molecules 31a. The thickness of the liquid crystal layer 31 is assumed to be d.

In the present preferred embodiment, the liquid crystal molecules 31a of the liquid crystal layer 31 can be arranged in a vertical alignment (VA) type for instance. Besides, the first substrate 27 and the second substrate 28 can be made of glass or plastics. The first electrode 29a and the second electrode 29b can be made of indium tin oxide (ITO) or indium zinc oxide (IZO). The first alignment film 30a and the second alignment film 30b can be made of polyimide (PI). Besides, the LCD panel 23 comprises an upper substrate, a lower substrate and a liquid crystal layer. The upper substrate comprises a common electrode, a color filter, a black matrix and an upper alignment film. The lower substrate comprises a number of scan lines, a number of data lines, a number of storage capacitors, a number of thin film transistors (TFTs), a number of pixel electrodes and a lower alignment film. Besides, the upper substrate and the lower substrate are separated by a partition for the liquid crystal layer to be sealed between the upper substrate and the lower substrate via spacers and sealants.

Figure 3B:
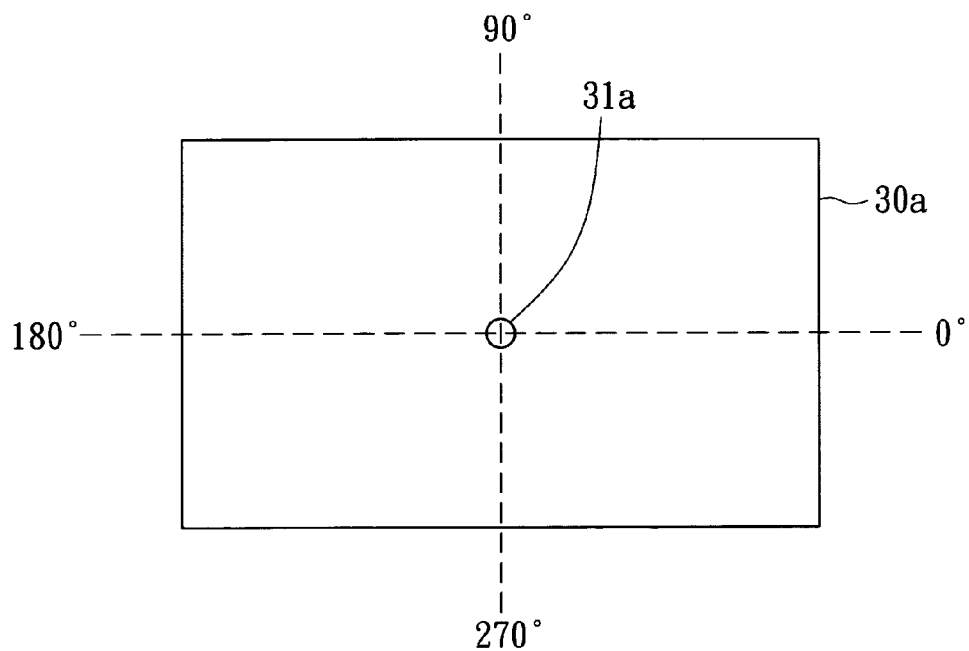
FIG. 3B is a top view when a liquid crystal molecule disposed on the viewing-angle-adjusting device in FIG. 3A stands on the first alignment film.

As shown in FIG. 3B, in the present preferred embodiment, if the first rubbing direction 32a of the first alignment film 30a shifts from the azimuth angle of 90 degrees to the azimuth angle of 270 degrees, the second rubbing direction 32b will shift from the azimuth angle of 270 degrees to the azimuth angle of 90 degrees. Besides, the extending direction 22c of the first light transmission axis of the first polarizer 22 in FIG. 2 will shift from the azimuth angle of 90 degrees to the azimuth angle of 270 degrees or from the azimuth angle of 270 degrees to the azimuth angle of 90 degrees. Besides, the extending direction 25c of the second light transmission axis of the second polarizer 24 in FIG. 2 will extend from the azimuth angle of 0 degree to the azimuth angle of 180 degrees or from the azimuth angle of 180 degrees to the azimuth angle of 0 degree.

As shown in FIG. 3A, when no voltage is applied between the first electrode 29a and the second electrode 29b, the liquid crystal molecules 31a of the liquid crystal layer 31 are aligned to form a vertical state, i.e., the long axis of the liquid crystal molecules 31a is perpendicular to the surface of the first alignment film 30a. When the viewer views the LCD 20 from the front, Δn, the difference in refractive index between the long and short axes of the liquid crystal molecules 31a corresponding to the light seen by the viewer, is equal to 0. And, the retardation provided by the viewing-angle-adjusting device 24 when the viewer views the LCD 20 from the front, is also equal to 0. Meanwhile, the viewing-angle-adjusting device 24 does not change the polarization state of the light passing through the LCD panel 23, this means that the contrast and brightness of the frame displayed on the LCD panel 23 does not change and that the viewer can see the frame displayed on the LCD panel 23 when viewing the LCD 20 from the front. When the viewer views the LCD 20 in a squint direction at an observation angle θ from the azimuth angle of 0, 90, 180 or 270 degrees in FIG. 3B, since Δn is equal to 0, And is also equal to 0. Meanwhile, the viewing-angle-adjusting device 24 does not change polarization state of the light passing through the LCD panel 23, and the viewer can see the frame displayed on the LCD panel 23 when viewing the LCD 20 in a squint direction. Therefore, when no voltage is applied between the first electrode 29a and the second electrode 29b in FIG. 3A, the LCD 20 is at a first wide-viewing-angle mode according to a wide-viewing-angle-mode signal, the viewer can see the frame displayed on the LCD 20 no matter the viewer views the LCD 20 from the front or in a squint direction.

Figure 4A:
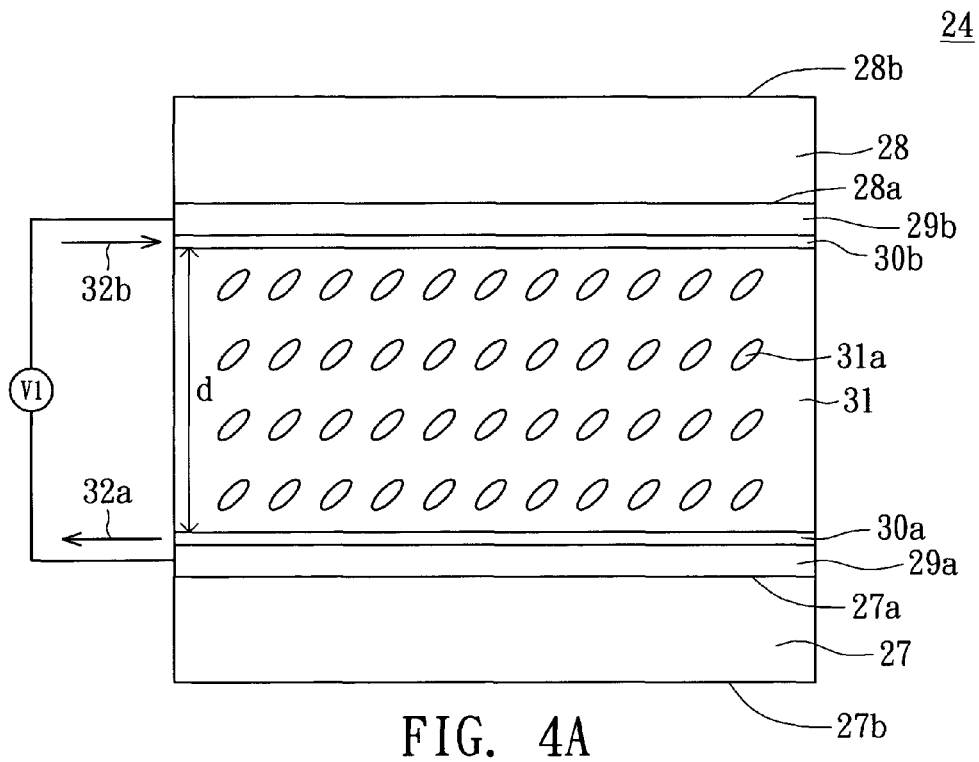
FIG. 4A is a cross-sectional view when the liquid crystal molecules disposed on the viewing-angle-adjusting device having first alignment film in FIG. 2 are at a sloping state.
Figure 4B:
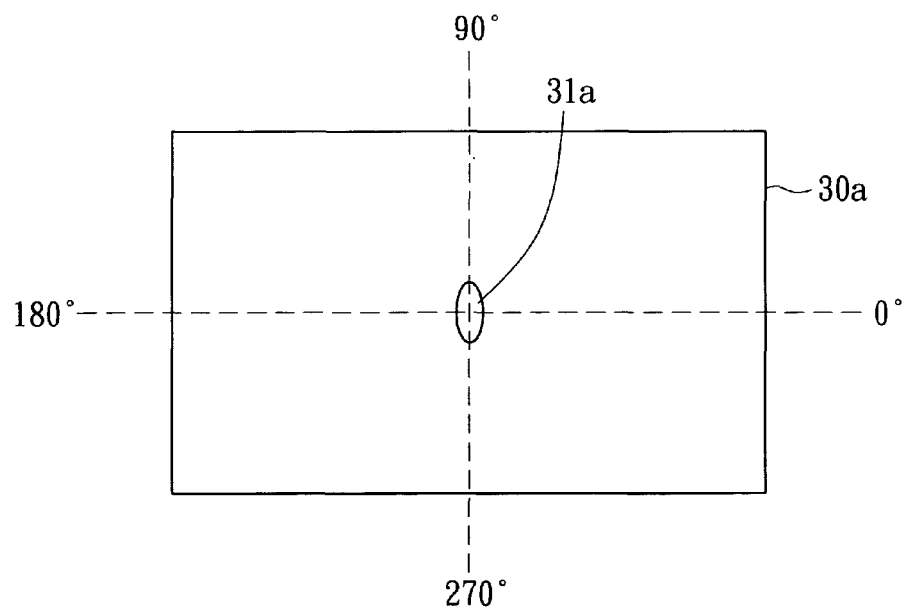
FIG. 4B is a top view when a liquid crystal molecule disposed on the viewing-angle-adjusting device in FIG. 4A tilts towards the azimuth angle of 90 degrees on the first alignment film.

As shown in FIG. 4A, when a first voltage V1 is applied between the first electrode 29a and the second electrode 29b, that is, the first voltage difference between the first electrode 29a and the second electrode 29b, the liquid crystal molecules 31a of the liquid crystal layer 31 tilt along the first rubbing direction 32a towards the azimuth angle of 90 degrees, i.e., the long axis of the liquid crystal molecules 31a and the surface of the first alignment film 30a form an acute angle so as to be aligned to form a sloping state as shown in FIG. 4B. When the viewer views the LCD 20 from the front, Δn, the difference in refractive index between the long and short axes of the liquid crystal molecules 31a corresponding to the light seen by the viewer, is equal to 0. And, the retardation provided by the viewing-angle-adjusting device 24 is also equal to 0. Meanwhile, the viewing-angle-adjusting device 24 in FIG. 4A does not change the polarization state of the light passing through the LCD panel 23 in FIG. 2, this means that the contrast and brightness of the frame displayed on the LCD panel 23 does not change and that the viewer can see the frame displayed on the LCD panel 23 when viewing the LCD 20 from the front.

When the viewer views the LCD 20 in a squint direction at an observation angle θ from the azimuth angles of 90 or 270 degrees in FIG. 3B, since Δn is equal to 0, the viewer can see the frame displayed on the LCD panel 23 when viewing the LCD 20 in a squint direction at the azimuth angle of 90 or 270 degrees. However, when the viewer views the LCD 20 in a squint direction at observation angle θ from the azimuth angle of 0 or 180 degrees in FIG. 3B, since Δn is not equal to 0, Δnd is not equal to 0. Meanwhile, the viewing-angle-adjusting device 24 will change the polarization state of the light passing through the LCD panel 23, so that the viewer cannot see the frame displayed on the LCD panel 23 when viewing the LCD 20 in a squint direction at the azimuth angle of 0 or 180 degrees. Therefore, when the first voltage V1 is applied between the first electrode 29a and the second electrode 29b in FIG. 4A, the LCD 20 is at a narrow-viewing-angle mode according to a narrow-viewing-angle-mode signal. For the viewer who views the LCD 20 from the front and the viewer who views the LCD 20 in a squint direction at the azimuth angles of 90 and 270 degrees, the viewer who views the LCD 20 in a squint direction at the azimuth angles of 0 and 180 degrees can see the frame displayed on the LCD 20 so as to achieve the object of narrow-viewing-angle.

Figure 5A:
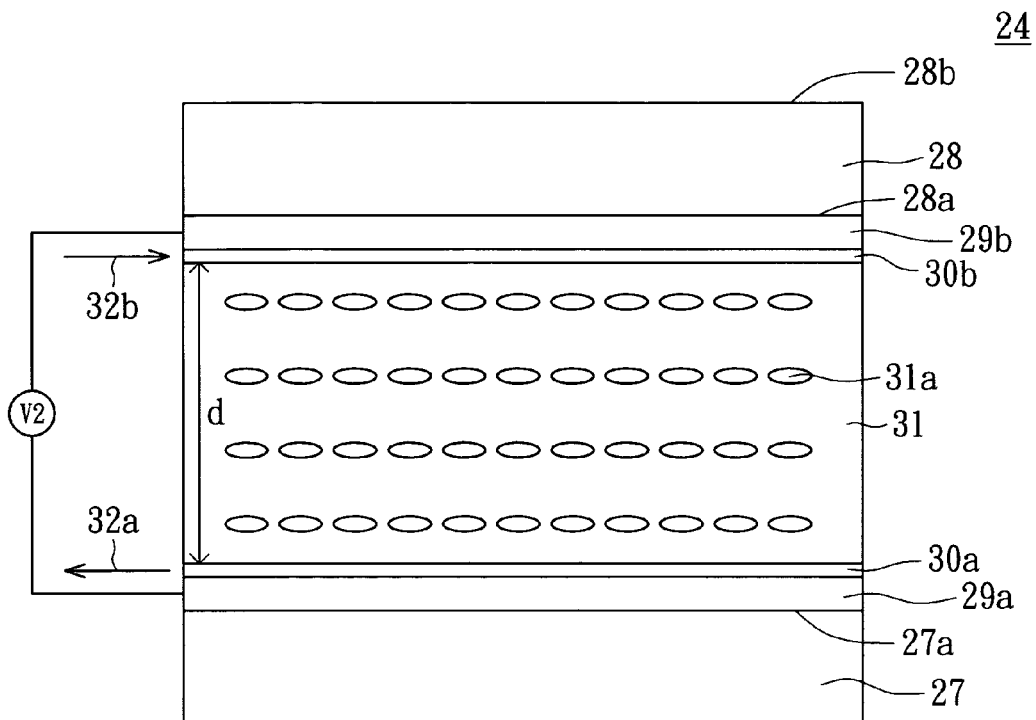
FIG. 5A is a cross-sectional view when the liquid crystal molecules disposed on the viewing-angle-adjusting device having first alignment film in FIG. 2 are at a flat state.
Figure 5B:
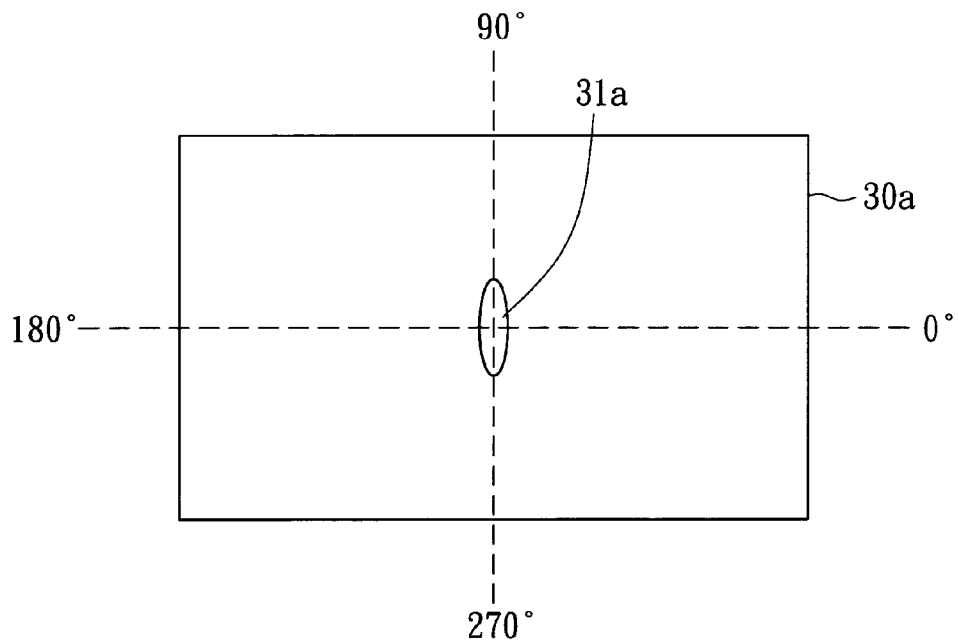
FIG. 5B is a top view when a liquid crystal molecule disposed on the viewing-angle-adjusting device in FIG. 4A lies flat towards the azimuth angle of 90 degrees on the first alignment film.

As shown in FIG. 5A, when a second voltage V2 is applied between the first electrode 29a and the second electrode 29b, that is, the second voltage difference between the first electrode 29a and the second electrode 29b, the liquid crystal molecules 31a of the liquid crystal layer 31 lie flat along the first rubbing direction 32a towards the azimuth angle of 90 degrees. That is to say, the long axis of the liquid crystal molecules 31a is parallel to the surface of the first alignment film 30a so as to be aligned to form a flat state as shown in FIG. 5B. When the light transmission of the liquid crystal layer 31 becomes higher, the voltage applied between the first 29a and the second electrode 29b is defined as a saturation voltage $V_{sat}$ of the liquid crystal layer 31. V2 is larger than $V_{sat}$. V1 substantially equals to about $0.5V_{sat}$~$0.8 V_{sat}$. Perfectly, V1 equals to $0.7V_{sat}$. In present embodiment, V1 and V2 are 2.5 V and 5 V, respectively. When the viewer views the LCD 20 from the front, since Δn is equal to 0, the viewer can see the frame displayed on the LCD panel 23 by viewing the LCD 20 from the front. The viewer views the LCD 20 in a squint direction from the azimuth angles of 0, 90, 180 or 270 degrees in FIG. 5B at observation angle θ, since Δn equals 0, the viewer can see the frame displayed on the LCD panel 23 when viewing the LCD 20 in a squint direction. Therefore, when the second voltage V2 is applied to between the first electrode 29a and the second electrode 29b in FIG. 5A, the LCD 20 is at a second wide-viewing-angle mode according to the wide-viewing-angle-mode signal, the viewer can see the frame displayed on the LCD 20, no matter the viewer views the LCD 20 from the front or in a squint direction.

Although the orientation characteristic of the liquid crystal molecules 31a of the liquid crystal layer 31 under the change of the electrical field are mentioned in the foregoing description of the present embodiment, other kind of liquid crystal has different orientation characteristic under the change of the electrical field. For example, when no voltage is applied between the first electrode 29a and the second electrode 29b, the LC molecules of the LC layer are arranged in a flat state. So that, the LCD is at a first wide-viewing-angle mode according to the wide-viewing-angle-mode signal. When a fifth voltage is applied between the first electrode 29a and the second electrode 29b, the LC molecules of the LC layer are arranged along the first rubbing direction 32a in a sloping state. So that, the LCD is at a narrow-viewing-angle mode according to the narrow-viewing-angle-mode signal. When a sixth voltage is applied between the first electrode 29a and the second electrode 29b, the LC molecules of the LC layer are arranged in a perpendicular state. So that, the LCD is at a second wide-viewing-angle mode.

Figures 6A, 6B:
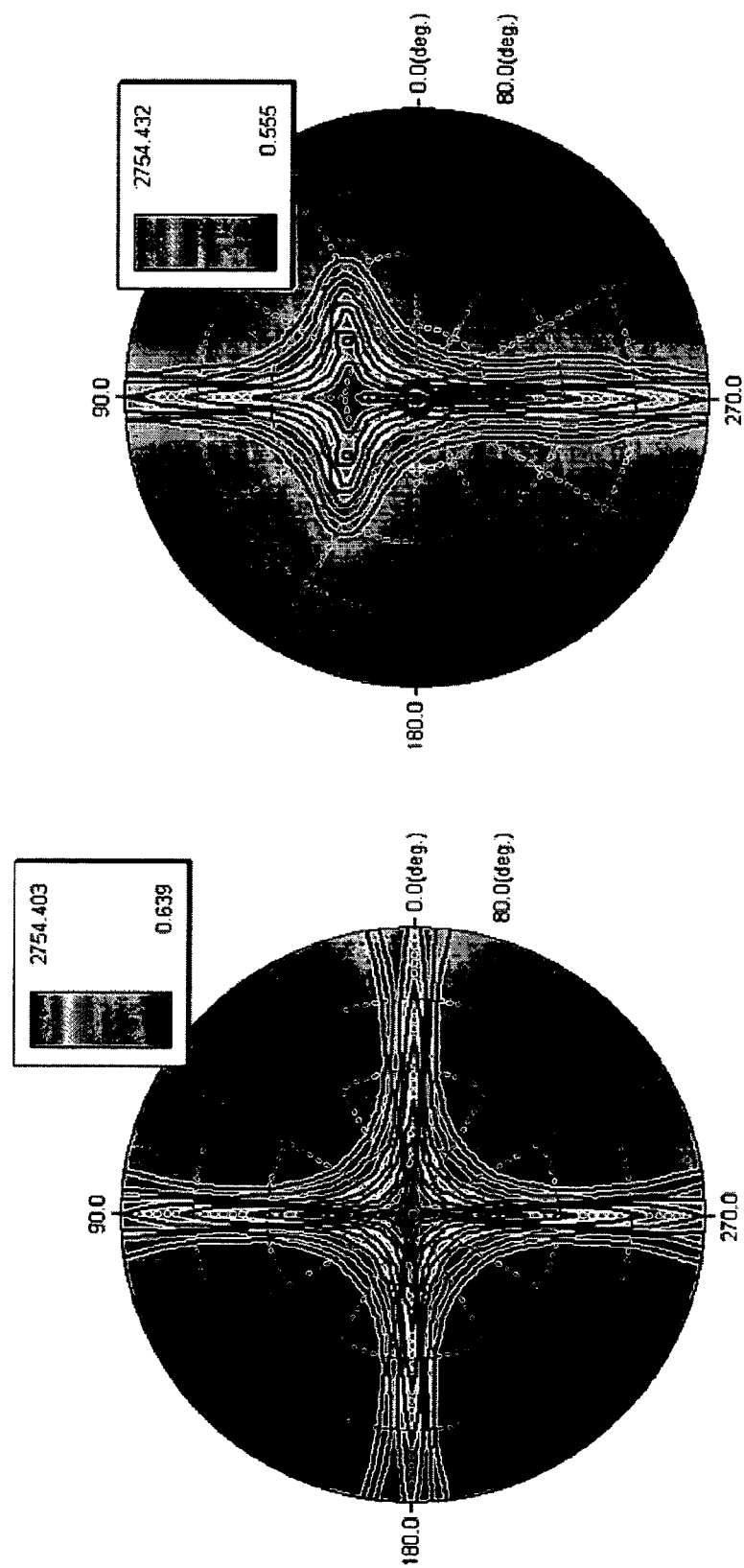
FIG. 6A is an iso-contrast diagram when the LCD in FIG. 2 is at a first wide-viewing-angle mode.
FIG. 6B is iso-contrast diagram when the LCD in FIG. 2 is at a narrow-viewing-angle mode.

Refer to FIG. 6A and FIG. 6B. FIG. 6A is an iso-contrast diagram when the LCD in FIG. 2 is at a first wide-viewing-angle mode; FIG. 6B is iso-contrast diagram when the LCD in FIG. 2 is at a narrow-viewing-angle mode. In FIG. 6A~6B, the iso-contrast lines are a number of concentric circles representing the contrast values of 2000, 1000, 500, 100, 50, 20 and 10 from with the outmost circle representing the contrast value of 10. Besides, the view angle is defined as the observation angle when contrast value equals 10. In FIG. 6A, if the contrast value equaling 10 is set as the standard, all the view angles at the azimuth angles of 0, 90, 180 and 270 degrees of the LCD 20 at the first wide-viewing-angle mode are larger than 80 degrees. Little differences exist between the view angles observed at the azimuth angles of 90 and 270 degrees of the LCD 20 at the narrow-viewing-angle mode according to the narrow-viewing-angle-mode signal in FIG. 6B and the view angles observed at the azimuth angles of 90 and 270 degrees of the LCD 20 at the first wide-viewing-angle mode according to the wide-viewing-angle-mode signal according to FIG. 6A, but the view angles observed at the azimuth angles of 0 and 180 degrees of the LCD 20 at the first wide-viewing-angle mode reduce from 80 degrees to 18 degrees. Besides, when the viewer views the LCD 20 from the front, the contrast, of the LCD 20 at the first wide-viewing-angle mode, is almost the same as the contrast of the LCD 20 at the narrow-viewing-angle mode. This means that under whatever viewing-angle mode, the LCD 20 does not change the contrast and brightness of the frame displayed on the LCD 20 viewed by the viewer from the front.

Figure 7A:
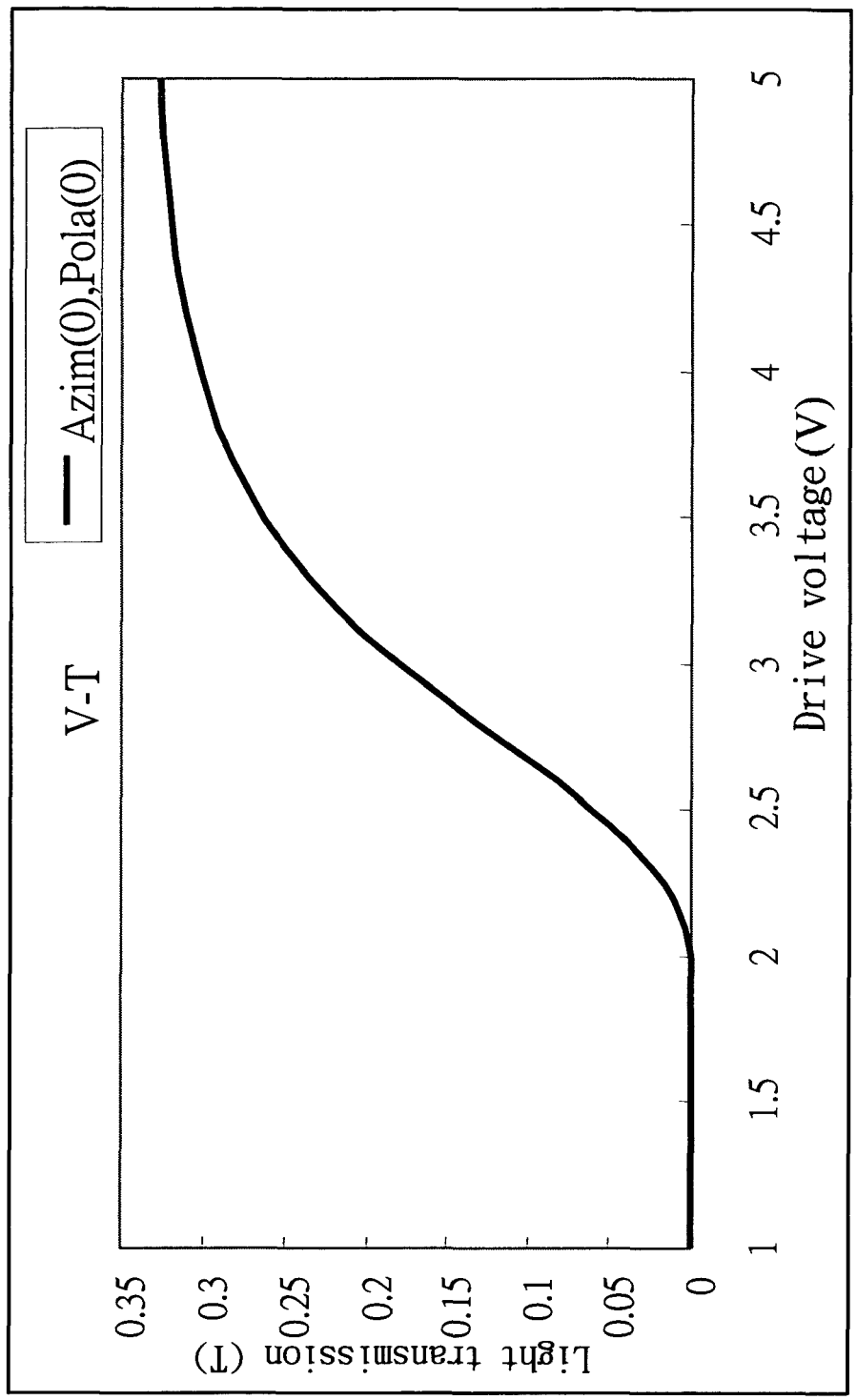
FIG. 7A is a rectangular co-ordinate diagram showing the relationship between the drive voltage (V) of the LCD panel and the light transmission (T) of the LCD with adjustable-viewing-angle observed by a viewer from the front when the LCD is at a first wide-viewing-angle mode.
Figure 7B:
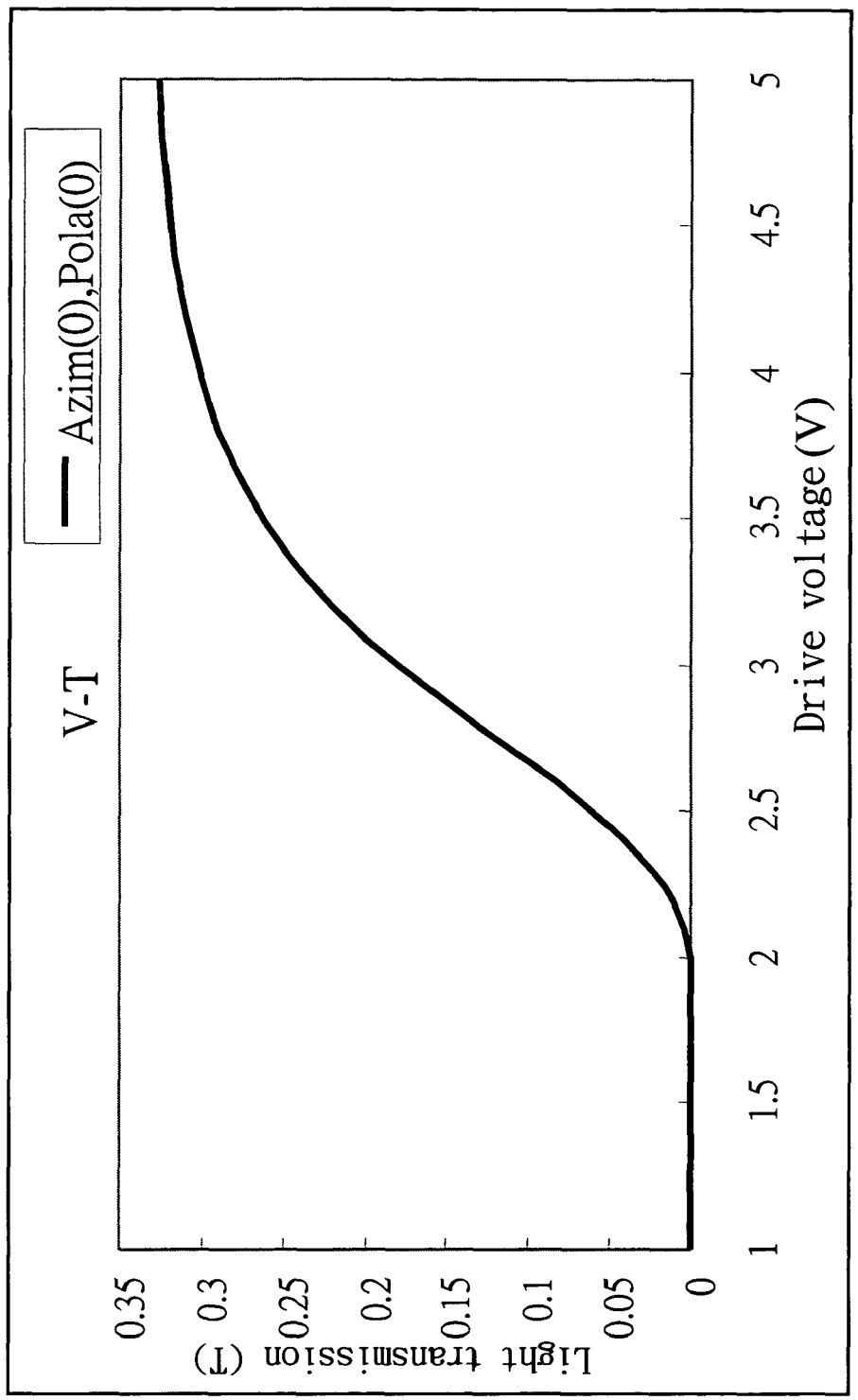
FIG. 7B is a rectangular co-ordinate diagram showing the relationship between the drive voltage (V) of the LCD panel and the light transmission (T) of the LCD with adjustable-viewing-angle observed by a viewer from the front when the LCD is at the narrow-viewing-angle mode.

Refer to FIG. 7A~7B. FIG. 7A is a rectangular co-ordinate diagram showing the relationship between the drive voltage (V) of the LCD panel and the light transmission (T) of the LCD with adjustable view angle observed by a viewer from the front when the LCD is at a first wide-viewing-angle mode according to the wide-viewing-angle-mode signal. FIG. 7B is a rectangular co-ordinate diagram showing the relationship between the drive voltage (V) of the LCD panel and the light transmission (T) of the LCD with adjustable view angle observed by a viewer from the front when the LCD is at the narrow-viewing-angle mode. In FIG. 7A and FIG. 7B, when the viewer views the LCD 20 from the front, the V-T curves observed at the first wide-viewing-angle mode and at the narrow-viewing-angle mode are the same. This means that under whatever viewing-angle mode, the LCD 20 does not change the frame displayed on the LCD 20 when the viewer views the LCD from the front.

Figure 8A:
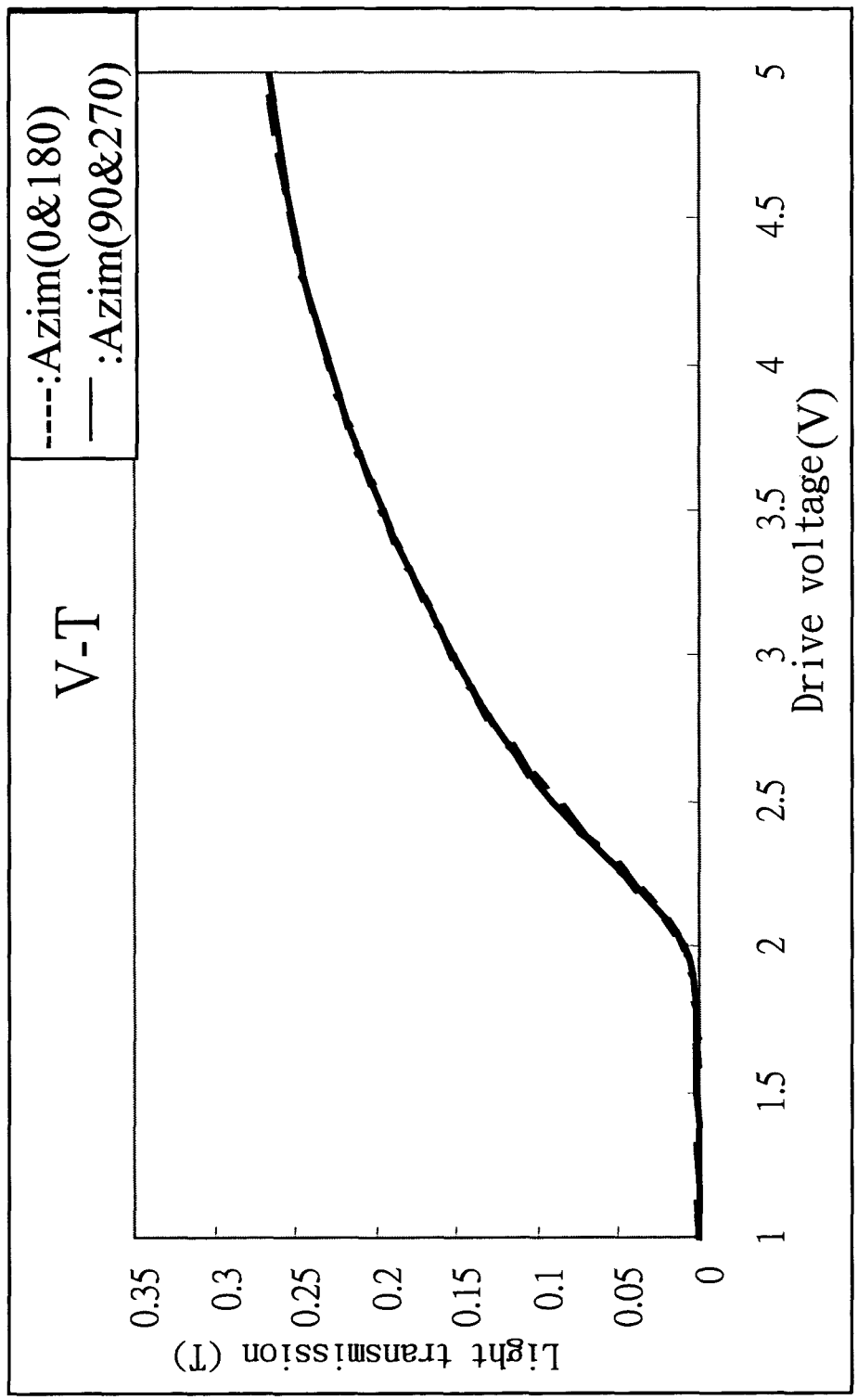
FIG. 8A is a rectangular co-ordinate diagram showing the relationship between the drive voltage (V) of the LCD panel and the light transmission (T) of the LCD with adjustable-viewing-angle observed by a viewer in a squint direction when the LCD is at the first wide-viewing-angle mode.
Figure 8B:
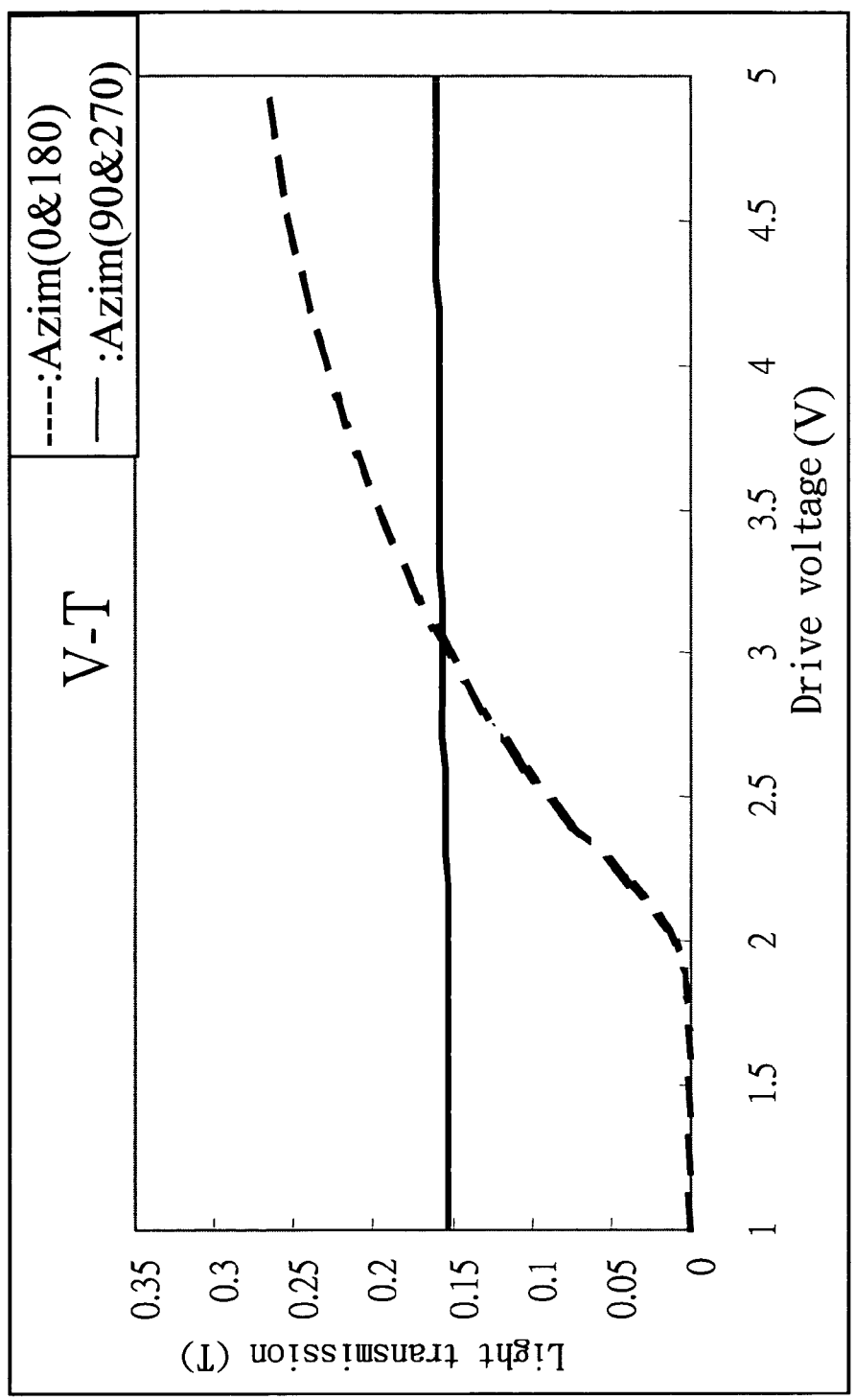
FIG. 8B is a rectangular co-ordinate diagram showing the relationship between the drive voltage (V) of the LCD panel and the light transmission (T) of the LCD with adjustable-viewing-angle observed by a viewer in a squint direction when the LCD is at the narrow-viewing-angle mode.

Referring to FIG. 8A~8B. FIG. 8A is a rectangular co-ordinate diagram showing the relationship between the drive voltage (V) of the LCD panel and the light transmission (T) of the LCD with adjustable-viewing-angle observed by a viewer in a squint direction when the LCD is at the first wide-viewing-angle mode according to the wide-viewing-angle-mode signal. FIG. 8B is a rectangular co-ordinate diagram showing the relationship between the drive voltage (V) of the LCD panel and the light transmission (T) of the LCD with adjustable-viewing-angle observed by a viewer in a squint direction when the LCD is at the narrow-viewing-angle mode. In FIG. 8A~8B, if the observation angle θ equals 40 degrees, the viewer will view the LCD 20 in a squint direction from an observation angle of 40 degrees. As shown in FIG. 8A, when the viewer views the LCD 20 in a squint direction from the azimuth angles of 0, 90, 180 and 270 degrees, the V-T curves obtained when the LCD 20 corresponds to the azimuth angles of 0, 90, 180, and 270 degrees respectively are almost the same. As shown in FIG. 8B, when the viewer views the LCD 20 in a squint direction from the azimuth angles of 0, 90, 180 and 270 degrees, the V-T curves corresponding to the azimuth angles of 90 and 270 degrees are almost the same as the V-T curves corresponding to the azimuth angles of 0 and 180 degrees. However, the V-T curves corresponding to the azimuth angles of 0 and 180 are almost flat. This means, the light transmission when the LCD 20 corresponds to the azimuth angles of 0 and 180 degrees cannot increase accordingly when the driving voltage applied to the LCD panel 23 increases, so the viewer cannot see the frame displayed on the LCD panel 23 from the azimuth angles of 0 and 180 degrees.

When the viewer views the LCD 20 from the front, no matter the LCD 20 is at the wide-viewing-angle mode according to the wide-viewing-angle-mode signal or at the narrow-viewing-angle mode according to the narrow-viewing-angle-mode signal, the frame displayed on the LCD 20 viewed by the viewer are almost the same.

When the viewer views the LCD 20 at the wide-viewing-angle mode from the observation angle, the viewer can see the frame displayed on the LCD 20. When the viewer views the LCD 20 at the narrow-viewing-angle mode from the observation angle, the viewer cannot see the frame displayed on the LCD 20.

It can be understood from the above disclosure that the design of the viewing-angle-adjusting device according to the present preferred embodiment enables the user to switch the LCD's viewing-angle mode between a wide-viewing-angle mode and a narrow-viewing-angle mode to achieve the object of adjusting the LCD's view angle and protecting data security, largely enhancing the practicality of the LCD.

Figure 8C:
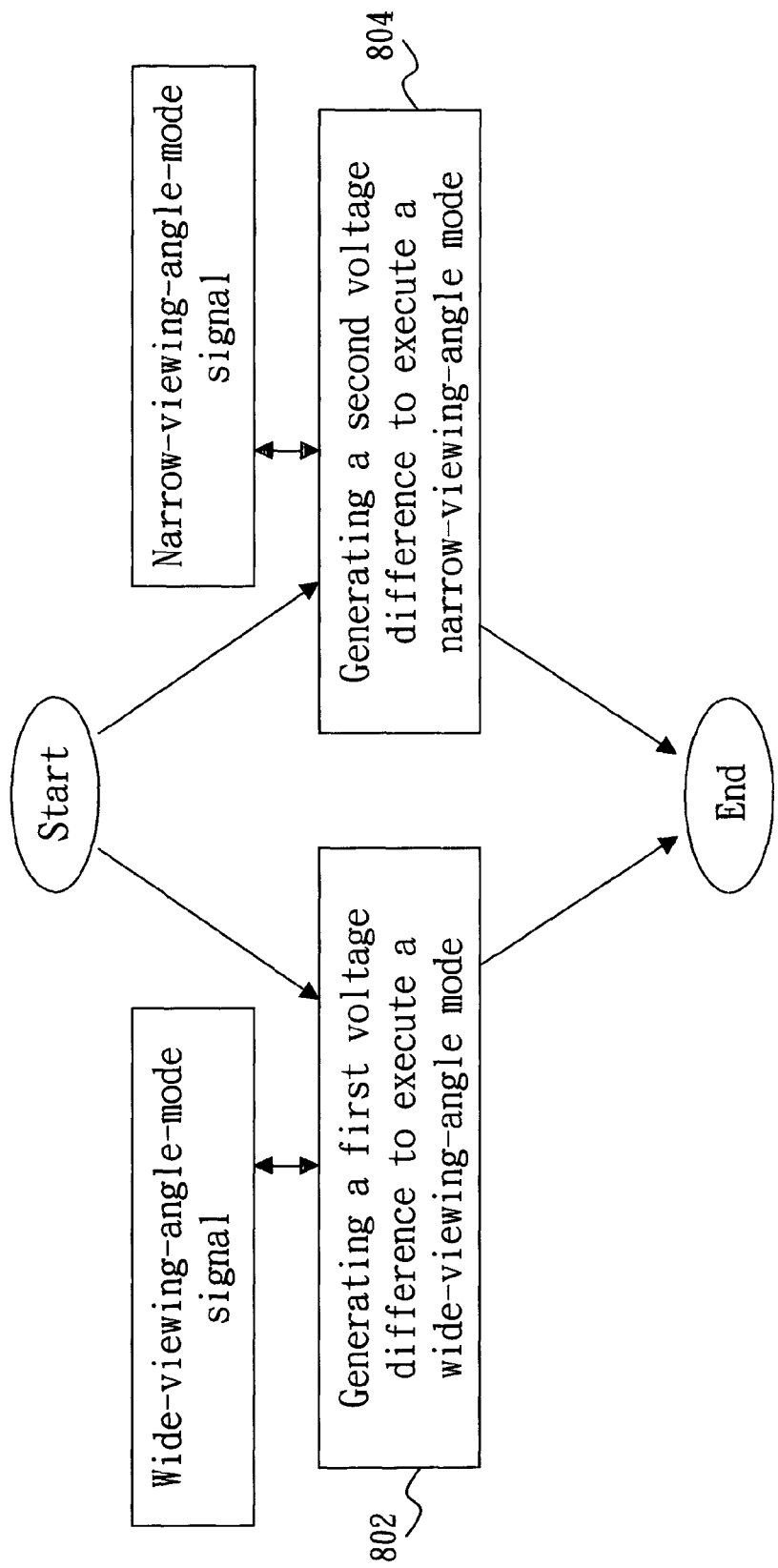
FIG. 8C is a flowchart of a method of driving the LCD with the viewing-angle-adjusting device.

Any skilled in the art knows that the technology of the present embodiment is no limited thereto. For example, the invention provides a method of driving an LCD including at least a viewing-angle-adjusting device having a saturation voltage $V_{sat}$ of liquid crystal. Referring to FIG. 8C, a flowchart of a method of driving the LCD with the viewing-angle-adjusting device is shown. In step 802, a wide-viewing-angle mode is executed according to the wide-viewing-angle-mode signal. The viewing-angle-adjusting device generates a first voltage difference; that is to say, a first voltage difference is applied sandwished the liquid crystal layer. In other word, a first voltage difference is generated to execute a wide-viewing-angle mode according to the wide-viewing-angle-mode signal. The first voltage difference substantially equals to 0 or is larger than $V_{sat}$. In step 804, a narrow-viewing-angle mode is executed according to the narrow-viewing-angle-mode signal. The viewing-angle-adjusting device generates a second voltage difference. In other word, a second voltage difference is generated to execute a narrow-viewing-angle mode according to a narrow-viewing-angle-mode signal. The second voltage difference is larger than about $0.5V_{sat}$ and smaller than about $0.8V_{sat}$.

Second Preferred Embodiment

Figure 9:
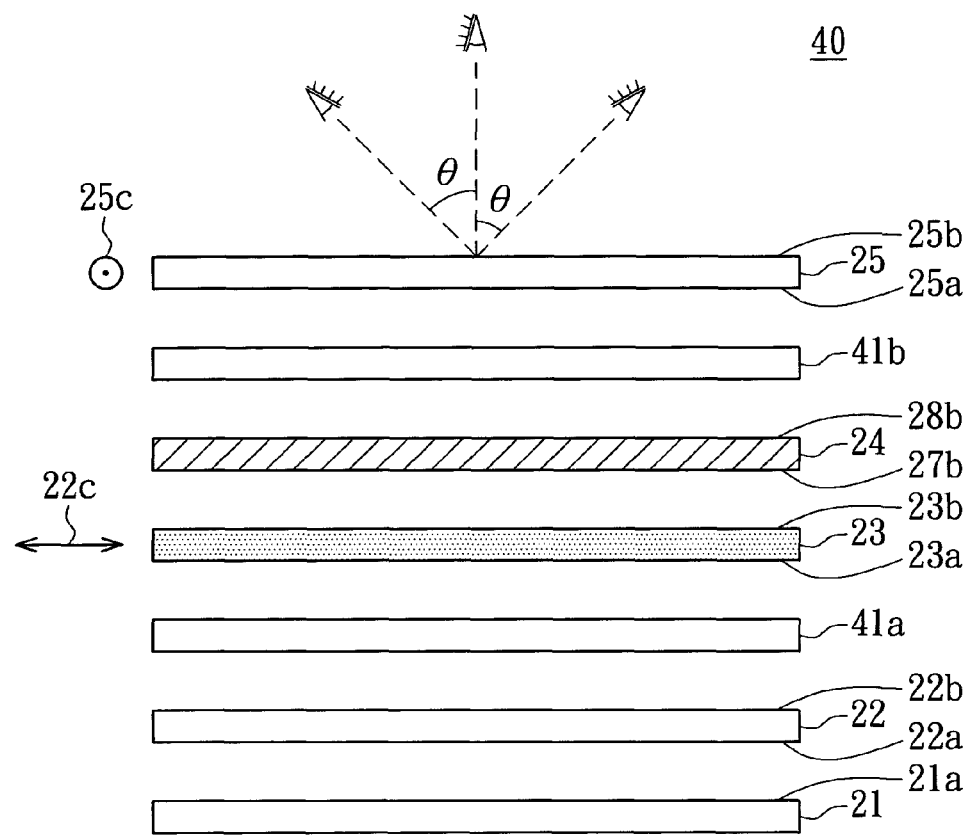
FIG. 9 is a side view of the LCD with adjustable-viewing-angle according to the second preferred embodiment of the invention.

Referring to FIG. 9, a side view of the LCD with adjustable-viewing-angle according to the second preferred embodiment of the invention is shown. The LCD 40 in the present preferred embodiment differs with the LCD 20 in the first preferred embodiment in that the former further comprises a first compensation film 41*a* and a second compensation film 41*b*. As for the remaining identical constituting elements, the same labels are used but the details are not repeated here. In FIG. 9, the first compensation film 41*a* is disposed between the first polarizer 22 and the LCD panel 23 while the second compensation film 41*b* is disposed between the second polarizer 25 and the viewing-angle-adjusting device 24. The first compensation film 41*a* and the second compensation film 41*b* are for compensating the leak light at the dark state of the first polarizer 22 and the second polarizer 24 and the leak light at the dark state of the liquid crystal when viewed by the viewer views in a squint direction.

Figure 10B:
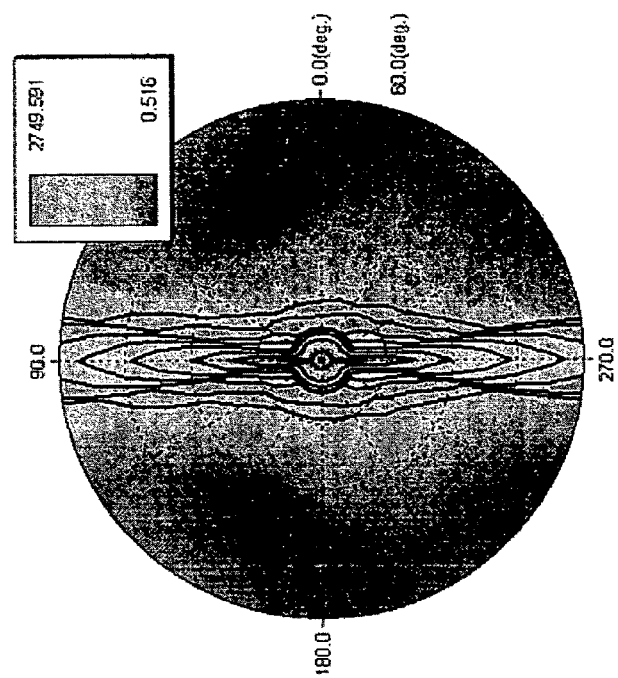
FIG. 10B is an iso-contrast diagram when the LCD in FIG. 9 is at a narrow-viewing-angle mode.
Figure 10A:
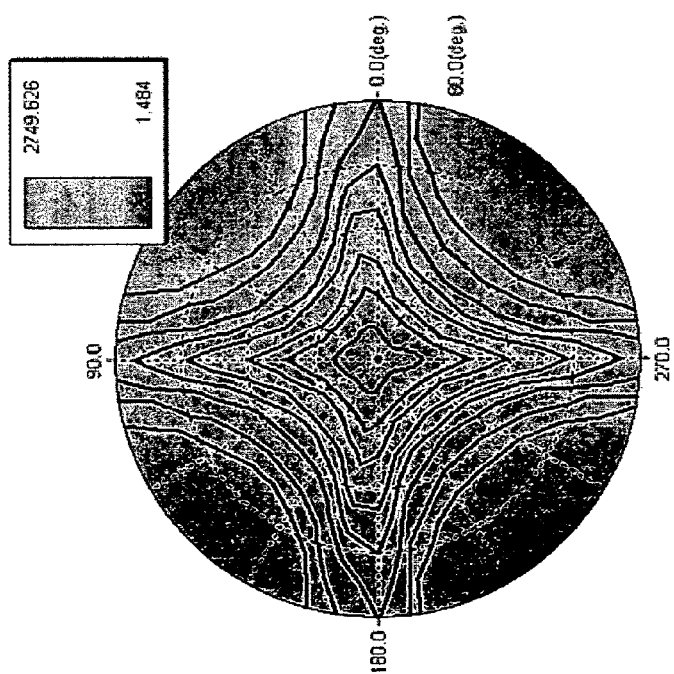
FIG. 10A is an iso-contrast diagram when the LCD in FIG. 9 is at a first wide-viewing-angle mode.

Refer to FIG. 10A~10B. FIG. 10A is an iso-contrast diagram when the LCD in FIG. 9 is at a first wide-viewing-angle mode while FIG. 10B is an iso-contrast diagram when the LCD in FIG. 9 is at a narrow-viewing-angle mode. In the comparison between FIG. 10A and FIG. 6A, since the LCD 40 has a first compensation film 41*a* and a second compensation film 41*b* that the LCD 20 is lacking of, the LCD 40 has a wider view angle and a frame of better contrast and brightness than that of the LCD 20. In the comparison between FIG. 10B and FIG. 6B, since the LCD 40 has a first compensation film 41*a* and a second compensation film 41*b* which the LCD 20 is lacking of, the view angles of the LCD 40 at the azimuth angles of 0 and 180 degrees are larger than that of the LCD 20 at the azimuth angles of 0 and 180 degrees.

Third Preferred Embodiment

Figure 11:
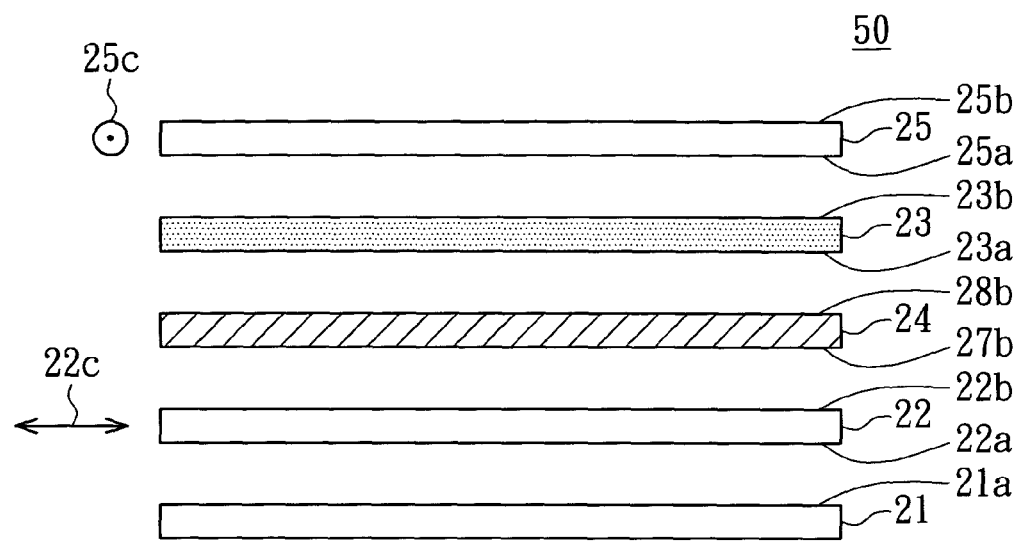
FIG. 11 a side view of the LCD with adjustable-viewing-angle according to the third preferred embodiment of the invention.

Referring to FIG. 11, a side view of the LCD with adjustable view angle according to the third preferred embodiment of the invention is shown. The LCD 50 in the present preferred embodiment differs with the LCD 20 in the first preferred embodiment in that the LCD panel 23 is positioned between the viewing-angle-adjusting device 24 and the second polarizer 25. The viewing-angle-adjusting device 24 is disposed on the second surface 22*b* with the second substrate surface 27*b* facing the second surface 22*b* of the first polarizer 22. The LCD panel 23 is disposed on the fourth substrate surface 28*b* with the third surface 23*a* facing the fourth substrate surface 28*b*. The first polarizer 25 is disposed on the fourth surface 23*b* with the fifth surface 25*a* facing the fourth surface 23*b*. However, anyone who is familiar with the technology of the invention will understand that the technology of the invention is not limited thereto. For example, the first compensation film can be positioned between the first polarizer 22 and the viewing-angle-adjusting device 24 instead, and the second compensation film can be positioned between the second polarizer 25 and the LCD panel 23 instead.

Fourth Preferred Embodiment

Figure 12:
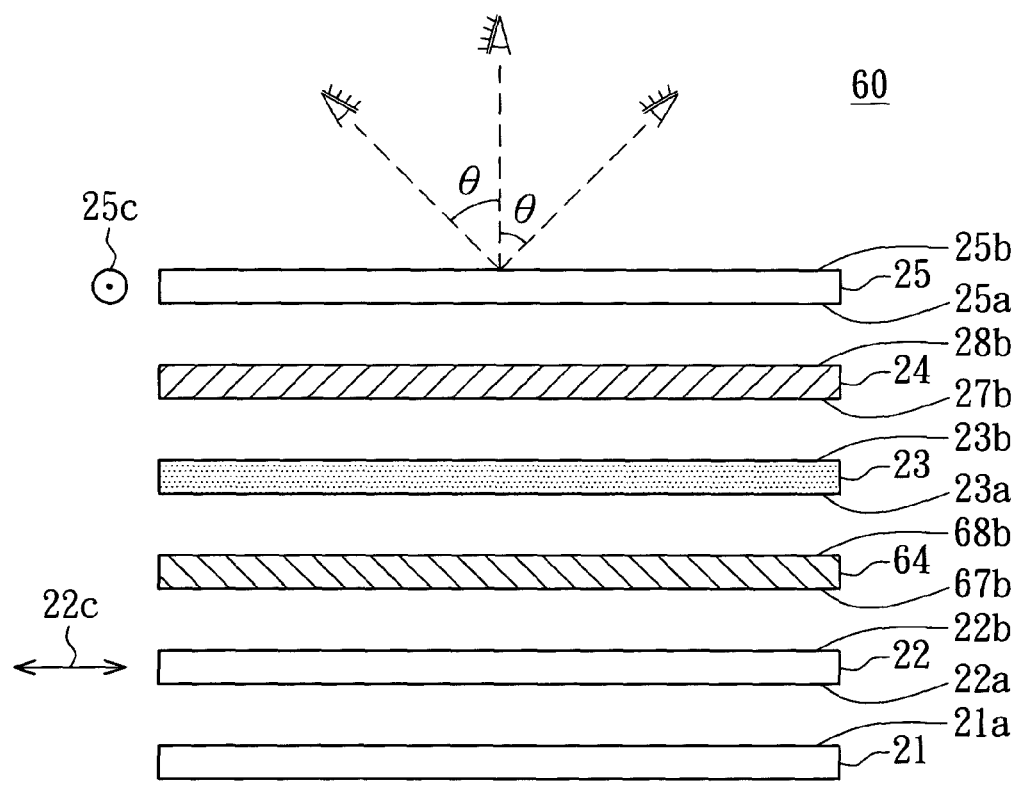
FIG. 12 is a side view when the LCD with adjustable-viewing-angle according to the fourth preferred embodiment of the invention.
Figure 13A:
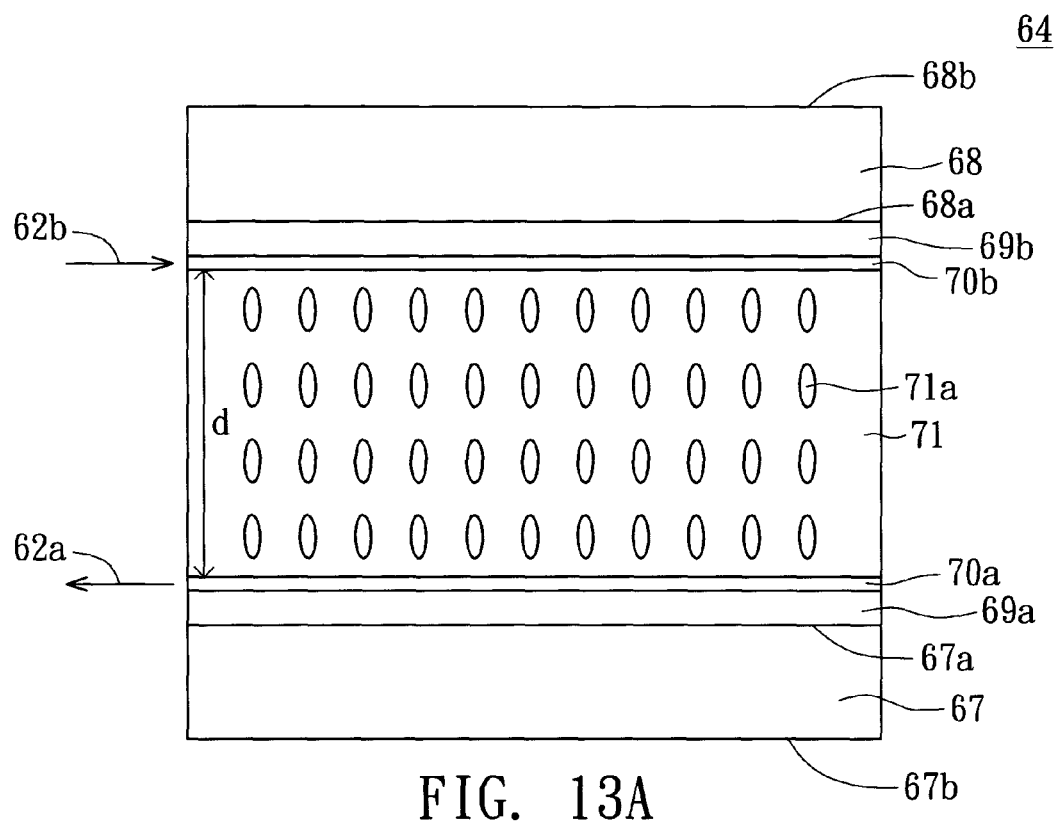
FIG. 13A is a cross-sectional view of the liquid crystal molecules disposed on the viewing-angle-adjusting device having a third alignment film in FIG. 12 are at a vertical state.
Figure 13B:
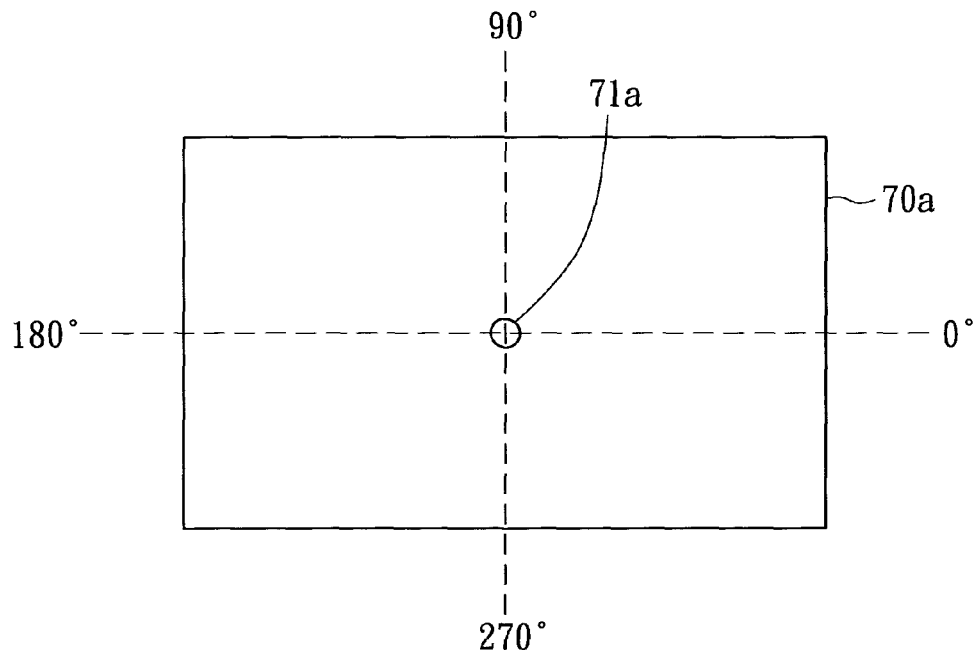
FIG. 13B is a top view when a liquid crystal molecule disposed on the viewing-angle-adjusting device in FIG. 13A stands on a first alignment film.

Referring to FIG. 12, a side view of the LCD with adjustable view angle according to the fourth preferred embodiment of the invention is shown. The LCD 60 in the present preferred embodiment differs from the LCD 20 in the first preferred embodiment, in which the LCD 60 further comprises a viewing-angle-adjusting device 64. The viewing-angle-adjusting device 64 is disposed between the LCD panel 23 and the first polarizer 22 as shown in FIG. 12. In FIG. 13A, the viewing-angle-adjusting device 64 comprises a third substrate 67, a fourth substrate 68, a third electrode 69*a*, a fourth electrode 69*b*, a third alignment film 70*a*, a fourth alignment film 70*b* and a liquid crystal layer 71. The third substrate 67 has a fifth substrate surface 67*a* and a sixth substrate surface 67*b* corresponding to each other, wherein the fifth substrate surface 67*b* faces the second surface 22*b* in FIG. 14. In FIG. 13A, the third electrode 69*a* is disposed on the fifth substrate surface 67*a*. The third alignment film 70*a* is disposed on the third electrode 69*a* and has a third rubbing direction 62*a*. The fourth substrate 68 has a seventh substrate surface 68*a* and an eighth substrate surface 68*b* corresponding to each other, wherein the seventh substrate surface 68*a* and the eighth substrate surface 68*b* faces the third surface 23*a* in FIG. 11. The fourth electrode 69*b* is disposed on the seventh substrate surface 68*a*. The fourth alignment film 70*b* is disposed on the fourth electrode 69*b* and has a fourth rubbing direction 62*b* opposite to the third rubbing direction 62*a*. The liquid crystal layer 71, sealed between the third substrate 67 and the fourth substrate 68 and also positioned between the third alignment film 70*a* and the fourth alignment film 70*b*, has liquid crystal molecules 71*a*, wherein the thickness of the liquid crystal layer 71 may be assumed to be d. As shown in FIG. 13B, in the present preferred embodiment, if the third rubbing direction 62*a* of the third alignment film 70*a* shifts from the azimuth angle of 0 degree towards the azimuth angle of 180 degrees, the third rubbing direction 62*b* shifts from the azimuth angle of 180 degrees towards the azimuth angle of 0 degree.

As shown in FIG. 3A and FIG. 13A, when no voltage is applied between the first electrode 29*a* and the second electrode 29*b* and when no voltage is applied between the third electrode 69*a* and the fourth electrode 69*b*, the liquid crystal molecules 31*a* of the liquid crystal layer 31 and the liquid crystal molecules 71*a* disposed in the liquid crystal layer 71 are both aligned to form a vertical state as shown in FIG. 3B and FIG. 13B. Meanwhile, when the viewer views the LCD 60 from the front or in a squint mode, the retardation Δnd, provided by the viewing-angle-adjusting devices 24 and 64, equals 0, and that means the polarization state of the light passing through the viewing-angle-adjusting devices 24 and 64 will not be changed by the viewing-angle-adjusting devices 24 and 64, so that the LCD 60 is at a first wide-viewing-angle mode according to the wide-viewing-angle-mode signal.

As shown in FIG. 4A and FIG. 13A, before a first voltage V1 is applied between the first electrode 29*a* and the second electrode 29*b* and when no voltage is applied between the third electrode 69*a* and the fourth electrode 69*b*, the liquid crystal molecules 31*a* of the liquid crystal layer 31 tilt along the first rubbing direction 32*a* and are aligned to form a first sloping state as shown in FIG. 4B. The liquid crystal molecules 71a disposed in the liquid crystal layer 71 are aligned to form a vertical state as shown in FIG. 13B. Meanwhile, when the viewer views the LCD 60 from the azimuth angle of 0 or 180 degrees in a squint direction, the retardation Δnd, provided by the viewing-angle-adjusting devices 24, is not equal to 0, the viewing-angle-adjusting device 24 will change the polarization state of the light passing through the LCD panel 23 so that the viewer cannot view the frame displayed on the LCD panel 23 when viewing the LCD 60 in a squint direction from the azimuth angles of 0 or 180 degrees. However, the polarization state of the light passing through the viewing-angle-adjusting device 64 will not be changed by the viewing-angle-adjusting device 64, and the LCD 60 is at a first narrow-viewing-angle mode according to the narrow-viewing-angle-mode signal.

As shown in FIG. 3A and FIG. 134A, when no voltage is applied between the first electrode 29a and the second electrode 29b and before a third voltage V3 is applied between the third electrode 69a and the fourth electrode 69b, the liquid crystal molecules 71a disposed on the liquid crystal layer 71 tilt along the third rubbing direction 62a and are aligned to form a second sloping state as shown in FIG. 16B while the liquid crystal molecules 31a of the liquid crystal layer 31 are aligned to form a vertical state as shown in FIG. 3B. Meanwhile, the retardation Δnd, provided by the viewing-angle-adjusting device 64 when the viewer views the LCD 60 in a squint direction from the azimuth angles of 90 or 270 degrees, is not equal to 0, and the polarization state of the light passing through the viewing-angle-adjusting device 64 will be changed by the viewing-angle-adjusting device 64, so that the viewer cannot see the frame displayed on the LCD panel 23 from the azimuth angle of 90 or 270 degrees when viewing the LCD 60 in a squint direction. The viewing-angle-adjusting device 24 does not change the polarization state of the light passing through the LCD panel 23, and the LCD 60 is at a second narrow-viewing-angle mode according to the narrow-viewing-angle-mode signal.

Figure 14A:
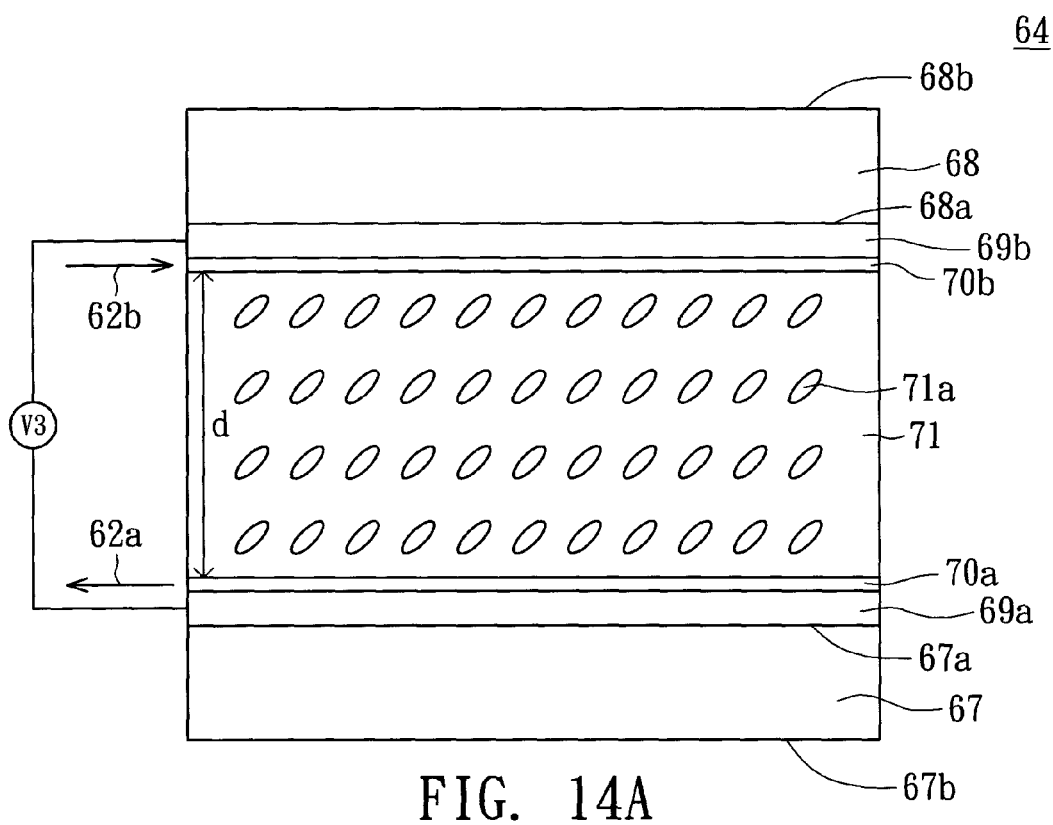
FIG. 14A is a cross-sectional view of the liquid crystal molecules disposed on the viewing-angle-adjusting device having a third alignment film in FIG. 12 are at a sloping state.
Figure 14B:
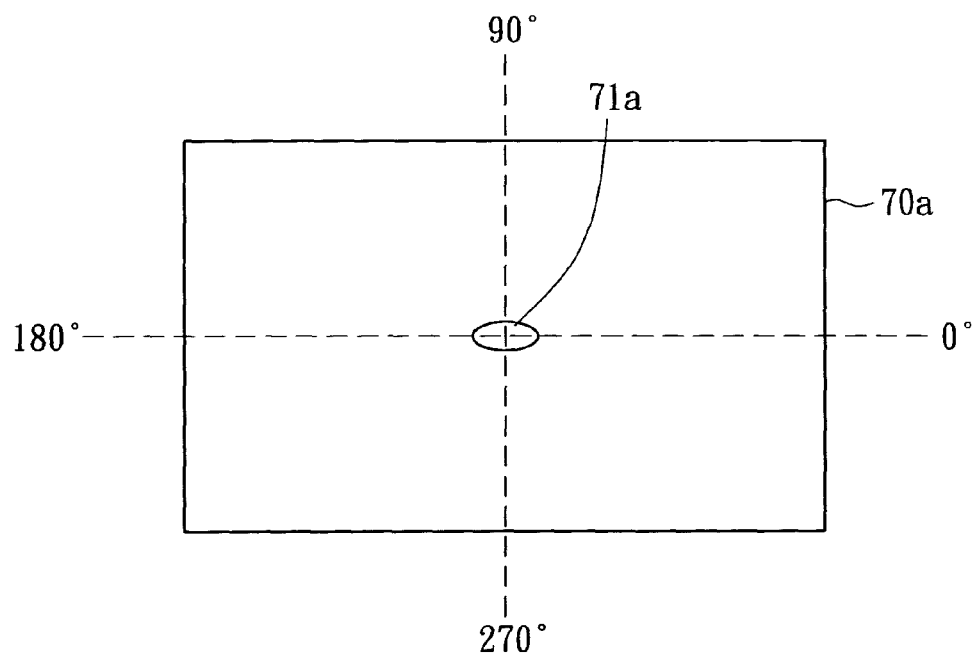
FIG. 14B is a top view when a liquid crystal molecule disposed on the viewing-angle-adjusting device in FIG. 14A tilts towards the azimuth angle of 0 degree on a third alignment film.

As shown in FIG. 4A and FIG. 14A, when the first voltage V1 is applied between the first electrode 29a and the second electrode 29b and when the third the voltage V3 is applied between the third electrode 69a and the fourth electrode 69b, the liquid crystal molecules 31a in the liquid crystal layer 31 tilt along the first rubbing direction 32a and are aligned to form a first sloping state as shown in FIG. 4B. Moreover, the liquid crystal molecules 71a disposed on the liquid crystal layer 71 tilt along the third rubbing direction 62a and are aligned to form a second sloping state as shown in FIG. 14B. Meanwhile, the retardation Δnd, provided by the viewing-angle-adjusting device 24 when the viewer views the LCD 60 in a squint direction from the azimuth angle of about 0 or 180 degrees, is not equal to 0, and the viewing-angle-adjusting device 24 will change the polarization state of the light passing through the LCD panel 23. Moreover, the retardation Δnd, provided by the viewing-angle-adjusting device 64 when the viewer views the LCD 60 in a squint direction from the azimuth angle of about 90 or 270 degrees, is not equal to 0, and the polarization state of the light passing through the viewing-angle-adjusting device 64 will be changed by the viewing-angle-adjusting device 64. Therefore, the viewer cannot see the frame displayed on the LCD panel 23 from the azimuth angles of about 0, 90, 180 and 270 degrees when viewing the LCD 60 in a squint direction, wherein the LCD 60 is at a third narrow-viewing-angle mode according to the narrow-viewing-angle-mode signal.

Figure 15A:
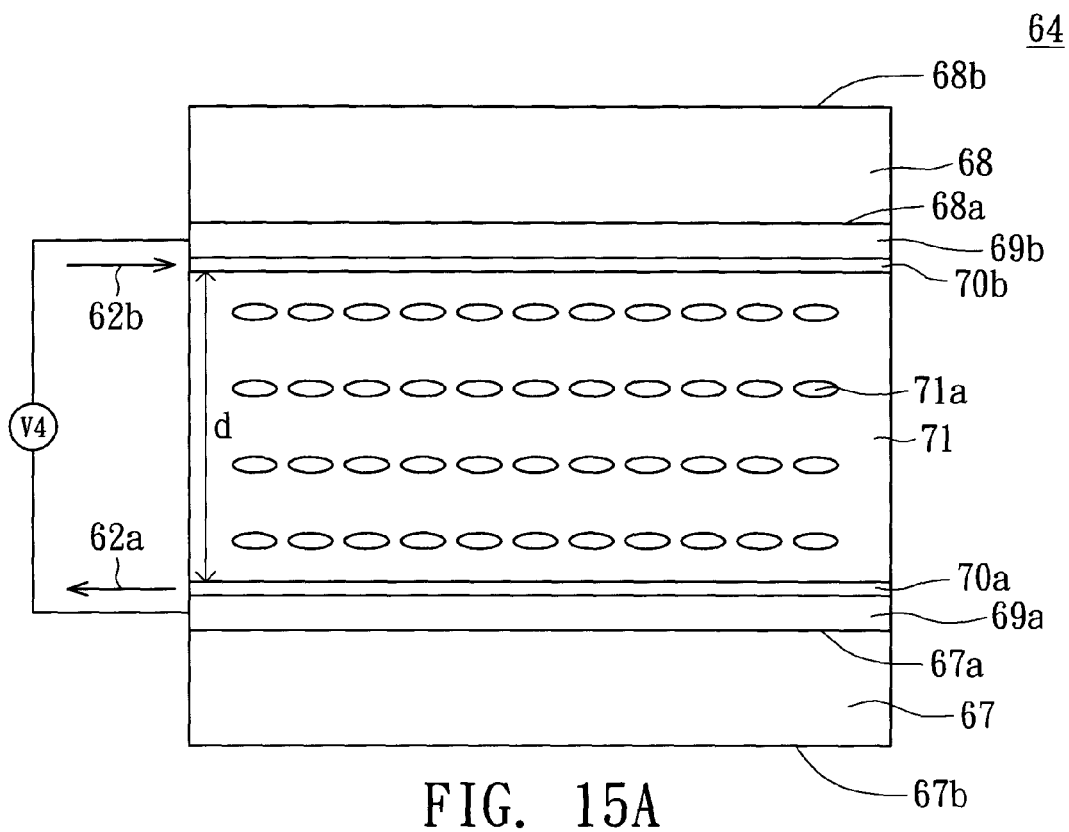
FIG. 15A is a cross-sectional view of the liquid crystal molecules disposed on the viewing-angle-adjusting device having a third alignment film in FIG. 12 are at a flat state.
Figure 15B:
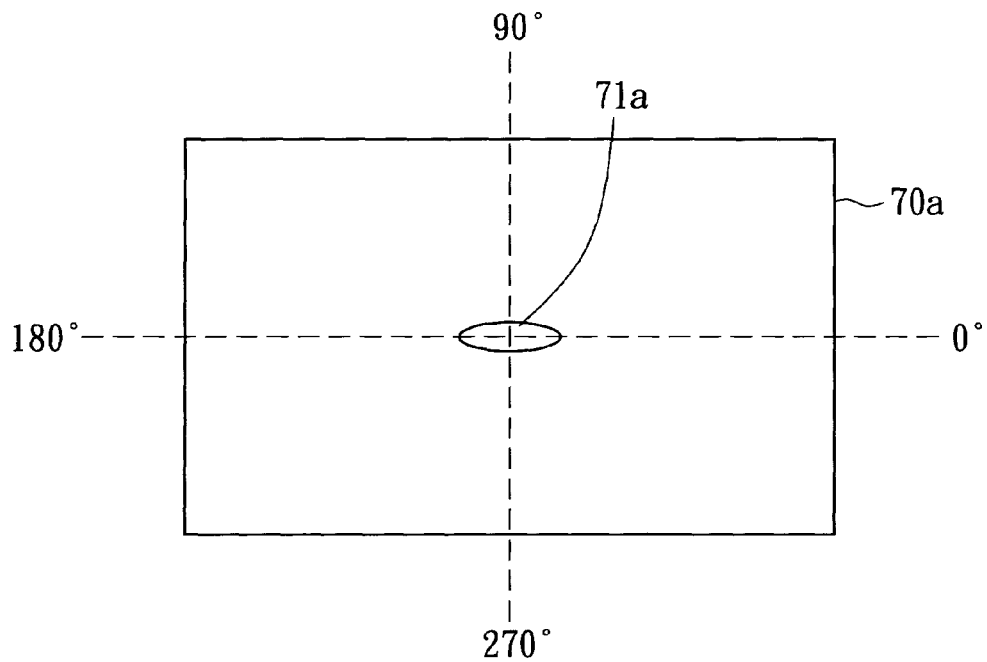
FIG. 15B is a top view when a liquid crystal molecule disposed on the viewing-angle-adjusting device in FIG. 15A lies flat towards the azimuth angle of 0 degree on a third alignment film.

As shown in FIG. 5A and FIG. 15A, when the second voltage V2 is applied between the first electrode 29a and the second electrode 29b and when a fourth voltage V4 is applied to between the third electrode 69a and the fourth electrode 69b, the liquid crystal molecules 31a in the liquid crystal layer 31 tilt along the first rubbing direction 32a towards the azimuth angle of 90 degrees and are aligned to form a first flat state as shown in FIG. 5B. Moreover, the liquid crystal molecules 71a disposed in the liquid crystal layer 71 tilt along the third rubbing direction 62a towards the azimuth angle of 0 degree and are aligned to form a second flat state as shown in FIG. 15B. Meanwhile, the retardation Δnd, provided by the viewing-angle-adjusting devices 24 and 64 when the viewer views the LCD 60 from the front in a squint direction, is equal to 0. This means the polarization state of the light passing through the viewing-angle-adjusting devices 24 and 64 will not be changed by the viewing-angle-adjusting device 24 and 64, so that the LCD 60 is at a second wide-viewing-angle mode according to the wide-viewing-angle-mode signal.

When the LC layers 31 and 71 are in the flat or vertical state, the LCD 60 is at a wide-viewing-angle mode according to the wide-viewing-angle-mode signal. When at least one of the LC layers 31 and 71 is in the sloping state, the LCD 60 is at a narrow-viewing-angle mode according to the narrow-viewing-angle-mode signal.

When the saturation voltage of the liquid crystal layer 71 equals to $V_{sat}$, V4 is larger than $V_{sat}$, V3 substantially equals to about $0.5V_{sat} \sim 0.8V_{sat}$, preferably, V3 equals to about $0.7V_{sat}$. In the present preferred embodiment, the third voltage V3 and the fourth voltage V4 are respectively equal to about 2.5 V and 5 V. Preferably, if the fourth voltage V4 equals to the saturated voltage of the liquid crystal layer 71, the V3 is approximately equal to about 0.7 V4. However, anyone who is familiar with the technology of the invention will understand that the technology of the invention is not limited thereto. For example, a first compensation film can be disposed between the first polarizer 22 and the viewing-angle-adjusting device 64 while a second compensation film can be disposed between the second polarizer 25 and the viewing-angle-adjusting device 24.

Although the orientation characteristic of the liquid crystal molecules 71a in the liquid crystal layer 71 under the change of the electrical field are mentioned in the foregoing description of the present embodiment, other kind of liquid crystal has different orientation characteristic under the change of the electrical field. For example, when no voltage is applied between the first electrode 69a and the second electrode 69b, the LC molecules in the LC layer are arranged in a flat state. When a seventh voltage is applied between the first electrode 69a and the second electrode 69b, the LC molecules in the LC layer are arranged along the third rubbing direction 62a in a sloping state. When a eighth voltage is applied between the first electrode 69a and the second electrode 69b, the LC molecules in the LC layer are arranged in a perpendicular state. The seventh voltage is smaller than the eighth voltage.

When the LC molecules between the first alignment region 112a and the third alignment region 113a are in the flat or vertical state, the LCD is at a wide-viewing-angle mode. When the LC molecules between the first alignment region 112a and the third alignment region 113a are in the sloping state, the LCD is at a narrow-viewing-angle mode.

Figure 15C:
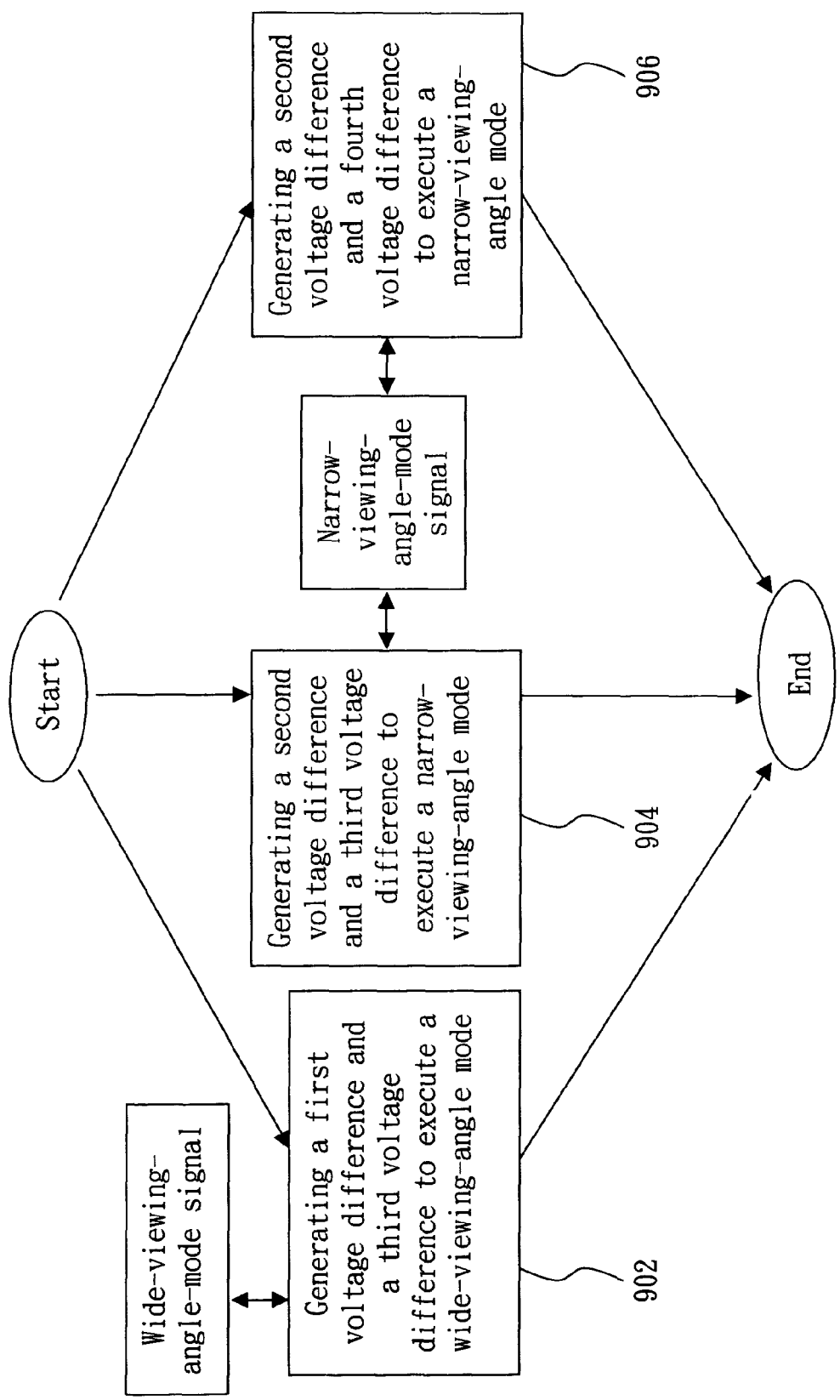
FIG. 15C is a flowchart of a method of driving the LCD with the viewing-angle-adjusting devices.

Any skilled in the art knows that the technology of the present embodiment is no limited thereto. For example, the invention provides a method of driving an LCD including a first viewing-angle-adjusting device and a second viewing-angle-adjusting device. Referring to FIG. 15C, a flowchart of a method of driving the LCD with the viewing-angle-adjusting devices is shown. The first viewing-angle-adjusting device and the second viewing-angle-adjusting device have a saturation voltage $V_{sat}$ of liquid crystal. In step 902, a wideviewing-angle mode is executed according to the wide-viewing-angle-mode signal. The first viewing-angle-adjusting device and the second viewing-angle-adjusting device generate a first voltage difference and a third voltage difference, respectively. That is to say, the two LC layers are sandwished by the first voltage difference and the second voltage difference. In other word, a first voltage difference and a third voltage difference are generated to execute a wide-viewing-angle mode according to a wide-viewing-angle signal. The first voltage difference and the third voltage difference equal to 0 or are larger than $V_{sat}$. In step 904, a narrow-viewing-angle mode is executed according to the narrow-viewing-angle-mode signal. The first viewing-angle-adjusting device and the second viewing-angle-adjusting device generate a second voltage difference and the third voltage difference, respectively. That is to say, the two LC layers are sandwished by the second voltage difference and the third voltage difference, respectively. In other word, a second voltage difference and a third voltage difference are generated to execute a narrow-viewing-angle mode according to a narrow-viewing-angle signal. The second voltage difference is larger than about $0.5 V_{sat}$, but smaller than about $0.8 V_{sat}$. Preferably, The second voltage difference equals to about $0.7 V_{sat}$. In step 906, a narrow-viewing-angle mode is executed according to the narrow-viewing-angle-mode signal. The first viewing-angle-adjusting device and the second viewing-angle-adjusting device generate the second voltage difference and a fourth voltage difference, respectively. That is to say, the two LC layers are sandwished by the second voltage difference and the fourth voltage difference, respectively. In other word, a second voltage difference and a fourth voltage difference are generated to execute a narrow-viewing-angle mode according to a narrow-viewing-angle signal. The fourth voltage difference is larger than $0.5 V_{sat}$, but smaller than $0.8 V_{sat}$. Preferably, The fourth voltage difference equals to $0.7 V_{sat}$.

Fifth Preferred Embodiment

Figure 16:
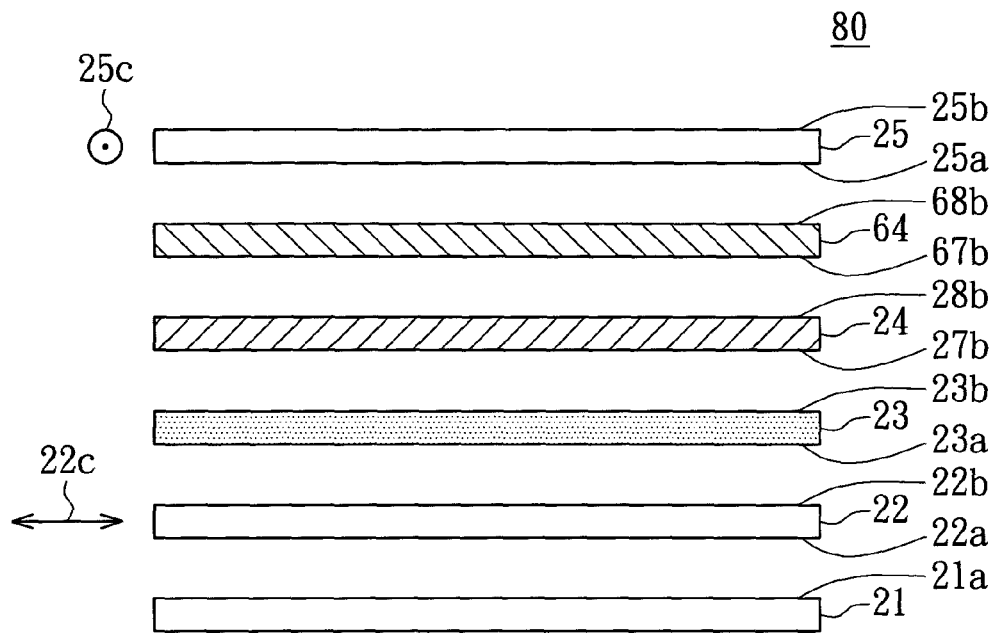
FIG. 16 is a side view of the LCD with adjustable-viewing-angle according to the fifth preferred embodiment of the invention.

Referring to FIG. 16, a side view of the LCD with adjustable-viewing-angle according to the fifth preferred embodiment of the invention is shown. The LCD 80 in the present preferred embodiment differs with the LCD 60 in the fourth preferred embodiment in that the viewing-angle-adjusting device 64 is positioned between the viewing-angle-adjusting device 24 and the second polarizer 25. The viewing-angle-adjusting device 64 is disposed on the fourth substrate surface 28b with the sixth substrate surface 67b facing the fourth substrate surface 28b while the second polarizer 25 is disposed on the eighth substrate surface 68b with the fifth surface 25a facing the eighth substrate surface 68b. However, anyone who is familiar with the technology of the invention will understand that the technology of the invention is not limited thereto. For example, a first compensation film can be disposed between the first polarizer 22 and the LCD panel 23, and a second compensation film can be disposed between the second polarizer 25 and the viewing-angle-adjusting device 64.

Sixth Preferred Embodiment

Figure 17:
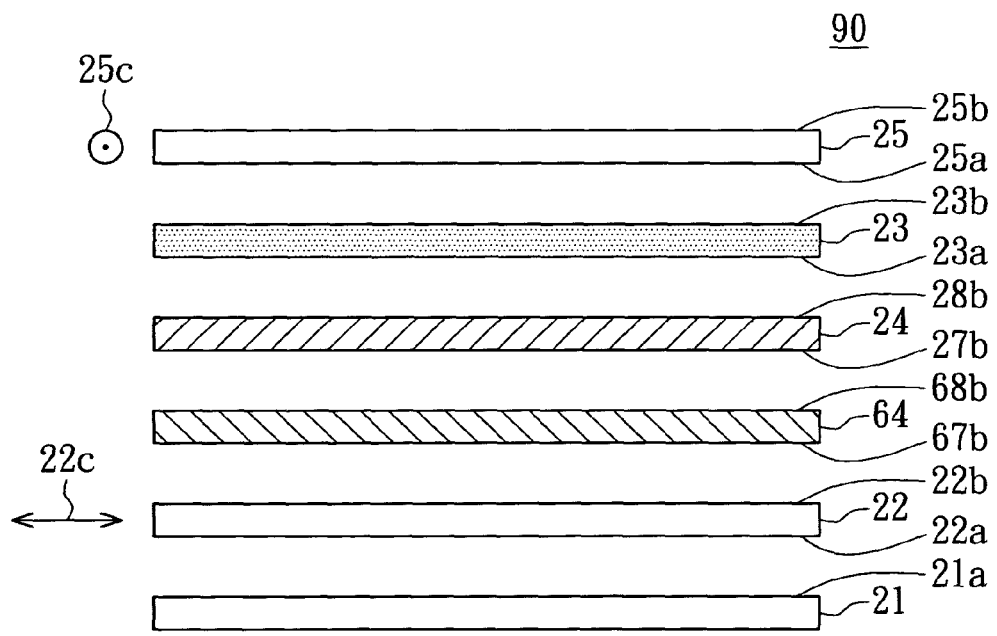
FIG. 17 is a side view of the LCD with adjustable-viewing-angle according to the sixth preferred embodiment of the invention.

Referring to FIG. 17, a side view of the LCD with adjustable-viewing-angle according to the sixth preferred embodiment of the invention is shown. The LCD 90 in the present preferred embodiment differs with the LCD 60 in the fourth preferred embodiment in that the viewing-angle-adjusting device 24 is positioned between the viewing-angle-adjusting device 64 and the LCD panel 23, the viewing-angle-adjusting device 24 is disposed on the eighth substrate surface 68b with the second substrate surface 27b facing the eighth substrate surface 68b, and the LCD panel 23 is disposed on the fourth substrate surface 28b with the third surface 23a facing the fourth substrate surface 28b. However, anyone who is familiar with the technology of the invention will understand that the technology of the invention is not limited thereto. For example, a first compensation film can be disposed between the first polarizer 22 and the viewing-angle-adjusting device 64, and a second compensation film can be disposed between the second polarizer 25 and the LCD panel 23.

Seventh Preferred Embodiment

Figure 18:
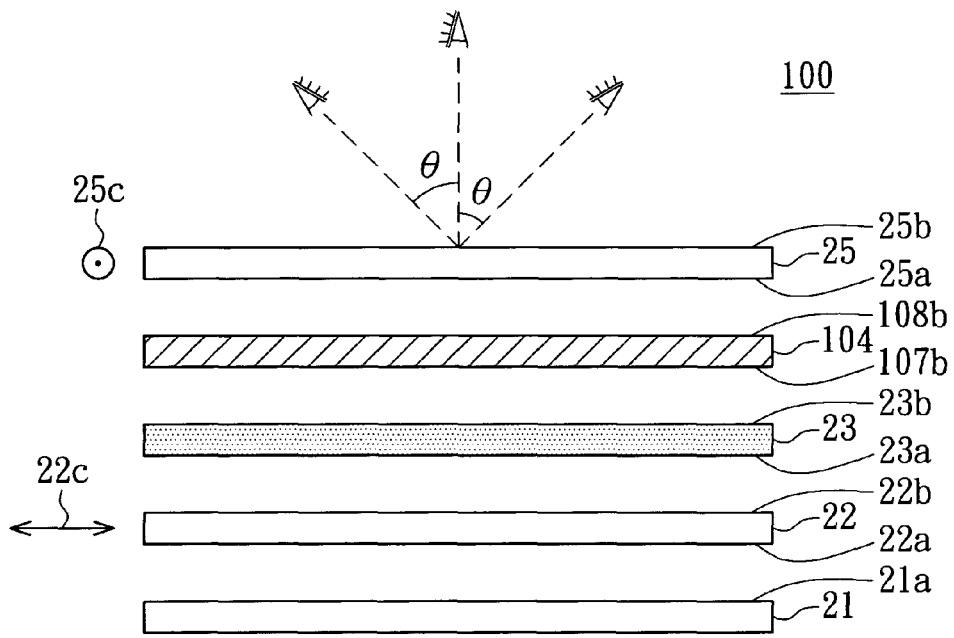
FIG. 18 is a side view of the LCD with adjustable-viewing-angle according to the seventh preferred embodiment of the invention.
Figure 19A:
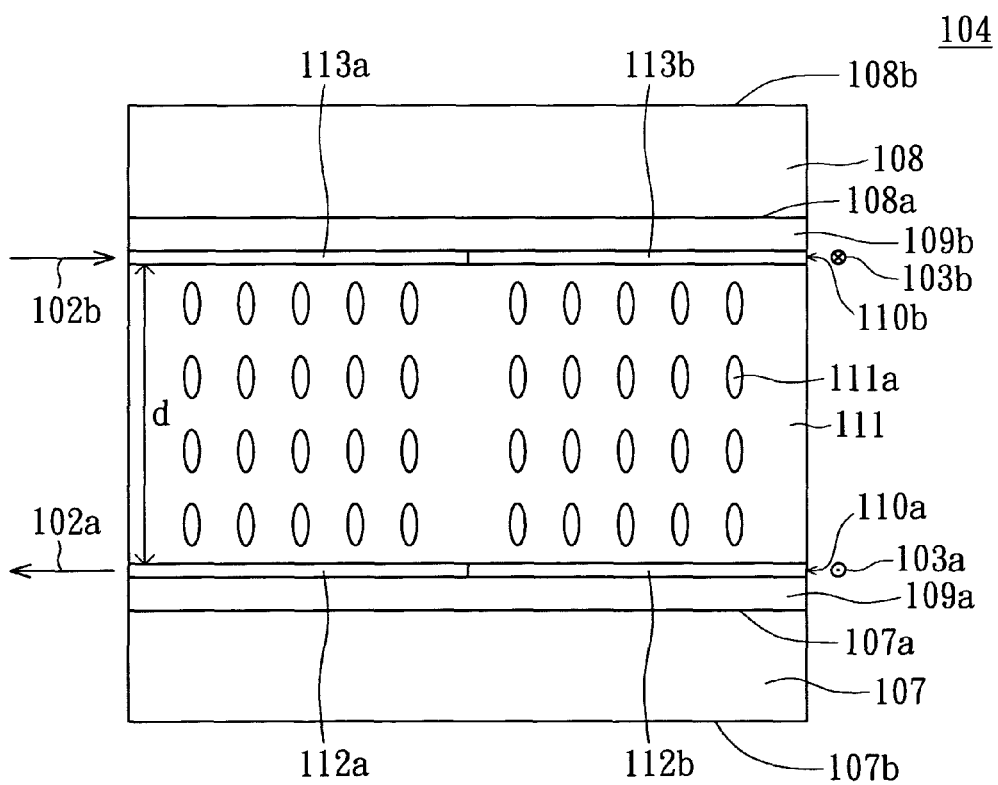
FIG. 19A is a cross-sectional view when the liquid crystal molecules disposed on the viewing-angle-adjusting device in FIG. 18 are at a vertical state.
Figure 19B:
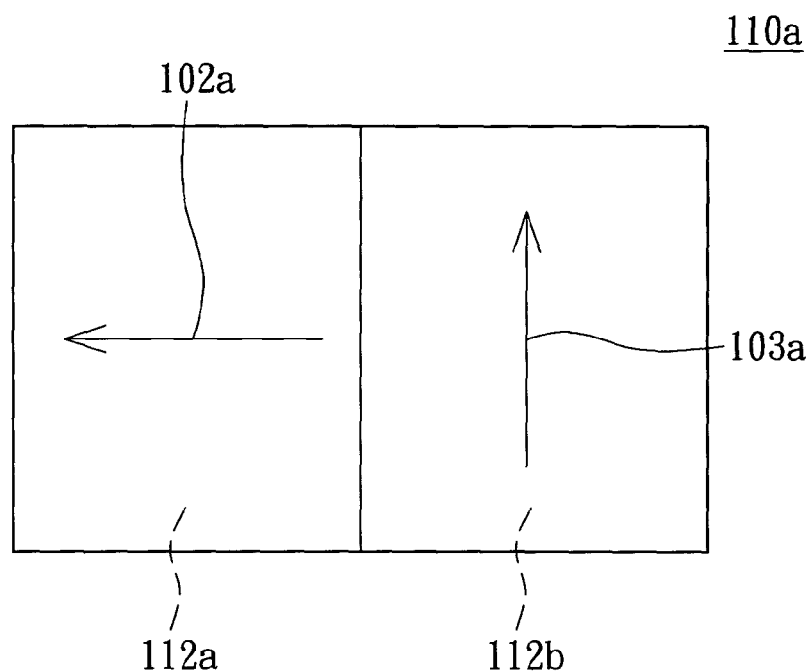
FIG. 19B is a top view of two mutual perpendicular rubbing directions and a first alignment film in FIG. 18.
Figure 19C:
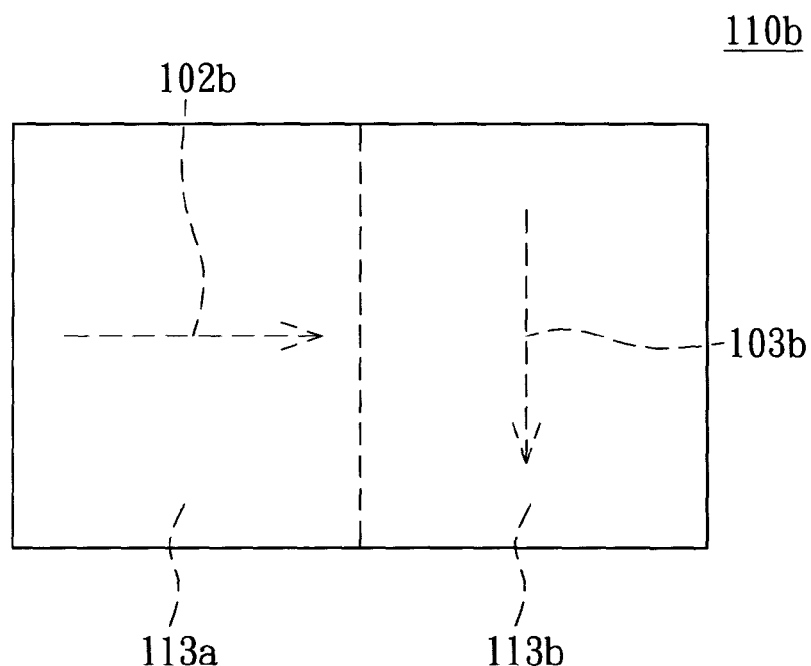
FIG. 19C is a top view of two mutual perpendicular rubbing directions and a second alignment film in FIG. 18.
Figure 19D:
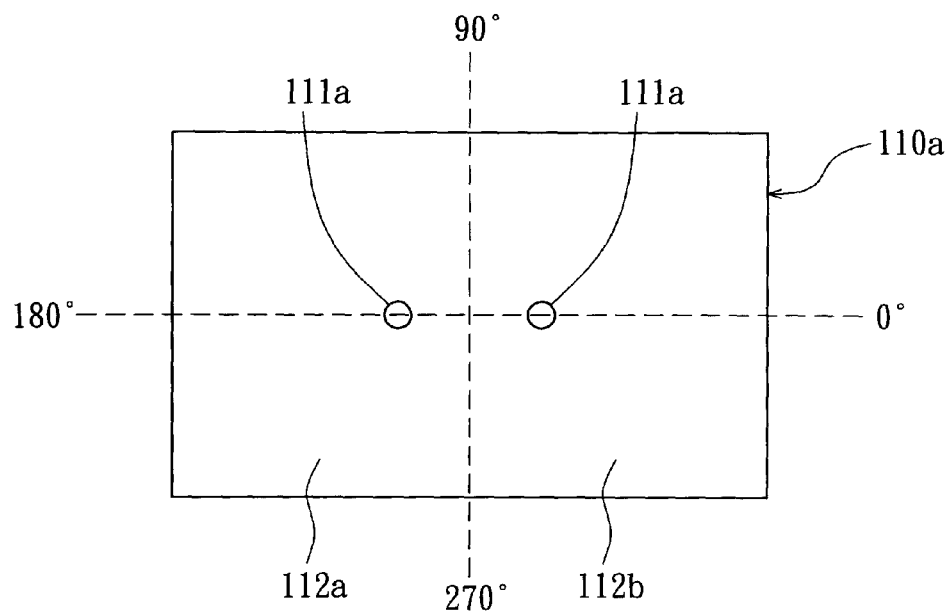
FIG. 19D is a top view when two liquid crystal molecules disposed on the viewing-angle-adjusting device in FIG. 19A respectively stand on a first alignment region and a second alignment region.

Referring to FIG. 18, a side view of the LCD with adjustable-viewing-angle according to the seventh preferred embodiment of the invention is shown. The LCD 100 in the present preferred embodiment differs with the LCD 20 in the first preferred embodiment in the design of the viewing-angle-adjusting device 104, wherein the viewing-angle-adjusting device 104 is disposed between the LCD panel 23 and the second polarizer 25. As shown in FIG. 19A, the viewing-angle-adjusting device 104 comprises a first substrate 107, a second substrate 108, a first electrode 109a, a second electrode 109b, a first alignment film 110a, a second alignment film 110b and a liquid crystal layer 111. The first substrate 107 has a first substrate surface 107a and a second substrate surface 107b corresponding to each other, wherein the second substrate surface 107b faces the fourth surface 23b in FIG. 18. The first electrode 109a is disposed on the first substrate surface 107a while the first alignment film 110a is disposed on the first electrode 109a. The first alignment film 110a has at least a first alignment region 112a and a second alignment region 112b, wherein the first alignment region 112a and the second alignment region 112b respectively have a first rubbing direction 102a and a second rubbing direction 103a. The first rubbing direction 102a is parallel to or perpendicular to the extending direction 22c of the first light transmission axis while the second rubbing direction 103a is perpendicular to the second rubbing direction 102a as shown in FIG. 19B. In the present preferred embodiment, the first rubbing direction 102a is parallel to the extending direction 22c of the first light transmission axis. The second substrate 108 has a third substrate surface 108a and a fourth substrate surface 108b corresponding to each other, wherein the third substrate surface 108a and the fourth substrate surface 108b respectively face the first substrate surface 107a and the fifth surface 25a in FIG. 18. The second electrode 109b is disposed on the third substrate surface 108a. The second alignment film 110b is disposed on the second electrode 109b and has at least a third alignment region 113a and a fourth alignment region 113b. The third alignment region 113a and the fourth alignment region 113b respectively correspond to the first alignment region 112a and the second alignment region 112b, and respectively have a third rubbing direction 102b and a fourth rubbing direction 103b, wherein the third rubbing direction 102b and the fourth rubbing direction 103b are respectively opposite to the first rubbing direction 102a and the second rubbing direction 103a as shown in FIG. 19C. The liquid crystal layer 111, sealed between the first substrate 107 and the second substrate 108 and positioned between the first alignment film 110a and the second alignment film 110b, has a number of the liquid crystal molecules 111a, wherein the thickness of the liquid crystal layer 111 is assumed to d. As shown in FIG. 19D, in the present preferred embodiment, provided that the first rubbing direction 102a shifts from the azimuth angle of 90 degrees towards the azimuth angle of about 270 degrees and that the second rubbing direction 103a shifts from the azimuth angle of about 0 degree towards the azimuth angle of about 180 degrees, the third rubbing direction 102b will shift from the azimuth angle of about 270 degrees towards the azimuth angle of about 90 degrees and that the fourth rubbing direction 103b will shift from the azimuth angle of about 180 degrees towards the azimuth angle of about 0 degree.

As shown in FIG. 19A, when no voltage is applied between the first electrode 109a and the second electrode 109b, the liquid crystal molecules 111a in the liquid crystal layer 111 are aligned to form a vertical state as shown in FIG. 19D. Meanwhile, the retardation Δnd, provided by the viewing-angle-adjusting device 104 when the viewer views the LCD 100 from the front or in a squint direction, is equal to 0. This means the viewing-angle-adjusting device 104 does not change the polarization state of the light passing through the LCD panel 23, so that the LCD 100 is at a first wide-viewing-angle mode according to the wide-viewing-angle-mode signal.

Figure 20A:
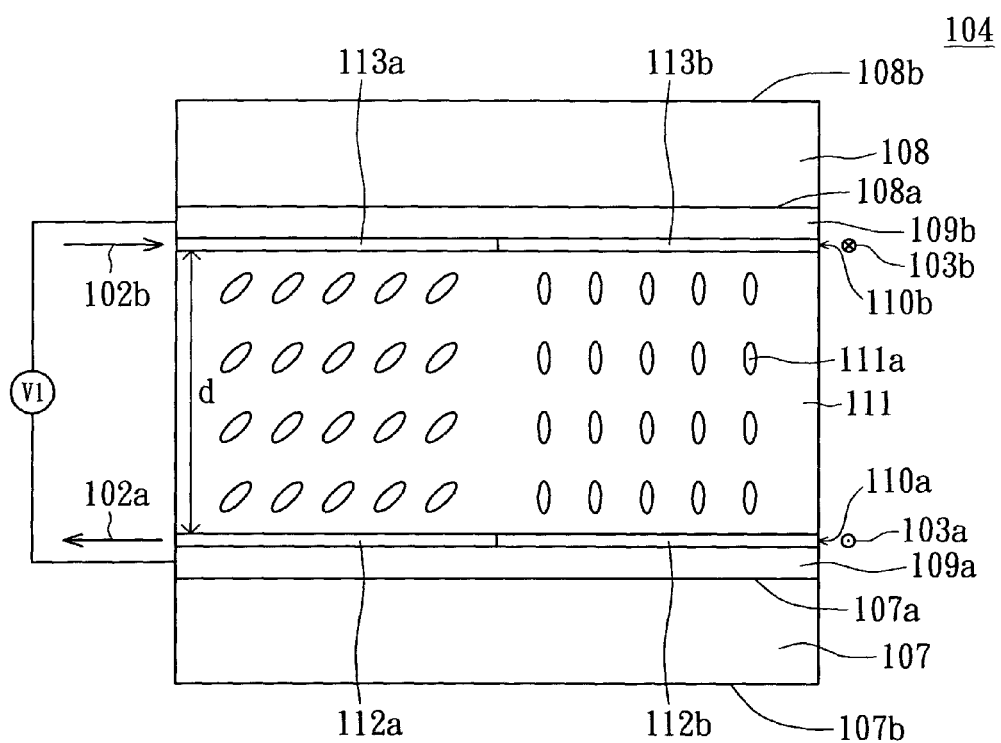
FIG. 20A is a cross-sectional view when the liquid crystal molecules disposed on the viewing-angle-adjusting device in FIG. 18 are at a sloping state.
Figure 20B:
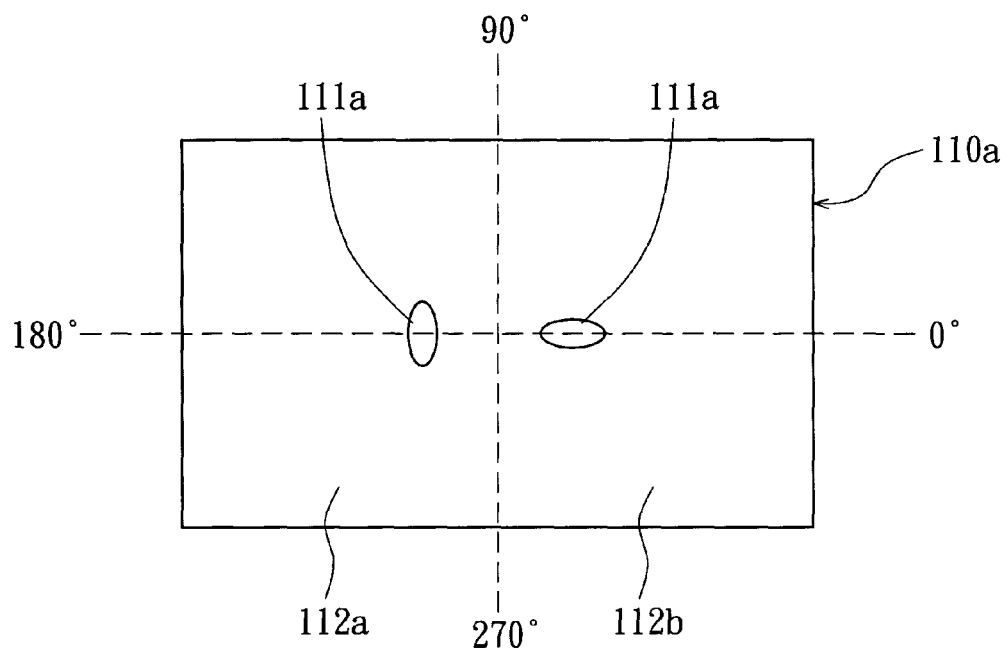
FIG. 20B is a top view when two liquid crystal molecules disposed on the viewing-angle-adjusting device in FIG. 20A respectively tilt on a first alignment region and a second alignment region.

As shown in FIG. 20A, when the first voltage V1 is applied between the first electrode 109a and the second electrode 109b, the liquid crystal molecules 111a of the part of the liquid crystal layer 111 positioned between the first alignment region 112a and the third alignment region 113a tilt along the first rubbing direction 102a towards the azimuth angle of 90 degrees and are aligned to form a first sloping state. Moreover, the liquid crystal molecules 111a of another part of the liquid crystal layer 111 positioned between the second alignment region 112b and the fourth alignment region 113b tilt along the second rubbing direction 103a towards the azimuth angle of about 0 degree and are aligned to form a second sloping state as shown in FIG. 20B. Meanwhile, the retardation Δnd, provided by the viewing-angle-adjusting device 104 when the viewer views the LCD 100 in a squint mode from the azimuth angles of about 0, 90, 180 and 270 degrees, is not equal to 0, and the viewing-angle-adjusting device 104 will change the polarization state of the light passing through the LCD panel 23, so the viewer cannot see the frame displayed on the LCD panel 23 from the azimuth angles of about 0, 90, 180 and 270 degrees when viewing the LCD 100 in a squint direction. Consequently, the LCD 100 is at a narrow-viewing-angle mode according to the narrow-viewing-angle-mode signal.

Figure 21A:
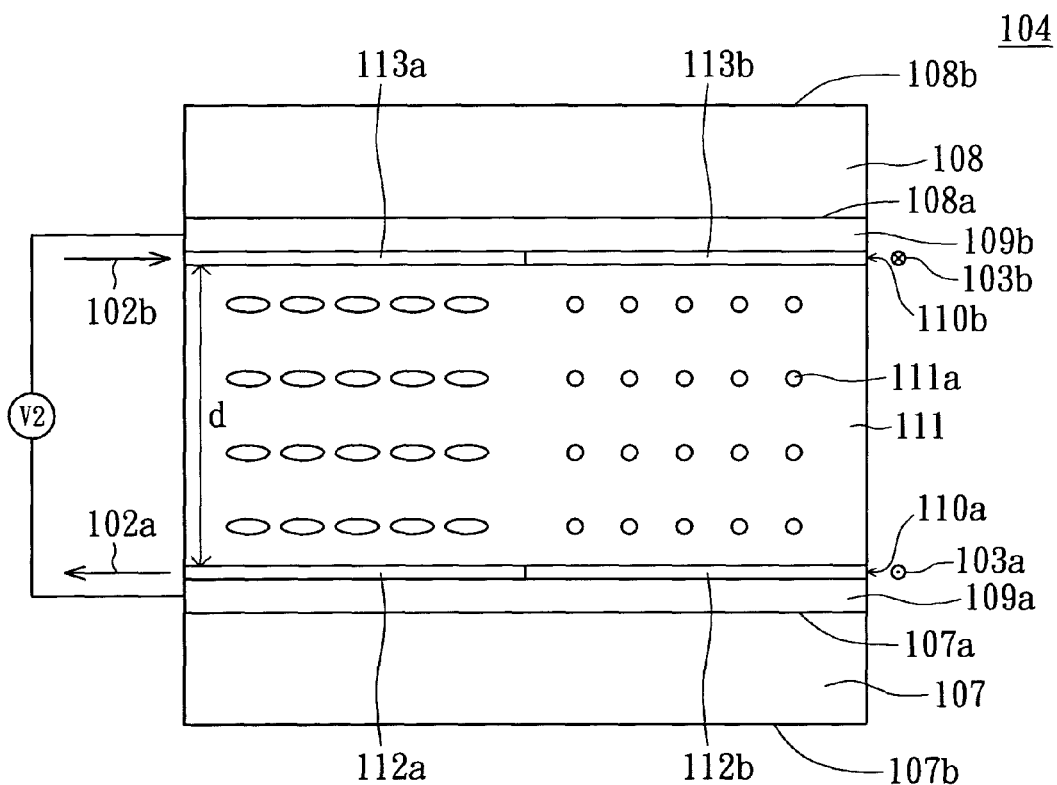
FIG. 21A is a cross-sectional view when the liquid crystal molecules disposed on the viewing-angle-adjusting device in FIG. 18 are at a flat state.
Figure 21B:
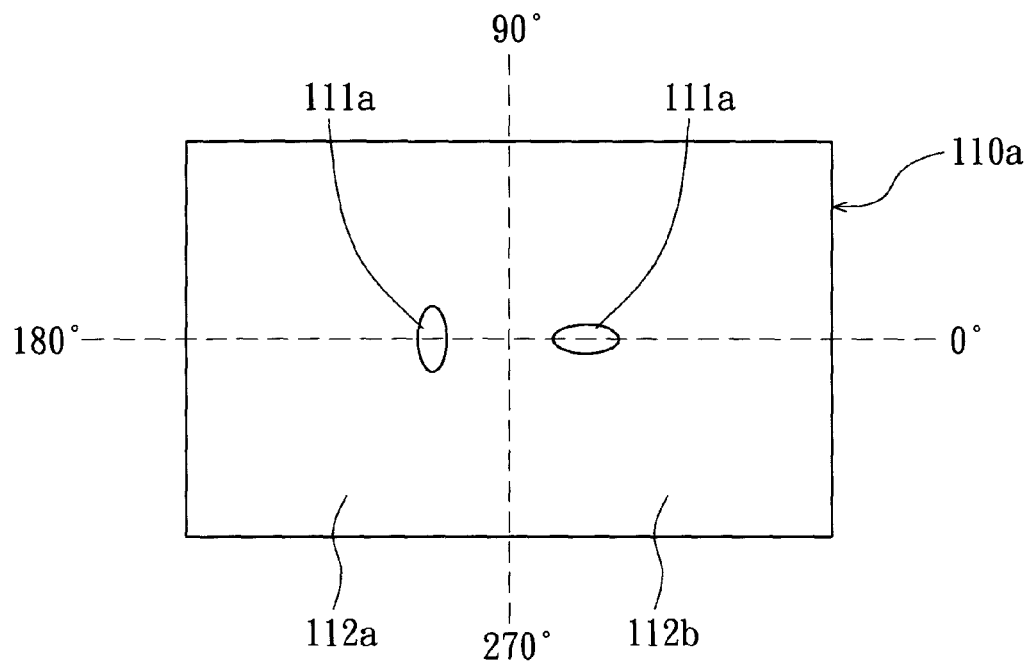
FIG. 21B is a top view when two liquid crystal molecules disposed on the viewing-angle-adjusting device in FIG. 21A respectively lie flat on a first alignment region and a second alignment region.

As shown in FIG. 21A, when the second voltage V2 is applied between the first electrode 109a and the second electrode 109b, the liquid crystal molecules 111a of the part of the liquid crystal layer 111 positioned between the first alignment region 112a and the third alignment region 113a tilt along the first rubbing direction 102a towards the azimuth angle of about 90 degrees and are aligned to form a first flat state. Moreover, the liquid crystal molecules 111a in another part of the liquid crystal layer 111 positioned between the second alignment region 112b and the fourth alignment region 113b tilt along the second rubbing direction 103a towards the azimuth angle of about 0 degrees and are aligned to form a second flat state as shown in FIG. 21B. Meanwhile, the retardation Δnd, provided by the viewing-angle-adjusting device 104 when the viewer views the LCD 100 from the front or in a squint direction, is equal to 0. This means the viewing-angle-adjusting device 104 does not change the polarization state of the light passing through the LCD panel 23, so the LCD 100 is at a second wide-viewing-angle mode according to the wide-viewing-angle-mode signal.

When the saturation voltage of the liquid crystal layer 111 equals to $V_{sat}$, V2 is larger than $V_{sat}$, V1 substantially equals to about $0.5 V_{sat} \sim 0.8 V_{sat}$. Perfectly, V1 equals to about 0.7 $V_{sat}$. In the present preferred embodiment, the first voltage V1 and the second voltage V2 are respectively equal to about 2.5 V and 5 V. Preferably, if the second voltage V2 is equal to the saturated voltage of the liquid crystal layer 111, V1 is approximately equal to about 0.7 V2. However, anyone who is familiar with the technology of the invention will understand that the technology of the invention is not limited thereto. For example, a first compensation film can be disposed between the first polarizer 22 and the LCD panel 23, and a second compensation film can be disposed between the second polarizer 25 and the viewing-angle-adjusting device 104.

Although the orientation characteristic of the liquid crystal molecules 111a in the liquid crystal layer 111 under the change of the electrical field are mentioned in the foregoing description of the present embodiment, other kind of liquid crystal has different orientation characteristic under the change of the electrical field.

For example, when no voltage is applied between the first electrode 109a and the second electrode 109b, the LC molecules of the LC layer are arranged in a flat state.

When a ninth voltage is applied between the first electrode 109a and the second electrode 109b, part of the LC molecules of the LC layer between the first alignment region 112a and the third alignment region 113a are arranged along the first rubbing direction 102a in a first sloping state. Other part of the LC molecules in the LC layer between the second alignment region 112b and the fourth alignment region 113b are arranged along the second rubbing direction 103a in a second sloping state.

When a tenth voltage is applied between the first electrode 109a and the second electrode 109b, part of the LC molecules in the LC layer between the first alignment region 112a and the third alignment region 113a are arranged along the first rubbing direction 102a in a vertical state. Other part of the LC molecules in the LC layer between the second alignment region 112b and the fourth alignment region 113b are arranged along the second rubbing direction 103a in a vertical state. The ninth voltage is smaller that the tenth voltage.

Eighth Preferred Embodiment

Figure 22:
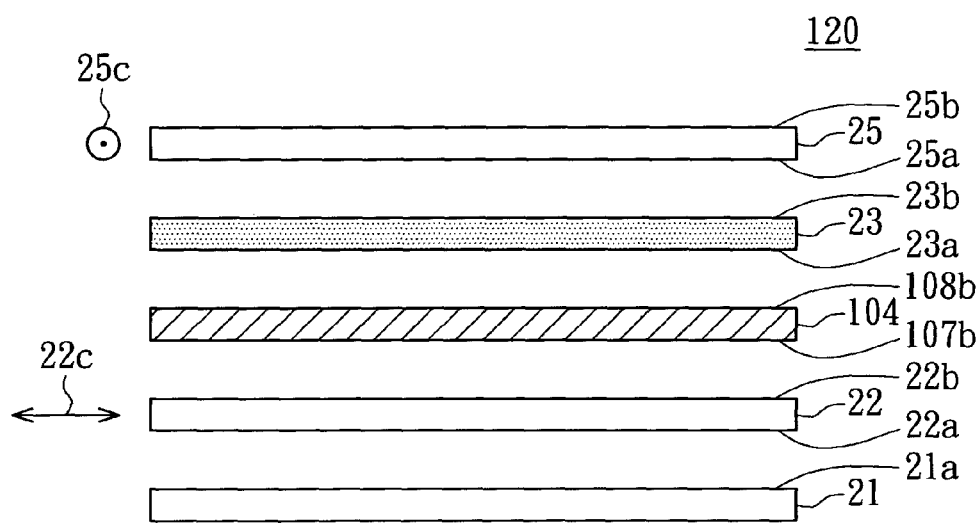
FIG. 22 is a side view of the LCD with adjustable-viewing-angle according to the eighth preferred embodiment of the invention.

Referring to FIG. 22, a side view of the LCD with adjustable view angle according to preferred embodiment eight of the invention is shown. The LCD 120 in the present preferred embodiment differs with the LCD 100 in the seventh preferred embodiment in that LCD panel 23 is positioned between the viewing-angle-adjusting device 104 and the second polarizer 25. The viewing-angle-adjusting device 104 is disposed on the second surface 22b with the second substrate surface 107b facing the second surface 22b. The LCD panel 23 is disposed on the fourth substrate surface 108b with the third surface 23a facing the fourth substrate surface 108b. The first polarizer 25 is disposed on the fourth surface 23b with the fifth surface 25a facing the fourth surface 23b. However, anyone who is familiar with the technology of the invention will understand that the technology of the invention is not limited thereto. For example, a first compensation film can be disposed between the first polarizer 22 and the viewing-angle-adjusting device 104, and a second compensation film can be disposed between the second polarizer 25 and the LCD panel 23.

Ninth Preferred Embodiment

Figure 23:
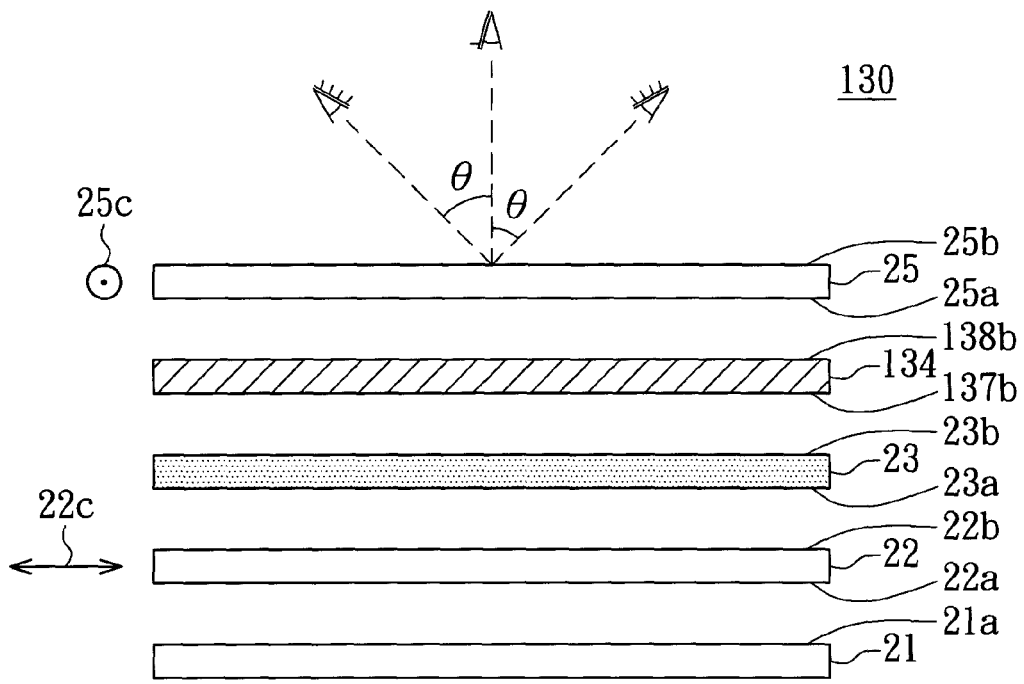
FIG. 23 is a side view of the LCD with adjustable-viewing-angle according to the ninth preferred embodiment of the invention.
Figure 24A:
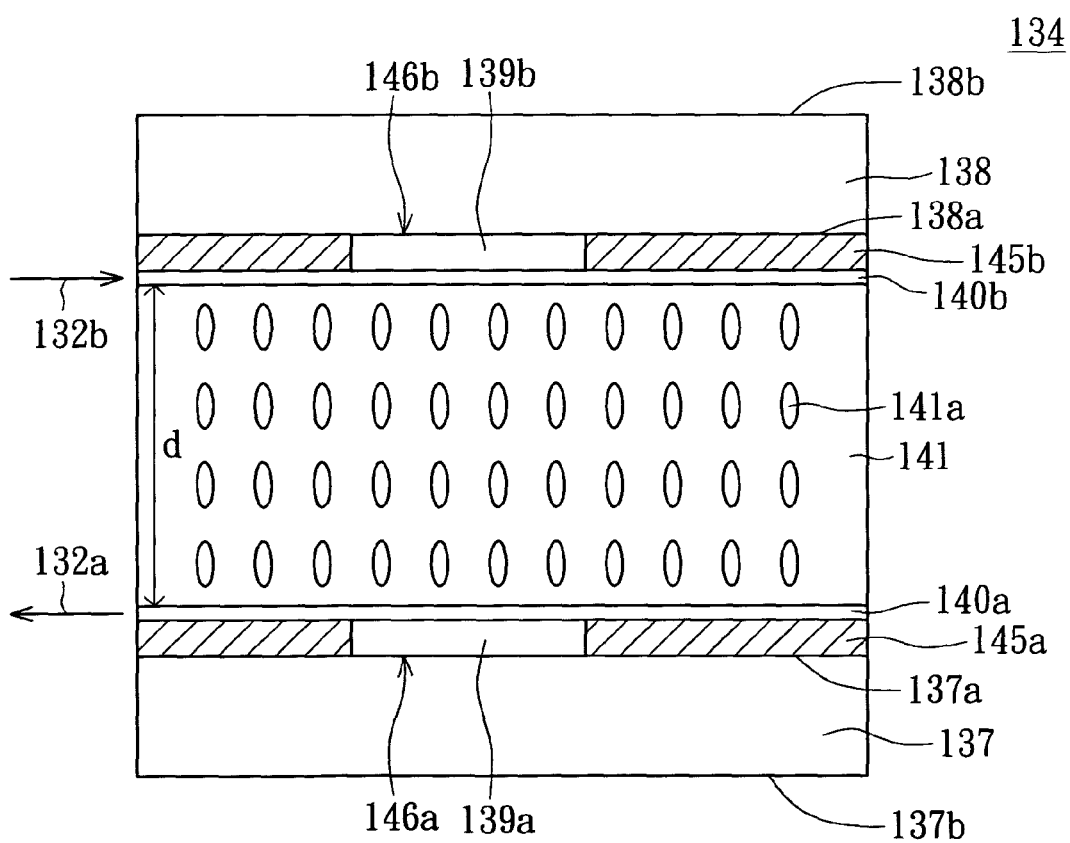
FIG. 24A is a cross-sectional view when the liquid crystal molecules disposed on the viewing-angle-adjusting device in FIG. 23 are at a vertical state.
Figure 24B:
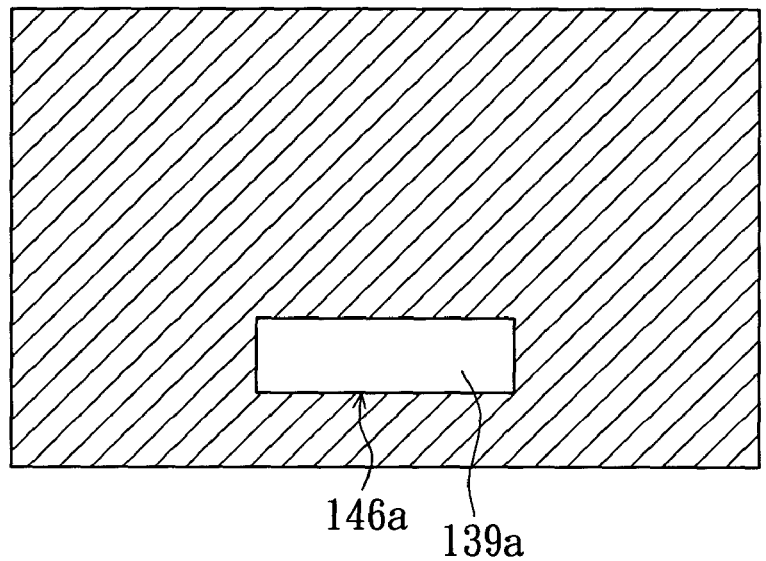
FIG. 24B is a top view of the first isolation layer and the first electrode in FIG. 23.
Figure 24C:
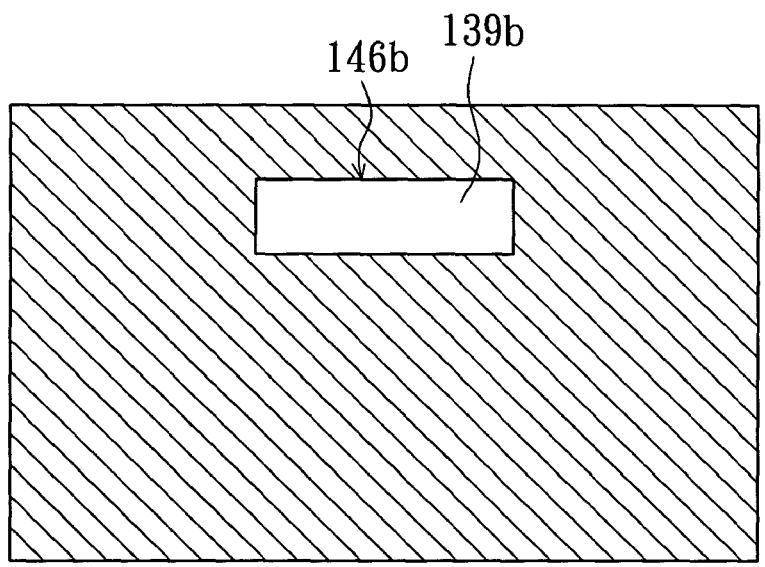
FIG. 24C is a bottom view of the second isolation layer and the second electrode in FIG. 23.
Figure 24D:
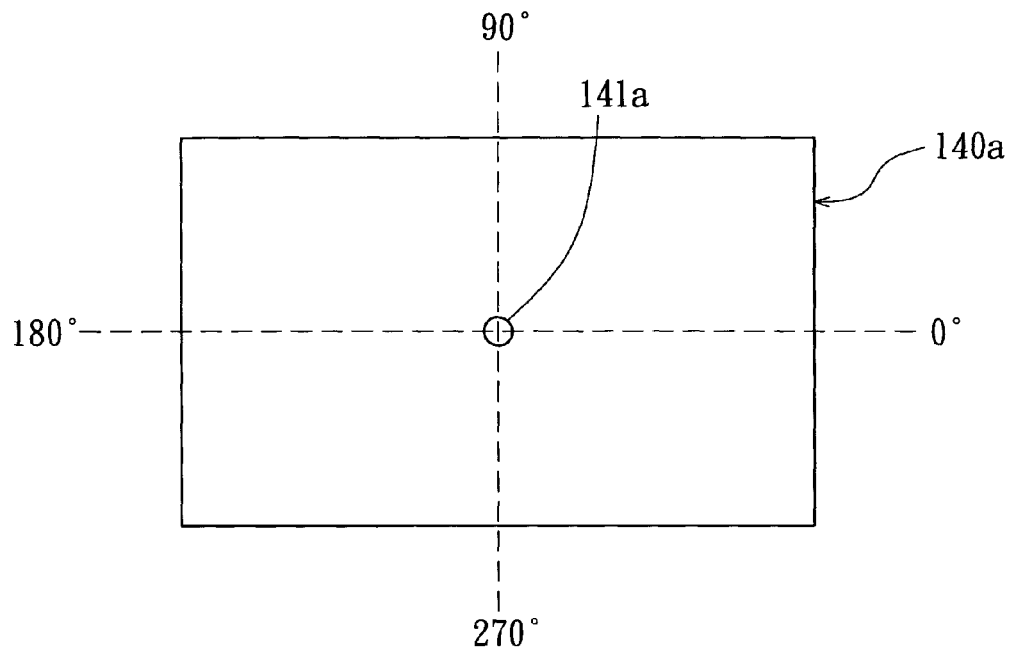
FIG. 24D is a top view when a liquid crystal molecule disposed on the viewing-angle-adjusting device in FIG. 24A with a first alignment film.

Referring to FIG. 23, a side view of the LCD with adjustable view angle according to the ninth preferred embodiment of the invention is shown. The LCD 130 in the present preferred embodiment differs with the LCD 20 in the first preferred embodiment in the design of the viewing-angle-adjusting device 134, wherein the viewing-angle-adjusting device 134 is disposed between the LCD panel 23 and the second polarizer 25. As shown in FIG. 24A, the viewing-angle-adjusting device 134 comprises a first substrate 137, a second substrate 138, a first isolation layer 145*a*, a second isolation layer 145*b*, a first electrode 139*a*, a second electrode 139*b*, a first alignment film 140*a*, a second alignment film 140*b* and a liquid crystal layer 141. The first substrate 137 has a first substrate surface 137*a* and a second substrate surface 137*b* corresponding to each other, wherein the second substrate surface 137*b* faces the fourth surface 23*b* in FIG. 23. The first isolation layer 145*a* is disposed on the first substrate surface 137*a* and has a first aperture 146*a* as shown in FIG. 24B. The first aperture 146*a* may be a text, a trademark or a logo. In the present preferred embodiment, the first aperture 146*a* is a squared shape for instance. The first electrode 139*a* is disposed in the first aperture 146*a*, wherein the shape of the first electrode 139*a* corresponds to the shape of the first aperture 146*a*. The first alignment film 140*a* is disposed on the first electrode 139*a* and the first isolation layer 145*a*, and has a first rubbing direction 132*a* parallel to or perpendicular to the extending direction 22*c* of the first light transmission axis. In the present preferred embodiment, the first rubbing direction 132*a* is parallel to the extending direction 22*c* of the first light transmission axis. The second substrate 138 has a third substrate surface 138*a* and a fourth substrate surface 138*b* corresponding to each other, wherein the third substrate surface 138*a* and the fourth substrate surface 138*b* respectively face the first substrate surface 137*a* and the fifth surface 25*a* in FIG. 23. The second isolation layer 145*b* is disposed on the third substrate surface 138*a* and has a second aperture 146*b* corresponding to the first aperture 146*a* as shown in FIG. 24C. In the present preferred embodiment, the second aperture 146*b* is a squared shape for instance. The second electrode 139*b* is disposed in the second aperture 146*b*, the shape of the second electrode 139*b* corresponds to the second aperture 146*b*, i.e., the shape of the second electrode 139*b* corresponds to that of the first electrode 139*a*. The second alignment film 140*b* is disposed on the second electrode 139*b* and the second isolation layer 145, and has a second rubbing direction 132*b* opposite to the first rubbing direction 132*a*. The liquid crystal layer 141, sealed between the first substrate 137 and the second substrate 138 and positioned between the first alignment film 140*a* and the second alignment film 140*b*, has a number of the liquid crystal molecules 141*a*, wherein the thickness of the liquid crystal layer 141 is assumed to d. As shown in FIG. 24D, first rubbing direction 132*a* shifts from the azimuth angle of 90 degrees towards the azimuth angle of 270 degrees, and the second rubbing direction 132*b* will shift from the azimuth angle of 270 degrees towards the azimuth angle of 90 degrees.

As shown in FIG. 24A, when no voltage is applied between the first electrode 139*a* and the second electrode 139*b*, the liquid crystal molecules 141*a* in the liquid crystal layer 141 are aligned to form a vertical state as shown in FIG. 26D. Meanwhile, the retardation Δnd, provided by the viewing-angle-adjusting device 134 when the viewer views the LCD 100 from the front or in a squint direction, is equal to 0. This means the viewing-angle-adjusting device 134 does not change the polarization state of the light passing through the LCD panel 23, so the LCD 130 is at a first wide-viewing-angle mode according to the wide-viewing-angle-mode signal.

Figure 25A:
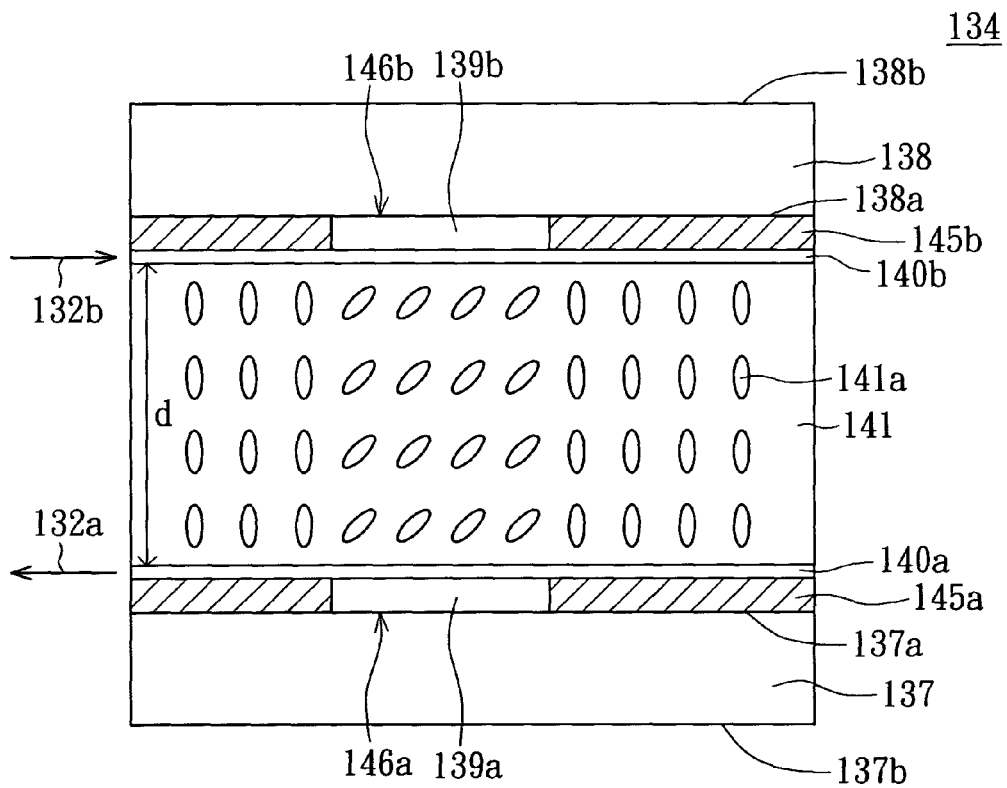
FIG. 25A is a cross-sectional view when the liquid crystal molecules disposed on the part of the liquid crystal layer positioned between the first electrode and the second electrode in FIG. 23 are at a sloping state.
Figure 25B:
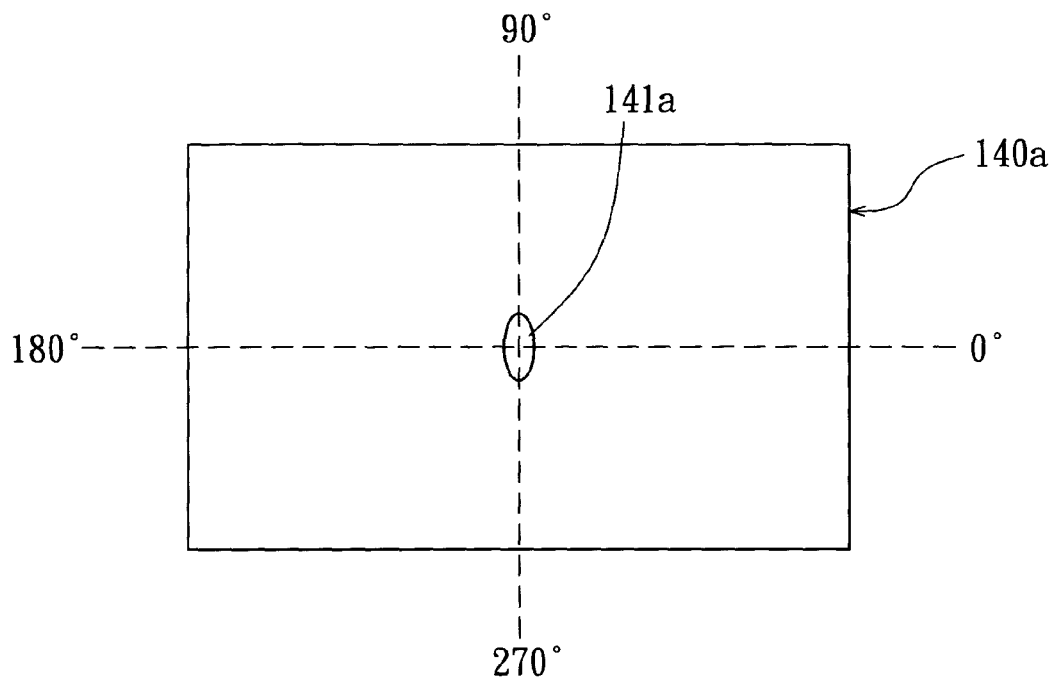
FIG. 25B is a top view when a liquid crystal molecule positioned between the first electrode and the second electrode in FIG. 25A tilts on a first alignment film.

As shown in FIG. 25A, when a first voltage is applied between the first electrode 139*a* and the second electrode 139*b*, the liquid crystal molecules 141*a* of the part of the liquid crystal layer 141 positioned between the first electrode 139*a* and the second electrode 139*b* tilt along the first rubbing direction 132*a* towards the azimuth angle of 90 degrees and are aligned to form a sloping state as shown in FIG. 25B. Meanwhile, the retardation Δnd, provided by the viewing-angle-adjusting device 134 when the viewer views the LCD 130 in a squint direction from the azimuth angles of about 0 and 180 degrees, is not equal to 0. This means the viewing-angle-adjusting device 134 will change the polarization state of the light passing through the LCD panel 23, so the viewer can see a blank region corresponding to the shape of the first electrode 139*a* in the frame displayed on the LCD panel 23 when viewing the LCD 130 in a squint direction from the azimuth angles of about 0 and 180 degrees. Therefore, the LCD 130 is at a narrow-viewing-angle mode, allowing the viewer to see the blank region corresponding to the shape of the first electrode 139*a*.

Figure 26A:
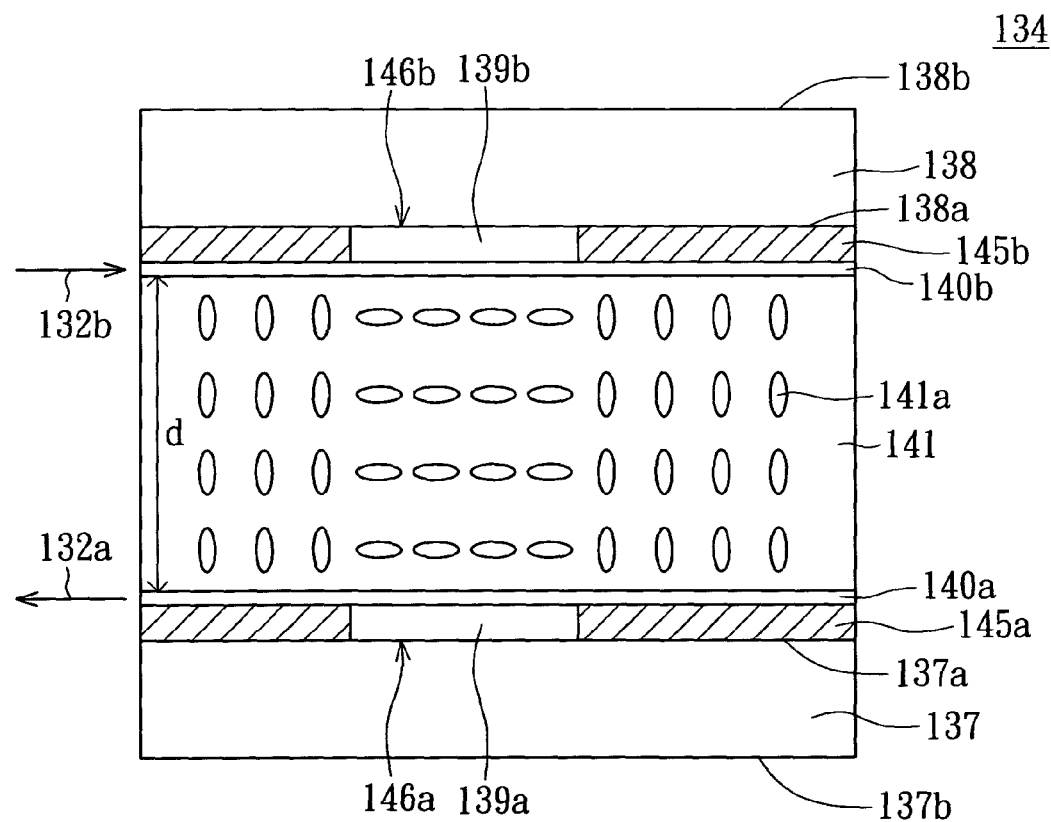
FIG. 26A is a cross-sectional view when the liquid crystal molecules disposed on the part of the liquid crystal layer positioned between the first electrode and the second electrode in FIG. 23 are at a flat state.
Figure 26B:
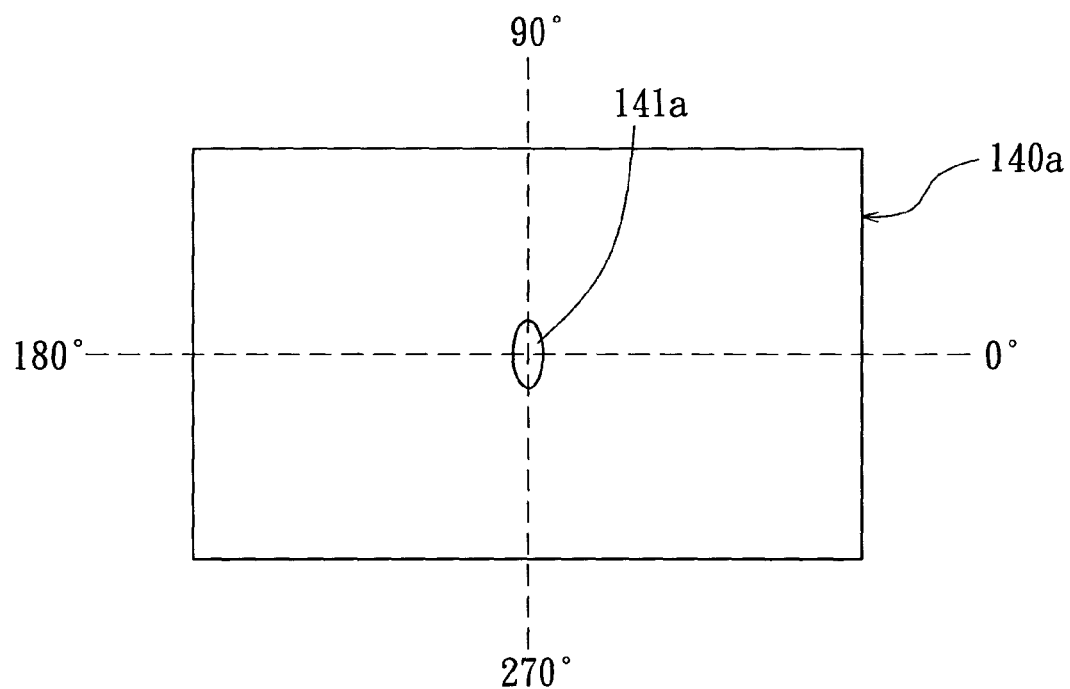
FIG. 26B is a top view when a liquid crystal molecule positioned between the first electrode and the second electrode in FIG. 26A lies flat on a first alignment film.

As shown in FIG. 26A, when a second voltage is applied between the first electrode 139*a* and the second electrode 139*b*, the liquid crystal molecules 141*a* in the part of the liquid crystal layer 141 positioned between the first electrode 139*a* and the second electrode 139*b* tilt along the first rubbing direction 102*a* towards the azimuth angle of 90 degrees and are aligned to form a flat state as shown in FIG. 26B. Meanwhile, the retardation Δnd, provided by the viewing-angle-adjusting device 134 when the viewer views the LCD 130 from the front or in a squint direction, is equal to 0. This means the viewing-angle-adjusting device 134 does not change the polarization state of the light passing through the LCD panel 23, so the LCD 130 is at a second wide-viewing-angle mode. When the saturation voltage of the liquid crystal layer 141 equals to $V_{sat}$, V2 is larger than $V_{sat}$, V1 substantially equals to about $0.5 V_{sat} \sim 0.8 V_{sat}$. Perfectly, V1 equals to $0.7 V_{sat}$. In the present preferred embodiment, the first voltage and the second voltage are respectively equal to about 2.5 V and 5 V.

When the LCD 130 is at a wide-viewing-angle mode according to the wide-viewing-angle-mode signal, the viewer can see the frame displayed on the LCD 130 from the front or from various azimuth angles in a squint direction. When the LCD 130 is at a narrow-viewing-angle mode according to the narrow-viewing-angle-mode signal, the viewer can only see a blank region corresponding to the shape of the first electrode 139*a* in the frame from the azimuth angles of about 0 and 180 degrees when viewing the LCD 130 in a squint direction. Besides, the shape of the first electrode 139*a* can be designed to be a text, a trade mark or a logo, so the viewer can see the text, trade mark or logo embedded in the frame displayed on the LCD 130 at a narrow-viewing-angle mode in a squint direction from the azimuth angles of about 0 and 180 degrees or other azimuth angles, largely enhancing the practicality of the LCD 130. However, anyone who is familiar with the technology of the invention will understand that the technology of the invention is not limited thereto. For example, a first compensation film can be disposed between the first polarizer 22 and the LCD panel 23, and a second compensation film can be disposed between the second polarizer 25 and the viewing-angle-adjusting device 134.

Although the orientation characteristic of the liquid crystal molecules 141*a* of the liquid crystal layer 141 under the change of the electrical field are mentioned in the foregoing description of the present embodiment, other kind of liquid crystal has different orientation characteristic under the change of the electrical field.

For example, when no voltage is applied between the first electrode 139a and the second electrode 139b, the LC molecules in the LC layer are arranged in a flat state.

When a eleventh voltage is applied between the first electrode 139a and the second electrode 139b, the LC molecules in the LC layer are arranged along the first rubbing direction 132a in a sloping state.

When a twelfth voltage is applied between the first electrode 139a and the second electrode 139b, the LC molecules in the LC layer are arranged in a vertical state. The eleventh voltage is smaller that the twelfth voltage.

In one embodiment, the viewing-angle-adjusting device 24 or 104 is disposed between the first polarizer 22 and the second polarizer 25 of the LCD 130, increasing the function of adjusting the view angle of the LCD 130.

Tenth Preferred Embodiment

Figure 27:
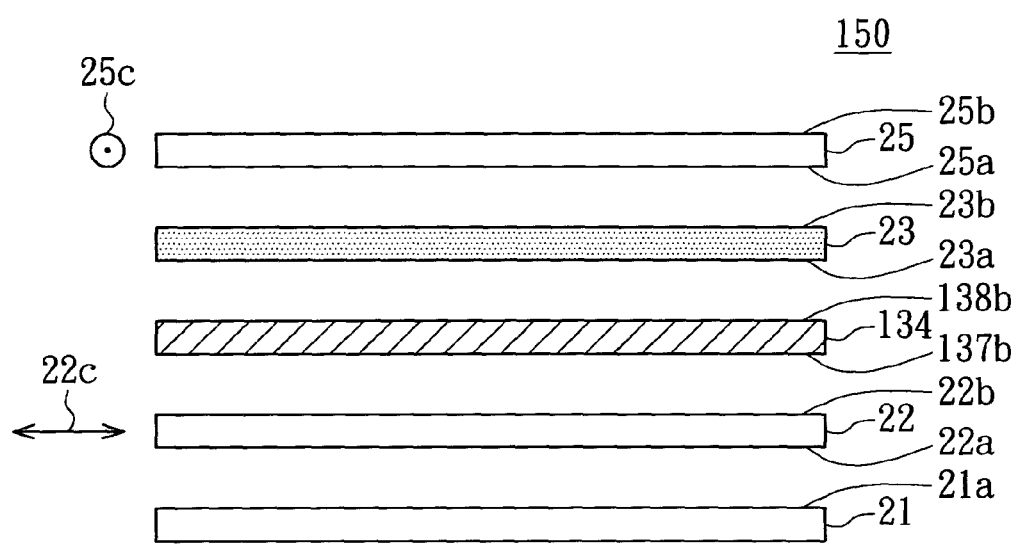
FIG. 27 is a side view of the LCD with adjustable-viewing-angle according to the tenth preferred embodiment of the invention.

Referring to FIG. 27, a side view of the LCD with adjustable view angle according to the tenth preferred embodiment of the invention is shown. The LCD 150 in the present preferred embodiment differs with the LCD 130 in the ninth preferred embodiment in that the LCD panel 23 is positioned between the viewing-angle-adjusting device 134 and the second polarizer 25. The viewing-angle-adjusting device 134 is disposed on the second surface 22b with the second substrate surface 137b facing the second surface 22b. The LCD panel 23 is disposed on the fourth substrate surface 138b with the third surface 23a facing the fourth substrate surface 138b. The first polarizer 25 is disposed on the fourth surface 23b with the fifth surface 25a facing the fourth surface 23b. However, anyone who is familiar with the technology of the invention will understand that the technology of the invention is not limited thereto. For example, a first compensation film can be disposed between the first polarizer 22 and the viewing-angle-adjusting device 134, and a second compensation film can be disposed between the second polarizer 25 and the LCD panel 23.

Eleventh Preferred Embodiment

Figure 28:
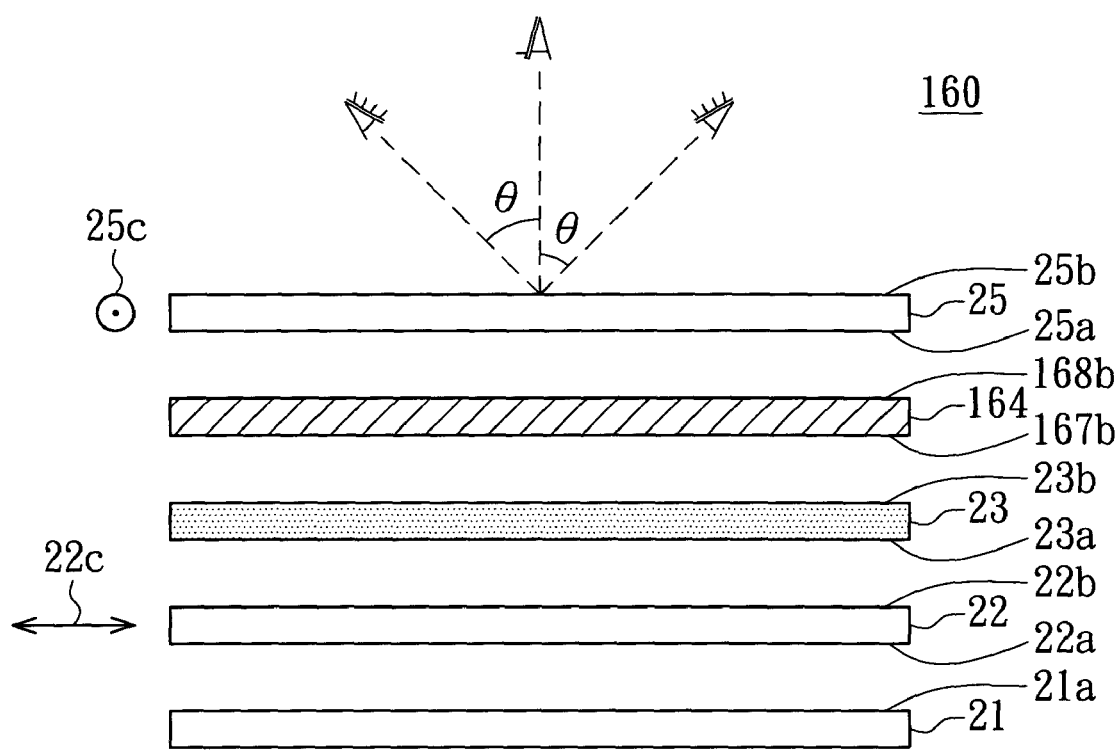
FIG. 28 is a side view of the LCD with adjustable-viewing-angle according to the eleventh preferred embodiment of the invention.
Figure 29A:
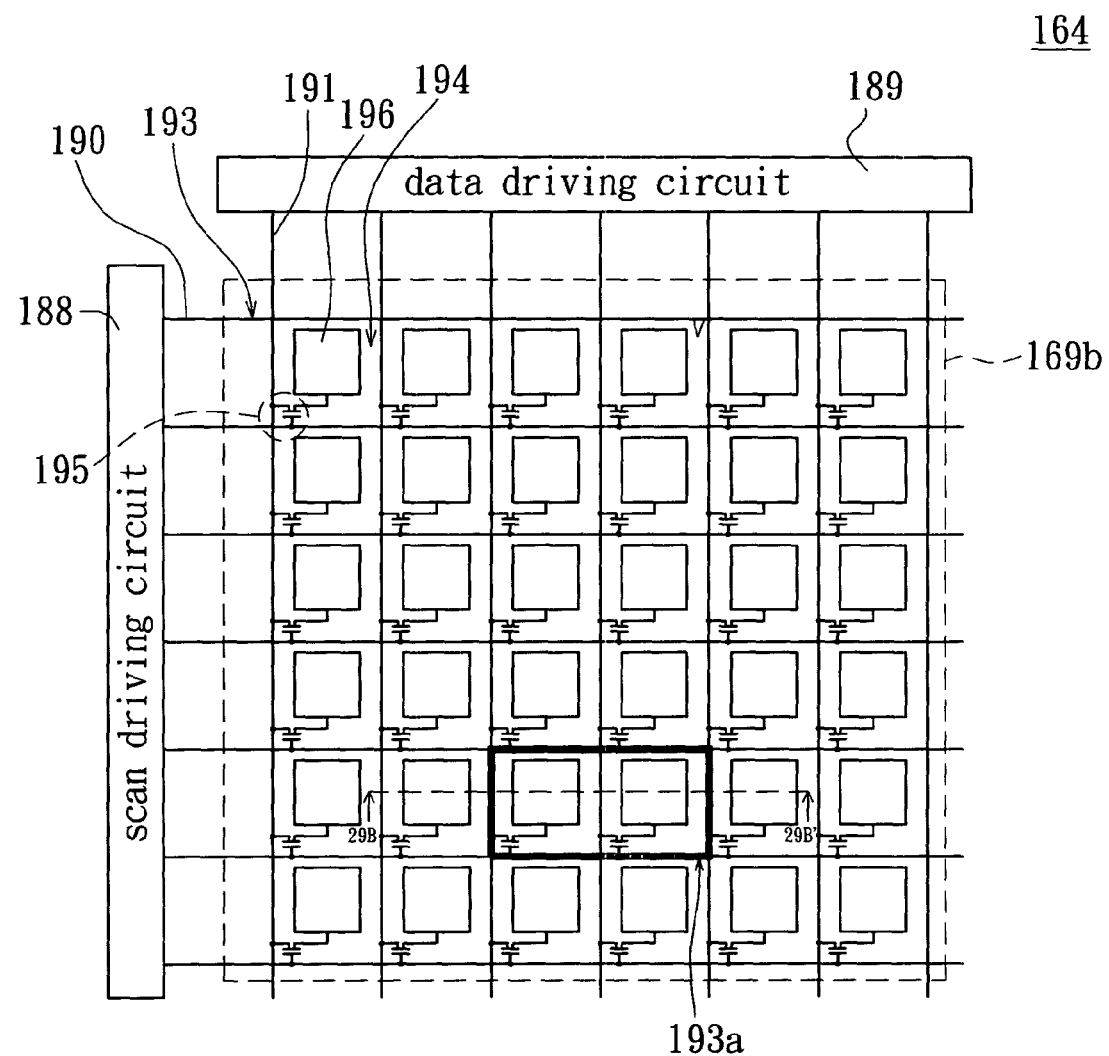
FIG. 29A is a circuit layout diagram of a pixel array of the viewing-angle-adjusting device in FIG. 28.
Figure 29B:
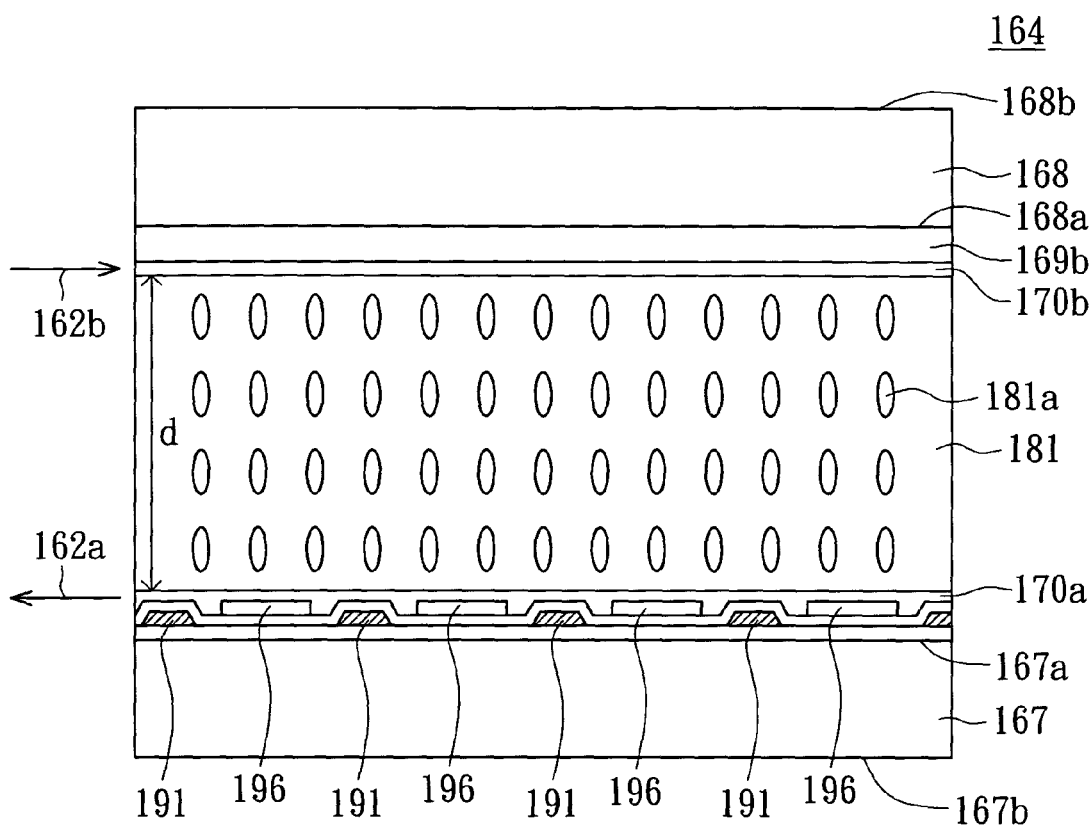
FIG. 29B is a cross-sectional view of the liquid crystal molecules disposed on the viewing-angle-adjusting device viewed from the cross-section line 29B-29B' in FIG. 29A are at a vertical state.

Referring to FIG. 28, a side view of the LCD with adjustable view angle according to the eleventh preferred embodiment of the invention is shown. The LCD 160 in the present preferred embodiment differs with the LCD 20 in the first preferred embodiment in that the viewing-angle-adjusting device 164 has the design of a pixel array. The present preferred embodiment is exemplified by an active-type pixel array. Viewing-angle-adjusting device 164 is disposed between the LCD panel 23 and the second polarizer 25. As shown in FIG. 29A-29B, the viewing-angle-adjusting device 164 comprises a first substrate 167, a second substrate 168, a pixel array 193, a common electrode 169b, a first alignment film 170a, a second alignment film 170b and a liquid crystal layer 171. The viewing-angle-adjusting device 164 further comprises a scan driving circuit 188, a data driving circuit 189, a number of scan lines 190 and a number of data lines 191, wherein the scan lines 190 and the data lines 191 define the pixel array 193, wherein the pixel array 193 has a number of pixels 194. Each of the pixels 194 has a TFT 195 and a pixel electrode 196 electrically connected together, wherein the TFT 195 is electrically connected to and corresponds to a scan line 190 and a data line 191. Besides, the scan line 190 is electrically connected to the scan driving circuit 188 while the data line 191 is electrically connected to the data driving circuit 188. The scan driving circuit 188 is for driving all of the TFTs 195 via the scan lines 190 while the data driving circuit 189 is for controlling the existence of a voltage between the pixel electrode 169 and the common electrode 169b.

Figure 29C:
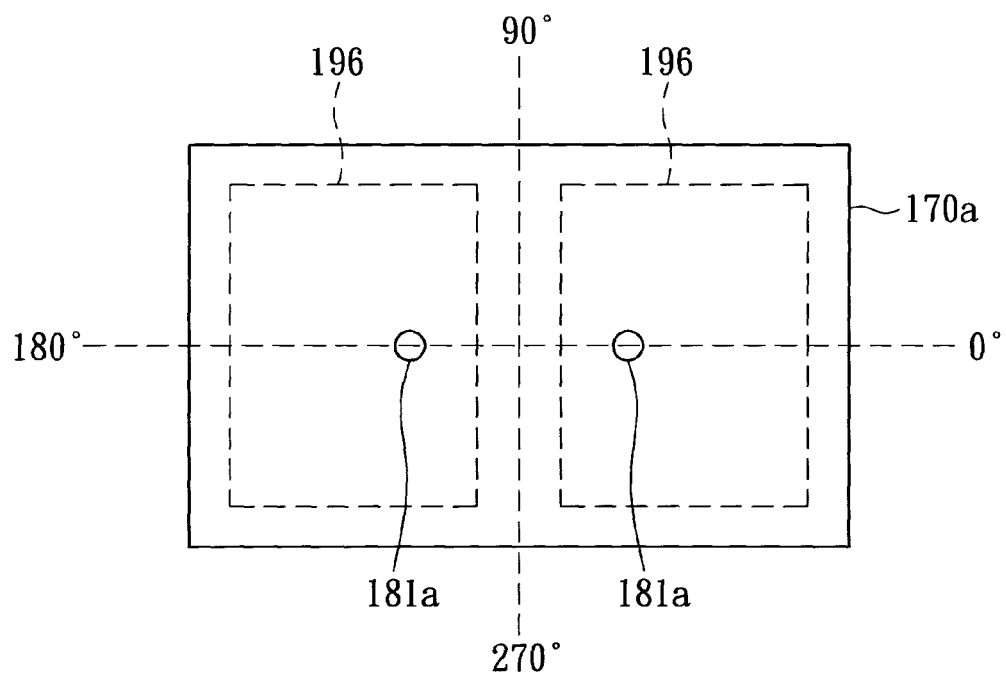
FIG. 29C is a top view when the two liquid crystal molecules corresponding to the two pixel electrodes in FIG. 29B stand on a first alignment film.

As shown in FIG. 29B, the first substrate 167 has a first substrate surface 167a and a second substrate surface 167b corresponding to each other. The scan line 190 in FIG. 29A, the data line 191, the pixel array 193, the TFT 165 and the pixel electrode 196 are disposed on the first substrate surface 167a. The first alignment film 170a covers the pixel electrode 196 and has a first rubbing direction 162a parallel to or perpendicular to the extending direction 22c of the first light transmission axis. In the present preferred embodiment, the first rubbing direction 162a is parallel to the extending direction 22c of the first light transmission axis. The second substrate 168 has a third substrate surface 168a and a fourth substrate surface 168b corresponding to each other, wherein the third substrate surface 168a faces the first substrate surface 167 while the fourth substrate surface 168b faces the fifth surface 25a. The common electrode 169b is disposed on the third substrate surface 168a. The second alignment film 170b covers the common electrode 169b and has a second rubbing direction 162b opposite to the first rubbing direction 162a. The liquid crystal layer 181 is sealed between the first substrate 167 and the second substrate 168 and positioned between the first alignment film 170a and the second alignment film 170b. As shown in FIG. 29C, the first rubbing direction 162a shifts from the azimuth angle of 90 degrees towards the azimuth angle of 270 degrees, the second rubbing direction 162b will shift from the azimuth angle of 270 degrees towards the azimuth angle of 90 degrees.

By means of the scan driving circuit 188 and the data driving circuit 189, part of the pixels 194 are dynamically defined to be a predetermined pixel zone 193a corresponding to a text, trade mark or logo. In the present preferred embodiment, the predetermined pixel zone 193a comprises two pixels 196 for instance. However, anyone who is familiar with the technology of the invention will understand that the technology of the invention is not limited thereto. For example, the present preferred embodiment could dynamically define part of the passive pixels to be a predetermined pixel zone corresponding to a text, trademark or logo.

As shown in FIG. 32B, when not any voltage is applied to between the pixel electrode 196 and the common electrode 169b, the liquid crystal molecules 181a of the liquid crystal layer 181 are aligned to form a vertical state as shown in FIG. 29C. Meanwhile, the retardation Δnd provided by the viewing-angle-adjusting device 164 when the viewer views the LCD 100 from the front or in a squint direction is equal to 0. This means the viewing-angle-adjusting device 164 does not change the polarization state of the light passing through the LCD panel 23, so the LCD 160 is at a first wide-viewing-angle mode according to the wide-viewing-angle-mode signal.

Figure 30A:
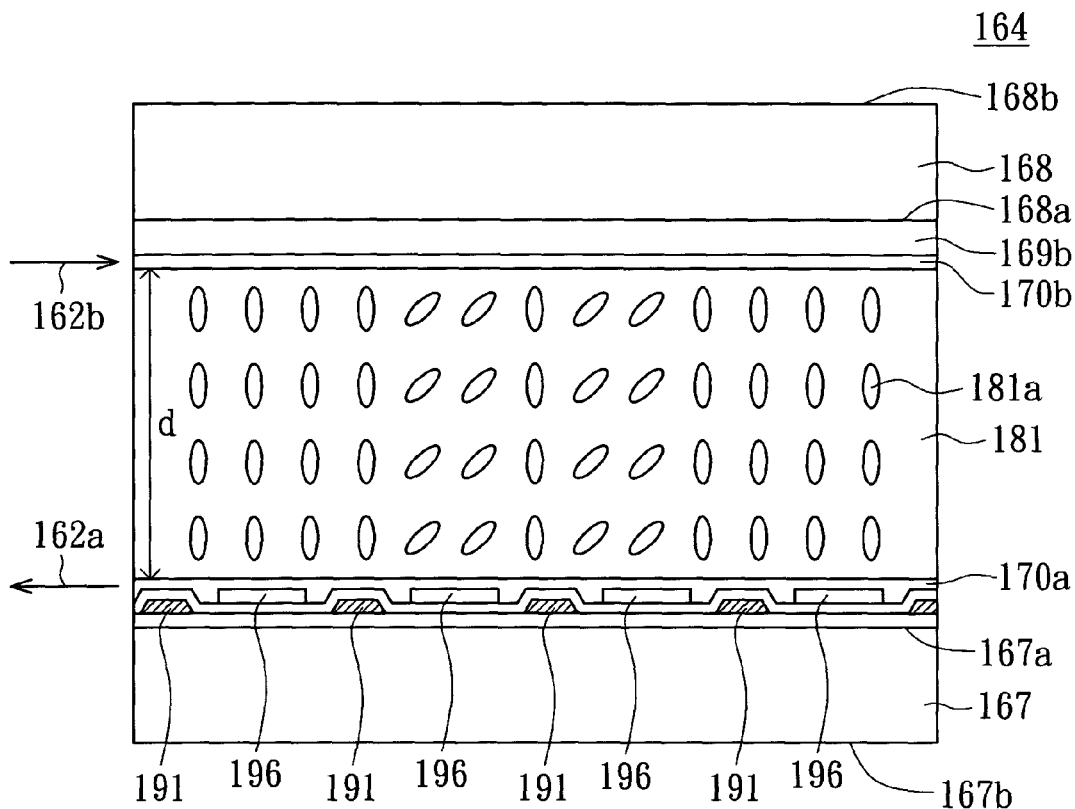
FIG. 30A is a cross-sectional view when the liquid crystal molecules disposed on the part of the liquid crystal layer positioned between the two pixel electrodes and the common electrode in FIG. 28 at a sloping state.
Figure 30B:
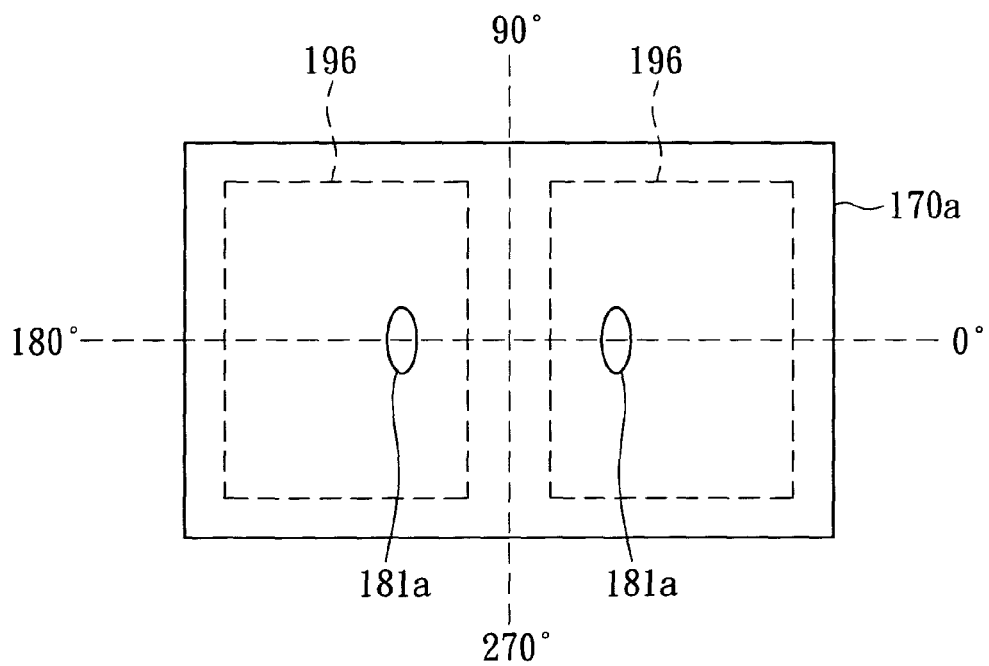
FIG. 30B is a top view when the two liquid crystal molecules corresponding to the two pixel electrodes in FIG. 30A tilting on a first alignment film.

As shown in FIG. 30A, when a first voltage is applied to between the pixel two electrodes 196 of the predetermined pixel zone 193a in FIG. 32A and the common electrode 169b but not any voltage is applied to between other pixel electrodes 196 and common electrodes 139b, the liquid crystal molecules 181a of the part of the liquid crystal layer 181 positioned between the two pixel electrodes 169a and the common electrode 169b tilt along the first rubbing direction 132a towards the azimuth angle of 90 degrees and are aligned to form a sloping state as shown in FIG. 30B. Moreover, the liquid crystal molecules 181a of the part of the liquid crystal layer 181 positioned between other pixel electrodes 169a and the common electrode 169b are at a vertical state. Meanwhile, the retardation Δnd provided by the viewing-angle-adjusting device 164 when the viewer views the LCD 130 in a squint direction from the azimuth angles of 0 and 180 degrees is not equal to 0. This means the viewing-angle-adjusting device 164 will change the polarization state of the light passing through the LCD panel 23, so the viewer can see a blank region corresponding to the predetermined pixel zone 193*a* in the frame displayed on the LCD panel 23 when viewing the LCD 160 in a squint mode from the azimuth angles of 0 and 180 degrees. Therefore, the LCD 160 is at a narrow-viewing-angle mode according to the narrow-viewing-angle-mode signal, but allows the viewer who views the LCD 160 in a squint direction from the azimuth angles of 0 and 180 degrees to see a blank region corresponding to the predetermined pixel zone 193*a*.

Figure 31A:
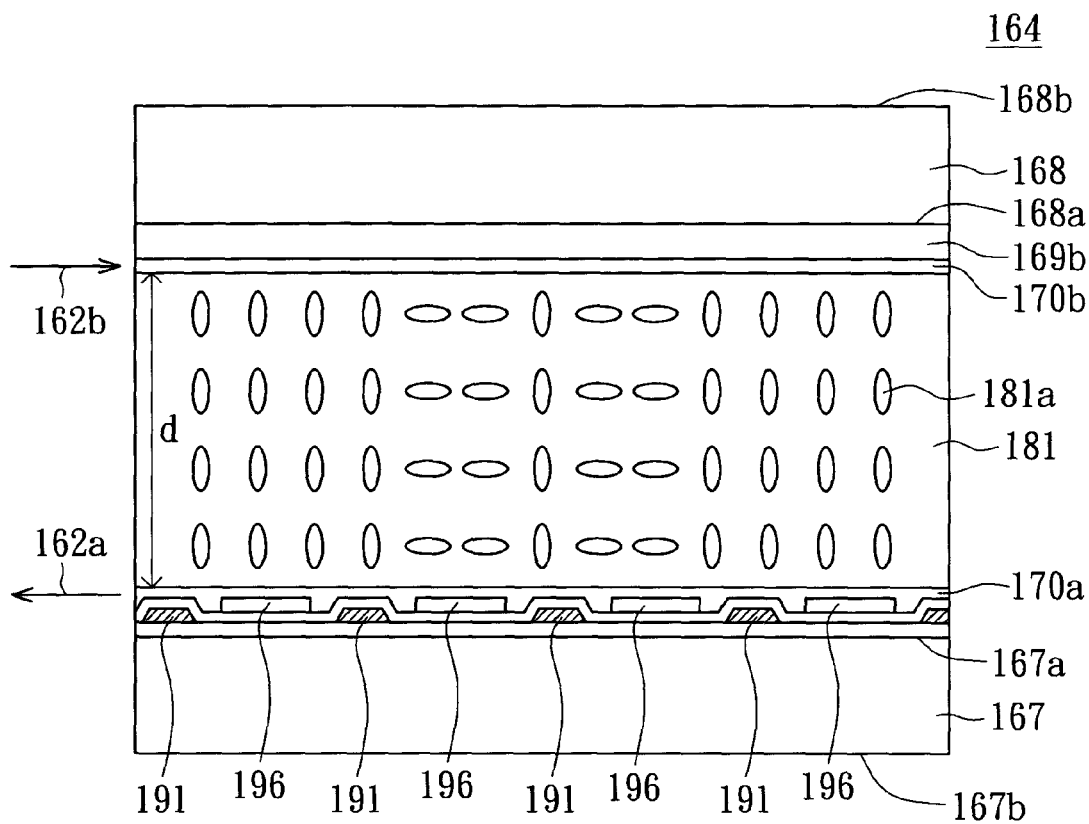
FIG. 31A is a cross-sectional view when the liquid crystal molecules disposed on the part of the liquid crystal layer positioned between the two pixel electrodes and the common electrode in FIG. 28 at a flat state.
Figure 31B:
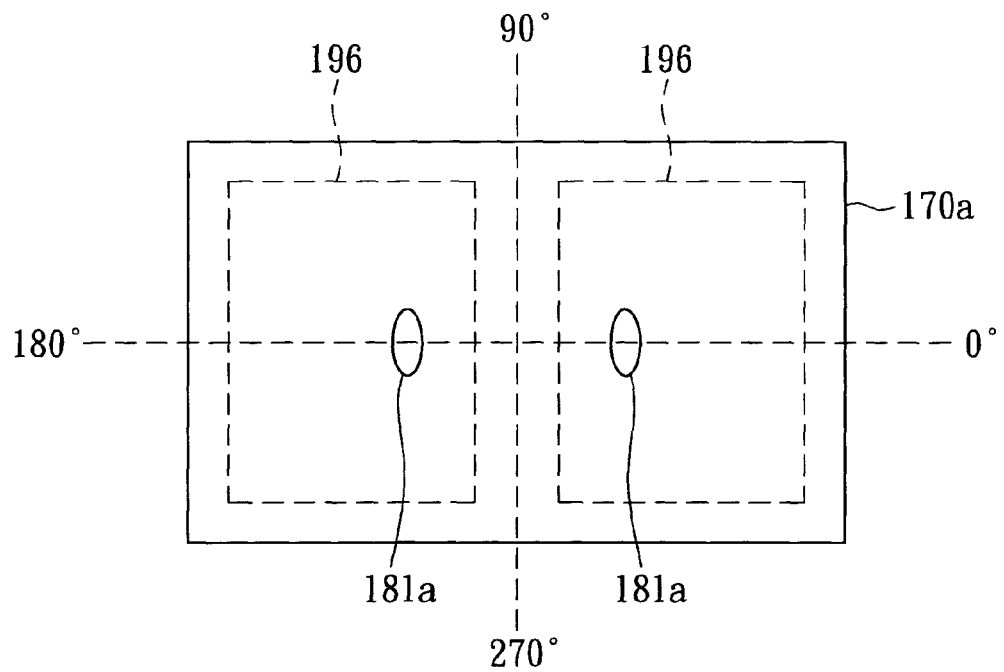
FIG. 31B is a top view when the two liquid crystal molecules corresponding to the two pixel electrodes in FIG. 31A lying flat on a first alignment film.

As shown in FIG. 31A, when a second voltage is applied to between the two pixel electrodes 196 of the pre-set pixel zone 193*a* in FIG. 32A and the common electrode 169*b* but not any voltage is applied to between other pixel electrodes 196 and the common electrode 169*b*, the liquid crystal molecules 181*a* of the part of the liquid crystal layer 181 positioned between the two pixel electrodes 169*a* and the common electrode 169*b* lie flat along the first rubbing direction 132*a* towards the azimuth angle of 90 degrees and are aligned to form a flat state as shown in FIG. 31B. Moreover, the liquid crystal molecules 181*a* of the part of the liquid crystal layer 181 positioned between other pixel electrodes 196 and the common electrode 169*b* are at a vertical state. Meanwhile, the retardation Δnd provided by the viewing-angle-adjusting device 164 when the viewer views the LCD 160 from the front or in a squint mode is equal to 0. This means the viewing-angle-adjusting device 164 does not change the polarization state of the light passing through the LCD panel 23, so the LCD 160 is at a second wide-viewing-angle mode according to the wide-viewing-angle-mode signal.

When the saturation voltage of the liquid crystal layer 181 equals to $V_{sat}$, V2 is larger than $V_{sat}$, V1 substantially equals to $0.5V_{sat}$~$0.8V_{sat}$. Perfectly, V1 equals to $0.7V_{sat}$. In the present preferred embodiment, the first voltage V1 and the second voltage V2 are respectively equal to 2.5 V and 5 V. Preferably, if the second voltage equals the saturated voltage of the liquid crystal layer 181, the first voltage is approximately equal to 0.7 times of the second voltage. Besides, the predetermined pixel zone 193*a* is controlled by the scan driving circuit 188 and the data driving circuit 189 to form a text, a trademark or a logo. When the LCD 160 is at a narrow-viewing-angle mode according to the narrow-viewing-angle-mode signal, the viewer could see the text, trademark or logo from the azimuth angles of about 0 and 180 degrees or other azimuth angles when viewing the LCD 160 in a squint direction, largely enhancing the practicality of the LCD. However, anyone who is familiar with the technology of the invention will understand that the technology of the invention is not limited thereto. For example, a first compensation film can be disposed between the first polarizer 22 and the LCD panel 23, and a second compensation film can be disposed between the second polarizer 25 and the viewing-angle-adjusting device 164.

Although the orientation characteristic of the liquid crystal molecules 181*a* of the liquid crystal layer 181 under the change of the electrical field are mentioned in the foregoing description of the present embodiment, other kinds of liquid crystals have different orientation characteristic under the change of the electrical field.

For example, when no voltage is applied between the pixel electrodes 196 and the common electrode 169*b*, the LC molecules in the LC layer are arranged in a flat state.

When a thirteenth voltage is applied between the two pixel electrodes 196 of the predetermined pixel zone 193*a* and the common electrode 169*b*, and no voltage is applied between other pixel electrodes 196 and the common electrode 169*b*, the LC molecules between the two pixel electrodes 196 of the pre-set pixel zone 193*a* and part of the common electrode 169*b* are arranged along the first rubbing direction 132*a* in a sloping state. The LC molecules between the other pixel electrodes 196 and other part of the common electrode 169*b* are arranged in the flat state.

When a fourteenth voltage is applied between the two pixel electrodes 196 of the pre-set pixel zone 193*a* and the common electrode 169*b*, and no voltage is applied between other pixel electrodes 196 and the common electrode 169*b*, the LC molecules between the two pixel electrodes 196 of the predetermined pixel zone 193*a* and part of the common electrode 169*b* are arranged along the first rubbing direction 132*a* in a perpendicular state. The thirteenth voltage is smaller that the fourteenth voltage.

In one embodiment, the viewing-angle-adjusting device 24 or 104 is disposed between the first polarizer 22 and the second polarizer 25 of the LCD 160, increasing the function of adjusting the view angle of the LCD 160.

Twelfth Preferred Embodiment

Figure 32:
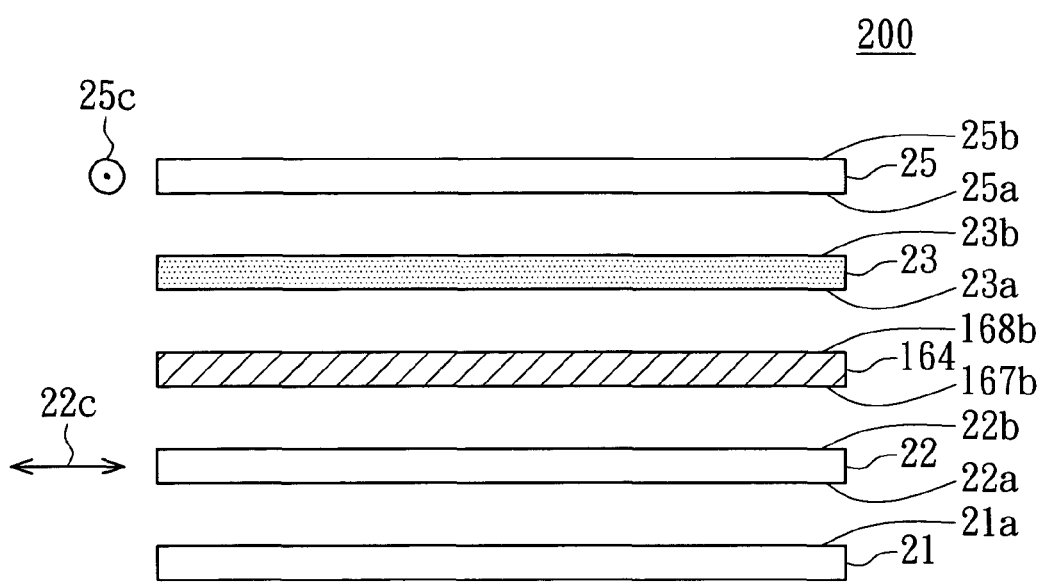
FIG. 32 is a side view of the LCD with adjustable-viewing-angle according to the twelfth preferred embodiment of the invention.

Referring to FIG. 32, a side view of the LCD with adjustable view angle according to the twelfth preferred embodiment of the invention is shown. The LCD 200 in the present preferred embodiment differs with the LCD 160 in preferred embodiment eleven in that the LCD panel 23 is positioned between the viewing-angle-adjusting device 164 and the second polarizer 25. The viewing-angle-adjusting device 164 is disposed on the second surface 22*b* with the second substrate surface 167*b* facing the second surface 22*b*. The LCD panel 23 is disposed on the fourth substrate surface 168*b* with the third surface 23*a* facing the fourth substrate surface 168*b*. The first polarizer 25 is disposed on the fourth surface 23*b* with the fifth surface 25*a* facing the fourth surface 23*b*. However, anyone who is familiar with the technology of the invention will understand that the technology of the invention is not limited thereto. For example, a first compensation film can be disposed between the first polarizer 22 and the viewing-angle-adjusting device 164, and a second compensation film can be disposed between the second polarizer 25 and the LCD panel 23.

The viewing-angle-adjusting device incorporated in the LCD with adjustable view angle disclosed in the above preferred embodiments according to the invention has the design of allowing the user to switch the LCD's view angle mode between a wide-viewing-angle mode and a narrow-viewing-angle mode so as to achieve the object of providing an LCD with adjustable view angle. Such design not only personally protects privacy data security but also enhance the practicality of the LCD. Besides, the design of the viewing-angle-adjusting device in the present preferred embodiment has the advantage that when the user switches the LCD's view angle mode, the contrast and brightness of the LCD do not change, so that the viewer who views the LCD from the front will not notice any change in contrast and brightness and that the display quality of the LCD can be maintained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the widest interpretation so as to encompass all such modifications and similar arrangements and procedures.

What is claimed is:

1. A method of driving an LCD including a first viewing-angle-adjusting device having a liquid crystal, comprising:

generating a first voltage difference to the first viewing-angle-adjusting device to execute a wide-viewing-angle mode according to a wide-viewing-angle-mode signal by aligning the liquid crystal in one of a vertical state and a flat state, wherein the first voltage difference is one of substantially equal to 0 and larger than $V_{sat}$, $V_{sat}$ referring to a saturation voltage of the liquid crystal of the first viewing-angle-adjusting device; and generating a second voltage difference to the first viewing-angle-adjusting device to execute a narrow-viewing-angle mode according to a narrow-viewing-angle-mode signal by aligning the liquid crystal in a slopping state, wherein the second voltage difference is substantially larger than 0.5 $V_{sat}$, but smaller than 0.8 $V_{sat}$.

2. The method according to claim 1, wherein the second voltage difference substantially equals to 0.7 $V_{sat}$.

3. The method according to claim 1, further comprising:
generating a third voltage difference, to a second viewing-angle-adjusting device of the LCD, which is one of substantially equal to 0 and larger than $V_{sat}$ to execute the wide-viewing-angle mode according to the wide-viewing-angle-mode signal when generating the first voltage difference to the first viewing-angle-adjusting device.

4. The method according to claim 1, further comprising:
generating a third voltage difference, to a second viewing-angle-adjusting device of the LCD, which is one of substantially equal to 0 and larger than $V_{sat}$ to execute the narrow-viewing-angle mode according to the narrow-viewing-angle-mode signal when generating the second voltage difference to the first viewing-angle-adjusting device.

5. The method according to claim 1, further comprising:
generating a fourth voltage difference, to a second viewing-angle-adjusting device of the LCD, which is substantially larger than 0.5$V_{sat}$, but smaller than 0.8$V_{sat}$ to execute the narrow-viewing-angle mode according to the narrow-viewing-angle-mode signal when generating the second voltage difference to the first viewing-angle-adjusting device.

6. The method according to claim 5, wherein the fourth voltage difference substantially equals to 0.7 $V_{sat}$.

7. A liquid crystal display (LCD), comprising:
a backlight module;
a first polarizer and a second polarizer disposed over the backlight module;
an LCD panel disposed between the first polarizer and the second polarizer, the LCD panel including a first panel alignment film, a panel liquid crystal layer and a second panel alignment film, the panel liquid crystal layer between the first panel alignment film and the second panel alignment film; and
a first viewing-angle-adjusting device disposed between the first polarizer and the second polarizer, the first viewing-angle-adjusting device being aligned to form a vertical state, wherein the first viewing-angle-adjusting device comprises:
a first substrate;
a first electrode disposed on the first substrate;
a first alignment film disposed on the first electrode;
a first liquid crystal layer disposed on the first alignment film;
a second alignment film disposed on the first liquid crystal layer, the first liquid crystal layer being between the first alignment film and the second alignment film;
a second electrode disposed on the first liquid crystal layer, wherein the second alignment film is disposed on the bottom surface of the second electrode; and
a second substrate disposed on the first liquid crystal layer, wherein the first liquid crystal layer is sealed between the first substrate and the second substrate, the second electrode is disposed on the bottom surface of the second substrate;

wherein:
the LCD panel is disposed between the first polarizer and the first viewing-angle-adjusting device;
the light transmission axis of the first polarizer is perpendicular to that of the second polarizer, the first alignment film includes a first alignment region and a second alignment region, the second alignment film includes a third alignment region and a fourth alignment region, the third alignment region and the fourth alignment region correspond to the first alignment region and the second alignment region, respectively, wherein the rubbing direction of the first alignment region is parallel or perpendicular to the light transmission axis of the first polarizer, the rubbing directions of the second alignment region and the third alignment region are parallel but opposite to that of the first alignment region, the rubbing direction of the fourth alignment region are parallel but opposite to that of the second alignment region.

8. A liquid crystal display (LCD), comprising:
a backlight module;
a first polarizer and a second polarizer disposed over the backlight module;
an LCD panel disposed between the first polarizer and the second polarizer, the LCD panel including a first panel alignment film, a panel liquid crystal layer and a second panel alignment film, the panel liquid crystal layer between the first panel alignment film and the second panel alignment film; and
a first viewing-angle-adjusting device disposed between the first polarizer and the second polarizer, the first viewing-angle-adjusting device being aligned to form a vertical state, wherein the first viewing-angle-adjusting device comprises:
a first substrate;
a first electrode disposed on the first substrate;
a first alignment film disposed on the first electrode;
a first liquid crystal layer disposed on the first alignment film;
a second alignment film disposed on the first liquid crystal layer, the first liquid crystal layer being between the first alignment film and the second alignment film;
a second electrode disposed on the first liquid crystal layer, wherein the second alignment film is disposed on the bottom surface of the second electrode; and
a second substrate disposed on the first liquid crystal layer, wherein the first liquid crystal layer is sealed between the first substrate and the second substrate, the second electrode is disposed on the bottom surface of the second substrate;

wherein:
the LCD panel is disposed between the second polarizer and the first viewing-angle-adjusting device;

the light transmission axis of the first polarizer is perpendicular to that of the second polarizer, the first alignment film includes a first alignment region and a second alignment region, the second alignment film includes a third alignment region and a fourth alignment region, the third alignment region and the fourth alignment region correspond to the first alignment region and the second alignment region, respectively, wherein the rubbing direction of the first alignment region is parallel or perpendicular to the light transmission axis of the first polarizer, the rubbing directions of the second alignment region and the third alignment region are parallel but opposite to that of the first alignment region, and the rubbing direction of the fourth alignment region are parallel but opposite to that of the second alignment region.

9. A liquid crystal display (LCD), comprising:
a backlight module;
a first polarizer and a second polarizer disposed over the backlight module;
an LCD panel disposed between the first polarizer and the second polarizer, the LCD panel including a first panel alignment film, a panel liquid crystal layer and a second panel alignment film, the panel liquid crystal layer between the first panel alignment film and the second panel alignment film; and
a first viewing-angle-adjusting device disposed between the first polarizer and the second polarizer, the first viewing-angle-adjusting device being aligned to form a vertical state, wherein the first viewing-angle-adjusting device comprises:
a first substrate;
a first electrode disposed on the first substrate;
a first alignment film disposed on the first electrode;
a first liquid crystal layer disposed on the first alignment film;
a second alignment film disposed on the first liquid crystal layer, the first liquid crystal layer being between the first alignment film and the second alignment film;
a second electrode disposed on the first liquid crystal layer, wherein the second alignment film is disposed on the bottom surface of the second electrode; and
a second substrate disposed on the first liquid crystal layer, wherein the first liquid crystal layer is sealed between the first substrate and the second substrate, the second electrode is disposed on the bottom surface of the second substrate,
wherein the first viewing-angle-adjusting device further comprises:
a first isolation layer having a first aperture disposed on the first substrate, wherein the first electrode is disposed in the first aperture; and
a second isolation layer having a second aperture disposed on the bottom surface of the second substrate, wherein the second aperture corresponds to the first aperture, and the second electrode is disposed in the second aperture.

10. The LCD according to claim 9, wherein the first viewing-angle-adjusting device further comprises:
a plurality of scan lines and a plurality of data lines disposed on the first substrate, wherein the scan lines and the date lines define a pixel array having a plurality of pixels, part of the pixels form a predetermined pixel zone;
a plurality of thin film transistors (TFTs) disposed on the first substrate, wherein each of the TFTs is positioned in the corresponding pixel and electrically connected to the corresponding scan line and the corresponding data line;
a scan driving circuit electrically connected to the TFTs via the scan lines; and
a data driving circuit electrically connected to the TFTs via the data lines; and
wherein the first electrode includes a plurality of pixel electrodes, each of the pixel electrodes is position in the corresponding pixel and electrically connected to the corresponding TFT.

11. A liquid crystal display (LCD), comprising:
a backlight module;
a first polarizer and a second polarizer disposed over the backlight module;
an LCD panel disposed between the first polarizer and the second polarizer, the LCD panel including a first panel alignment film, a panel liquid crystal layer and a second panel alignment film, the panel liquid crystal layer between the first panel alignment film and the second panel alignment film; and
a first viewing-angle-adjusting device disposed between the first polarizer and the second polarizer, the first viewing-angle-adjusting device being aligned to form a vertical state, wherein the first viewing-angle-adjusting device comprises:
a first substrate;
a first electrode disposed on the first substrate;
a first alignment film disposed on the first electrode;
a first liquid crystal layer disposed on the first alignment film;
a second alignment film disposed on the first liquid crystal layer, the first liquid crystal layer being between the first alignment film and the second alignment film;
a second electrode disposed on the first liquid crystal layer, wherein the second alignment film is disposed on the bottom surface of the second electrode; and
a second substrate disposed on the first liquid crystal layer, wherein the first liquid crystal layer is sealed between the first substrate and the second substrate, the second electrode is disposed on the bottom surface of the second substrate,
wherein the first viewing-angle-adjusting device further comprises:
a plurality of scan lines and a plurality of data lines disposed on the first substrate, wherein the scan lines and the date lines define a pixel array having a plurality of pixels, part of the pixels form a predetermined pixel zone;
a plurality of thin film transistors (TFTs) disposed on the first substrate, wherein each of the TFTs is positioned in the corresponding pixel and electrically connected to the corresponding scan line and the corresponding data line;
a scan driving circuit electrically connected to the TFTs via the scan lines;
a data driving circuit electrically connected to the TFTs via the data lines; and
wherein the first electrode includes a plurality of pixel electrodes, each of the pixel electrodes is position in the corresponding pixel and electrically connected to the corresponding TFT.

12. A liquid crystal display (LCD), comprising:
a backlight module;
a first polarizer and a second polarizer disposed over the backlight module;
an LCD panel disposed between the first polarizer and the second polarizer, the LCD panel including a first panel alignment film, a panel liquid crystal layer and a second panel alignment film, the panel liquid crystal layer between the first panel alignment film and the second panel alignment film; and a first viewing-angle-adjusting device disposed between the first polarizer and the second polarizer, the first viewing-angle-adjusting device being aligned to form a vertical state, wherein the first viewing-angle-adjusting device comprises:

a first substrate;

a first electrode disposed on the first substrate;

a first alignment film disposed on the first electrode;

a first liquid crystal layer disposed on the first alignment film;

a second alignment film disposed on the first liquid crystal layer, the first liquid crystal layer being between the first alignment film and the second alignment film;

a second electrode disposed on the first liquid crystal layer, wherein the second alignment film is disposed on the bottom surface of the second electrode; and a second substrate disposed on the first liquid crystal layer, wherein the first liquid crystal layer is sealed between the first substrate and the second substrate, the second electrode is disposed on the bottom surface of the second substrate;

wherein:

the first alignment film includes a first alignment region and a second alignment region, the second alignment film includes a third alignment region and a fourth alignment region, the third alignment region and the fourth alignment region correspond to the first alignment region and the second alignment region, respectively, wherein the rubbing direction of the first alignment region is parallel or perpendicular to a light transmission axis of the first polarizer, the rubbing directions of the second alignment region and the third alignment region are parallel but opposite to that of the first alignment region, and the rubbing direction of the fourth alignment region are parallel but opposite to that of the second alignment region.

* * * * *